US00RE34460E

United States Patent [19]

Ishiguro et al.

[11] E Patent Number: Re. 34,460

[45] Reissued Date of Patent: Nov. 30, 1993

[54] COPYING APPARATUS HAVING A SORTER WITH A SHEET STAPLING FUNCTION WITH STAPLE MODE CANCELLATION

[75] Inventors: Kuniaki Ishiguro; Takuma Ishikawa, both of Osaka, Japan

[73] Assignee: Minolta Camera Kabushiki Kaisha, Osaka, Japan

[21] Appl. No.: 835,377

[22] Filed: Feb. 14, 1992

Related U.S. Patent Documents

Reissue of:

[64] Patent No.: 4,901,994
Issued: Feb. 20, 1990
Appl. No.: 216,701
Filed: Jul. 8, 1988

[30] Foreign Application Priority Data

| | | | |
|---|---|---|---|
| Jul. 10, 1987 | [JP] | Japan | 62-172387 |
| Jul. 10, 1987 | [JP] | Japan | 62-172388 |
| Jul. 11, 1987 | [JP] | Japan | 62-173536 |
| Aug. 21, 1987 | [JP] | Japan | 62-208491 |
| Sep. 16, 1987 | [JP] | Japan | 62-231497 |
| Sep. 16, 1987 | [JP] | Japan | 62-231502 |
| Jan. 12, 1988 | [JP] | Japan | 63-5580 |

[51] Int. Cl.[5] ..... B42B 2/00; B65H 39/02; G03G 21/00; G06F 15/20

[52] U.S. Cl. ..... 270/53; 270/58; 355/324; 364/478

[58] Field of Search ..... 270/53, 37, 55, 56, 270/57, 58; 355/3 SH, 14 SH

[56] References Cited

U.S. PATENT DOCUMENTS

| | | | |
|---|---|---|---|
| 3,386,729 | 6/1968 | Pine | 270/52.5 |
| 3,645,615 | 2/1972 | Spear | 355/3 |
| 3,697,063 | 10/1972 | Greenfield et al. | 271/4 |
| 3,709,595 | 1/1973 | Turner et al. | 355/14 |
| 3,944,207 | 3/1976 | Bains | 270/58 |
| 4,067,649 | 1/1978 | Hubbard et al. | 355/14 |
| 4,073,391 | 2/1978 | O'Brien et al. | 214/65 |
| 4,076,408 | 2/1978 | Reid et al. | 355/14 |
| 4,123,155 | 10/1978 | Hubert | 355/26 |
| 4,134,672 | 1/1979 | Burlew et al. | 355/14 |
| 4,145,037 | 3/1979 | Mol | 270/58 |
| 4,190,246 | 2/1980 | Sasuga | 271/145 |
| 4,203,587 | 5/1980 | Kishi et al. | 271/293 |
| 4,218,128 | 8/1980 | Satomi et al. | 355/14 SH |
| 4,227,275 | 10/1980 | Soderberg | 11/1 R |
| 4,238,066 | 12/1980 | Brooke | 227/39 |
| 4,248,413 | 2/1981 | Fox | 270/53 |
| 4,248,525 | 2/1981 | Sterrett | 355/14 SH |

(List continued on next page.)

FOREIGN PATENT DOCUMENTS

| | | |
|---|---|---|
| 0099250 | 1/1984 | European Pat. Off. . |
| 3701450 | 7/1987 | Fed. Rep. of Germany . |

(List continued on next page.)

*Primary Examiner*—Edward K. Look
*Assistant Examiner*—John Ryznic
*Attorney, Agent, or Firm*—Burns, Doane, Swecker & Mathis

[57] ABSTRACT

In a copying apparatus having a sorter with a sheet stapling function; the sorter has a plurality of bins capable of independently moving up or down, wherein sheets are sorted into the bins sequentially from the top bin to the bottom bin; the bins are moved down to a position where sheets are taken by take-out rollers for transporting them to a stapling unit after the sorting operation; and the bins other than those assigned for the number of copy sets are moved down to the take-out position during the sorting operation. Further, a copying apparatus has a controller which inhibits a copying machine from starting to operate when both a non-sorting mode and a stapling mode are selected at a time and when the input number of copy sets is [more than] 2 *or more*, and may cancel the stapling mode during the sorting operation in the stapling mode and continue the sorting operation even after canceling the stapling mode. The controller may inhibits the stapling operation when the size of sheet being stored into the bins differs from the size of sheet selected at the start of the copying operation.

20 Claims, 38 Drawing Sheets

U.S. PATENT DOCUMENTS

| | | | |
|---|---|---|---|
| 4,265,440 | 5/1981 | Shibazaki et al. | 271/9 |
| 4,272,180 | 6/1981 | Satomi et al. | 355/3 SH |
| 4,281,920 | 8/1981 | Cross | 355/75 |
| 4,295,733 | 10/1981 | Janssen et al. | 355/14 SH |
| 4,313,670 | 2/1982 | Caldwell | 355/3 R |
| 4,361,393 | 11/1982 | Noto | 355/3 SH |
| 4,365,886 | 12/1982 | Murakami et al. | 355/3 SH |
| 4,368,972 | 1/1983 | Naramore | 355/14 SH |
| 4,371,155 | 2/1983 | Astero et al. | 270/53 |
| 4,376,529 | 3/1983 | George et al. | 270/53 |
| 4,385,827 | 3/1983 | Naramore | 355/14 SH |
| 4,411,515 | 10/1983 | Kukucka et al. | 355/14 SH |
| 4,424,963 | 1/1984 | Bartholet et al. | 270/53 |
| 4,473,425 | 9/1984 | Baughman et al. | 156/356 |
| 4,497,478 | 2/1985 | Reschenhofer et al. | 270/53 |
| 4,515,458 | 5/1985 | Masuda et al. | 355/3 SH |
| 4,549,804 | 10/1985 | Braun et al. | 355/14 SH |
| 4,564,185 | 1/1986 | Hamlin et al. | 270/53 |
| 4,566,782 | 1/1986 | Britt et al. | 355/14 SH |
| 4,573,789 | 3/1986 | Wada | 355/14 SH |
| 4,582,421 | 4/1986 | Hamlin et al. | 270/53 |
| 4,592,651 | 6/1986 | Oikawa et al. | 355/72 |
| 4,595,187 | 6/1986 | Bober | 270/37 |
| 4,603,971 | 8/1986 | Kukucka et al. | 355/133 |
| 4,626,156 | 12/1986 | Baughman et al. | 412/33 |
| 4,647,034 | 3/1987 | Sawa | 271/293 |
| 4,647,188 | 3/1987 | Komiya et al. | 355/55 |
| 4,674,732 | 6/1987 | Hori | 270/53 |
| 4,674,866 | 6/1987 | Tanaka | 355/23 |
| 4,687,191 | 8/1987 | Stemmle | 270/53 |
| 4,702,589 | 10/1987 | Ito | 355/14 SH |
| 4,718,657 | 1/1988 | Otter et al. | 271/184 |
| 4,721,382 | 1/1988 | Ito et al. | 355/14 SH |
| 4,730,206 | 3/1988 | Sawada et al. | 355/3 SH |
| 4,743,945 | 5/1988 | Ito et al. | 355/14 SH |
| 4,763,889 | 8/1988 | Dei et al. | 271/9 |
| 4,917,366 | 4/1990 | Murakami et al. | 270/58 X |

FOREIGN PATENT DOCUMENTS

| | | |
|---|---|---|
| 3743989 | 7/1988 | Fed. Rep. of Germany . |
| 55-15150 | 2/1980 | Japan . |
| 57-131667 | 8/1982 | Japan . |
| 59-43765 | 3/1984 | Japan . |
| 60-183461 | 9/1985 | Japan . |
| 60-248563 | 12/1985 | Japan . |
| 26061 | 6/1986 | Japan . |
| 61-72569 | 6/1986 | Japan . |
| 61-145069 | 7/1986 | Japan . |
| 61-261096 | 11/1986 | Japan . |
| 2185465 | 7/1987 | United Kingdom . |

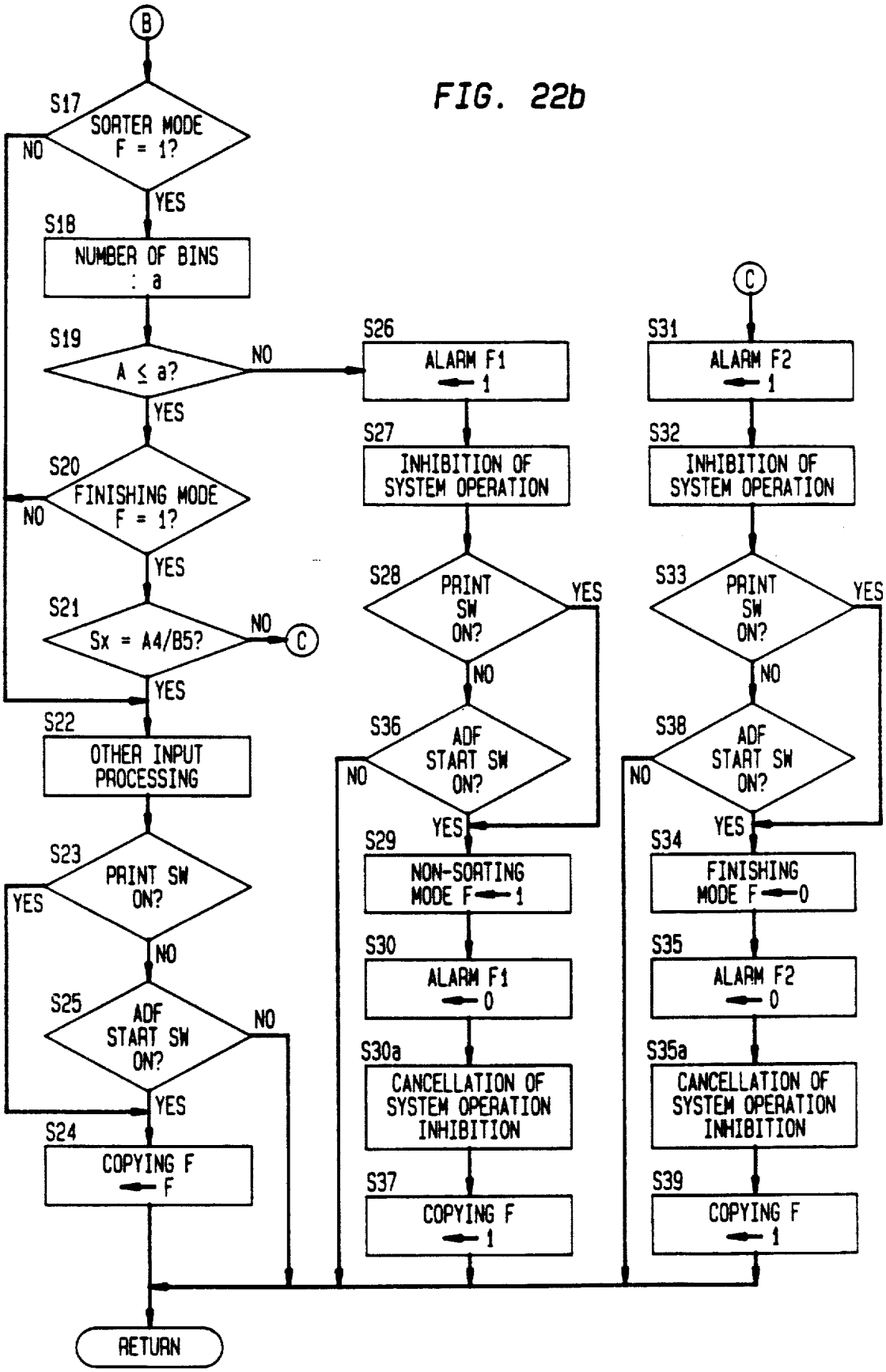
FIG. 22b
B
S17
SORTER MODE F = 1?
NO
YES
S18
NUMBER OF BINS : a
S19
A ≤ a?
NO
YES
S20
FINISHING MODE F = 1?
NO
YES
S21
Sx = A4/B5?
NO
C
YES
S22
OTHER INPUT PROCESSING
S23
PRINT SW ON?
YES
NO
S25
ADF START SW ON?
NO
YES
S24
COPYING F ← F
RETURN
S26
ALARM F1 ← 1
S27
INHIBITION OF SYSTEM OPERATION
S28
PRINT SW ON?
YES
NO
S36
ADF START SW ON?
NO
YES
S29
NON-SORTING MODE F ← 1
S30
ALARM F1 ← 0
S30a
CANCELLATION OF SYSTEM OPERATION INHIBITION
S37
COPYING F ← 1
C
S31
ALARM F2 ← 1
S32
INHIBITION OF SYSTEM OPERATION
S33
PRINT SW ON?
YES
NO
S38
ADF START SW ON?
NO
YES
S34
FINISHING MODE F ← 0
S35
ALARM F2 ← 0
S35a
CANCELLATION OF SYSTEM OPERATION INHIBITION
S39
COPYING F ← 1

S4
INDICATION PROCESSING

S60
ADF MODE F = 1?
NO
YES
S61a
LED180 ← OFF
S62a
LED180 ← ON
S61b
LED181 ← ON
S62b
LED181 ← OFF
S63
NON-SORTING MODE F = 1?
NO
YES
S64a
LED152 ← ON
S64b
LED153 ← OFF
S64c
LED154 ← OFF
S65
SORTING MODE F = 1?
NO
YES
S66a
LED152 ← OFF
S66b
LED153 ← ON
S66c
LED154 ← OFF
S67a
LED152 ← OFF
S67b
LED153 ← OFF
S67c
LED154 ← ON
S68
FINISHING MODE F = 1?
NO
YES
S69a
LED156 ← OFF
S69b
LED157 ← ON
S70a
LED156 ← ON
S70b
LED157 ← OFF
D

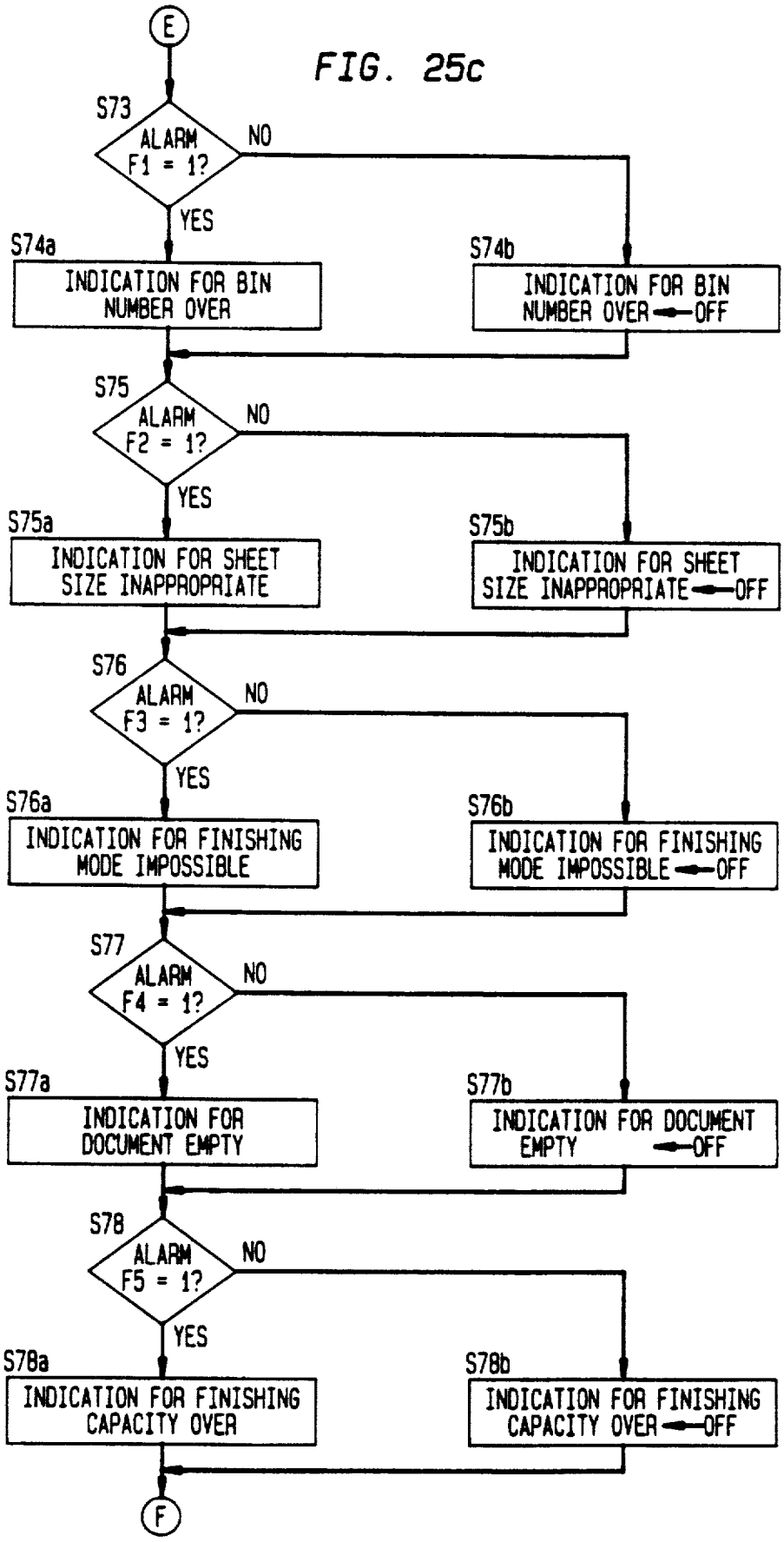
E
FIG. 25c
S73
ALARM F1 = 1?
NO
YES
S74a
INDICATION FOR BIN NUMBER OVER
S74b
INDICATION FOR BIN NUMBER OVER ←OFF
S75
ALARM F2 = 1?
NO
YES
S75a
INDICATION FOR SHEET SIZE INAPPROPRIATE
S75b
INDICATION FOR SHEET SIZE INAPPROPRIATE ←OFF
S76
ALARM F3 = 1?
NO
YES
S76a
INDICATION FOR FINISHING MODE IMPOSSIBLE
S76b
INDICATION FOR FINISHING MODE IMPOSSIBLE ←OFF
S77
ALARM F4 = 1?
NO
YES
S77a
INDICATION FOR DOCUMENT EMPTY
S77b
INDICATION FOR DOCUMENT EMPTY ←OFF
S78
ALARM F5 = 1?
NO
YES
S78a
INDICATION FOR FINISHING CAPACITY OVER
S78b
INDICATION FOR FINISHING CAPACITY OVER ←OFF
F

S6
FINISHING PROCESSING

S200
FINISHING MODE F = 1?
NO
N
YES
S202
FINISHING MODE INHIBITION F = 1?
NO
YES
S203
STAPLE TRAY SENSOR OFF?
NO
S203a
ALARM F6←1
N
YES
S204
FINISHING MODE INHIBITION F←0
S205
ALARM F6 = 1?
NO
YES
S206
ALARM F6←0
S401
NON-SORTING MODE F = 1?
NO
YES
S402
A = 1?
NO
V
YES
S403
M ≥ 2?
NO
V
YES
L
S404
GROUPING MODE F = 1?
NO
YES
V
S405
SORTING MODE F = 1?
NO
N
YES
S406
M = 1?
YES
V
NO
L

COPYING APPARATUS HAVING A SORTER WITH A SHEET STAPLING FUNCTION WITH STAPLE MODE CANCELLATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a copying apparatus, more particularly, having a sorter so that sheets having images transcribed by a copying machine can be distributed and stapled accordingly after being ejected from the copying machine.

2. Description of the Related Art

Recently, responding to the increasing demand for automatized paper handling system for the copying machines, the optional systems such as the automatic document feeding system and the sorting system designed for sorting or grouping copied sheets have been developed and commercialized in various types one after another. The users of the copying machines are now requiring the sorter-finisher system capable of automatically binding and stacking sheets which have been distributed in the sorting system, and this type sorter-finisher system has already been commercialized for some of large-sized copying machines.

For a simple sorter, a movable bin type sorter is conventionally proposed, wherein a plurality of bins stacked in the vertical direction can independently move and, at the same time, each space between bins can be widened, whereby sheets are distributed and sorted into the bins sequentially from the top bin to the bottom bin. Incidentally, when such a movable bin type sorter is provided with a sheet stapling function, the bins are so arranged to be able to move sequentially from the bottom bin to a sheet take-out position, where sheets are then delivered to a stapling unit. Therefore, since the sheets are distributed and sorted into the bins sequentially from the top bin, lower bins having no stored sheets need to be moved at first to the sheet take-out position, as in the case of a stapling operation, whereby much lost time occurs.

In contrast, with a sorter having a sheet stapling function, where a non-sorting mode is selected as an operation mode and when the number of copy sets is set to [more than] 2 *or more*, sheets having the same image formed thereon are stored into the same bin. In this case, if the stapling mode is selected to execute the stapling operation, the sheets having the same image formed thereon are pointlessly stapled.

Further, with this type of sorter, when the sheet size for the copying operation is changed during the copying operation in the stapling mode, the correct stapling operation for different sizes of sheets is impossible even if the change of sheet size is acceptable for the stapling operation. Therefore, when moving to the stapling operation, sheets are poorly stapled.

Furthermore, there is a possibility that an operator may erroneously select the stapling mode when initially designating an operation mode. In this case, if the operator realizes that a mistake has been made in the sorting operation, the operator may stop the copying operation. However, such a procedure is cumbersome, causing much inconvenience. Additionally, when the stapling mode is selected and when any sheets remain in a stack tray, the remaining sheets and other newly-stapled sheets are mixed with each other and exceed the capacity of the stack tray, thereby disadvantageously causing sheets to be jammed and poorly stored.

With the above-mentioned sorter, sheets distributed and stored in each bin need to be taken out and delivered to the stapling unit. For example, as a well-known sheet take-out mechanism, a mechanism for taking out sheets distributed and stored in each bin, catching them with pivotal arms and a mechanism for feeding sheets to a stapling unit with a feeder are disclosed in U.S. Pat. Nos. 4,361,393 and 4,248,525. However, such a pivotal arm type or a feeder type sorter becomes mechanically complicated and large-sized, and is not applicable to a small-size copying apparatus for general users.

Therefore, the inventors of the present invention have thought of a mechanism, wherein each bin having sheets distributed and stored therein is lowered sloping down to a sheet take-out position so that the sheets slide down out of the bin to a transport unit for transporting the sheets to a stapling unit due of their own weight, whereby the sheets are positively fed to the transport unit through pinch roller pairs for taking out sheets. However, this mechanism has a problem in that the alignment of sheets is disturbed unless the pinch roller pairs timely catch the sheets.

On the other hand, in order to transport a plurality of piled sheets from one tray to another tracing an almost arcform curve, as a well-known method, an arcform transport path is constituted of guide plates and a plurality of roller pairs are disposed to have the transport path between each pair of them, whereby sheets are subjected to a transporting force. In this case, any pair of rollers facing each other rotates at the same peripheral velocity. However, with the sheet transport apparatus, due to the arcform transport path, the distance for sheets passing outside the path is little longer than that of sheets passing inside the same path. When inside rollers and outside rollers rotate at the same peripheral velocity as mentioned above, the sheets passing outside the path reach an outlet of the path later than the sheets passing inside the same path. Therefore, when the outside sheets fall from the outlet onto a tray, the inside sheets having already left the path act, as a load, on the outside sheets going out later, thereby diadvantageously disturbing the alignment of the sheets on the tray and causing the outside sheets to be jammed between the guide plates.

SUMMARY OF THE INVENTION

In view of the above-mentioned problems, an object of the present invention is to provide a copying apparatus wherein, since in the case of a stapling operation bins having no sheets sorted therein need not to be moved to a sheet take-out position, the stapling operation can be executed immediately after a sorting operation, whereby loss time is eliminated owing to having no special time required for preliminary movement of bins.

Another object of the present invention is to provide a copying apparatus which can prevent sheets having the same image formed thereon from being pointlessly stapled.

Still another object of the present invention is to provide a sheet handling apparatus, wherein even if a stapling mode is erroneously selected in the case of setting an operation mode at the start of copying operation, only the stapling mode is canceled without discontinuing the copying operation or the sorting operation.

Still another object of the present invention is to provide a sheet handling apparatus which can keep newly-stapled sheets from being mixed with sheets remaining in a stack unit, thereby preventing sheets from being jammed or poorly stored in the stack unit due to the amount of stored sheets exceeding the capacity of the stack unit.

Still another object of the present invention is to provide a copying apparatus which can keep sheets from slipping down out of each bin because of their own weight when each bin is lowered sloping down to a sheet take-out position, thereby positively preventing the alignment of sheets from being distributed.

Still another object of the present invention is to provide a copying apparatus which can prevent a set of sheets including different sizes of sheets from being transported and stapled in a stapling unit.

The other object of the present invention is to provide a transport apparatus which, when transporting a plurality of piled sheets through an arcform transport path, can eliminate the possibility that sheets are transported in disorder on a tray and that sheets transported outside the path are jammed.

To attain the above-mentioned object, a copying apparatus according to the present invention comprises: sorting means for sorting sheets into a plurality of bins sequentially from the top bin to the bottom bin; stapling means for stapling the sheets taken out of each bin; first control means which, after the sorting operation, moves each bin having sheets stored to the position where sheets are taken by a take-out means; and second control means which, during the sorting operation, moves bins other than those assigned for the input number of copy sets. With this copying apparatus, when a stapling mode is selected, lower bins other than a specified number of upper bins corresponding to the number of copy sets designated by an operator are moved to the sheet take-out position during the copying operation and sheets are sorted into the upper bins sequentially from the top bin. More specifically, lower bins excluding a specified number of upper bins, which will not be used in sorting sheets, are moved to the sheet take-out position simultaneously with the sorting operation during the copying operation. Therefore, in the case of the stapling operation, loss of time due to preliminary movement in the sorter does not occur. Further, since the bins having sheets sorted therein are moved to the sheet take-out position directly from the lowest bin, loss time is totally eliminated.

Further, a copying apparatus according to the present invention comprises: sorting means for sorting sheets into a plurality of bins in a sorting mode and stored in one of the bins in a non-sorting mode; stapling means for stapling the sheets stored in each of the bins in a stapling mode but not stapling them in a non-stapling mode; and means for inhibiting an image forming means from starting to operate and alarms when both the non-sorting mode and the stapling mode are selected at a time and when the input number of copy [set a is more than] *sets is 2 or more*. With this copying apparatus, when both the non-sorting mode and the stapling mode are selected at a time and when the number of copy sets is set to [more than] 2 *or more*, the copying operation is inhibited and an alarming is issued. Therefore, preventing sheets having the same image formed thereon from being pointlessly stapled.

Further, a sheet handling apparatus according to the present invention comprises: sorting means for sorting sheets into a plurality of bins; stapling means for stapling the sheets stored in each of the bins after the sorting operation; means for designating the stapling mode to execute the stapling means; and canceling means for canceling the stapling mode during the sorting operation in the stapling mode, and continuing the sorting operation even after canceling the stapling mode. With this sheet handling apparatus, when it is required to execute the copying operation in the non-sorting mode, an operator has only to input a printing start signal to cancel the stapling mode and to execute the copying operation. Even if the stapling mode is erroneously selected, the stapling mode can be canceled by the canceling means and no stapling operation is executed after canceling the stapling means.

Further, a sheet handling apparatus according to the present invention comprises: sorting means for sorting sheets into a plurality of bins; stapling means for stapling the sheets stored in each of the bins after the sorting operation, and discharging the stapled sheets to a stack unit; and control means for inhibiting the stapling means for discharging the stapled sheets to the stack unit in the case that stapled sheets are remaining in the stack unit when the stapling mode is designated. With this sheet handling apparatus, when the stapling mode is designated and when any sheets remaining in the stack unit is detected, at least the operation for discharging sheets into the stack unit is inhibited or operations following the sorting operation are inhibited, thereby preventing newly stapled sheets from being mixed with the sheets remaining on the stack unit.

Further, a copying apparatus according to the present invention comprises: an image forming means; stapling means; sorting means having a plurality of bins stacked in the vertical direction, which each bin has a stopper to regulate sheets from sliding down and is lowered sloping down to a sheet take-out position after the storing operation; means for transporting the sheets taken out of each bin lowered down to the sheet take-out position to the stapling means; a guide member disposed at the sheet take-out position and having a guiding surface to guide the sheets on each bin to the transport means, wherein the guiding surface is arranged so as to be located above the stopper when each bin has been lowered sloping down to the sheet take-out position; and a pair of pinch rollers disposed at the sheet take-out porition and capable of catching the sheets on each bin and delivering them to the transport means immediately before the stopper comes below the guiding surface when each bin is lowered sloping down. With this copying apparatus having the previously-mentioned construction, while each bin is lowered sloping down to the sheet take-out position, the stopper for preventing sheets from sliding down keeps stopping the edges of sheets on the bin. Then, the pair of pinch rollers catches the sheets immediately before the stopper comes below the guiding surface of the guide member, and transport them to the stapling means. More specifically, when each bin is lowered to the sheet take-out position, sheets on the bin start to slide toward the transport means because of their own weight. In this case, the pair of pinch rollers timely catches the sheets, thereby preventing the alignment of the sheets from being disturbed.

Further, a copying apparatus according to the present invention comprises: sorting means for sorting sheets into a plurality of bins; stapling means for stapling the sheets transported from each of the bins; means for stapling the sheets transported from each of aid bins; means for detecting the size of sheet being sorted into the bins; and control means for inhibiting the stapling operation when the size of sheet being sorted into the bins differs from the size of sheet selected at the start of the copying operation. With this copying apparatus, when the size of sheet being sorted into the bins differs from that of sheets previously stored in the bin because the sheet size is changed during the copying operation is the stapling mods, the stapling mode is canceled. Therefore, sheets are neither transported nor stapled in the stapling means in a state unsuitable for the stapling operation, i.e. in a state where different sizes of sheets are mixed, therehy preventing the sheets from being poorly stapled.

Further, a sheet transported apparatus according to the present invention which transports a plurality of piled sheets through an arciorm transport path, wherein at least one pair of rollers is arranged so that a roller located outside the arcform transport path has a higher transporting speed than that of a roller located inside the same path. With such a structure, the roller located outside the almost arcform transport path rotates at a higher peripheral velocity than that of the roller located inside the same path. Therefore, outside sheets covering a relatively longer distance are transported faster than the inside sheets covering a shorter distance, and each sheet reaches the outlet of the path at the same time or the outside sheets reach that position a little faster than the inside sheets, thereby eliminating the possibility that the inside sheets work on the outside sheets as a load when the outside sheets are ejected from the path onto a tray.

BRIEF DESCRIPTION OF THE DRAWINGS

These and other objects and features of the present invention will become apparent from the following description taken in conjunction with the preferred embodiments thereof with reference to the accompanying drawings, in which:

FIG. 22a and 22b are flow charts showing a subroutine for the input processing;

FIGS. 25a, 25b, 25c and 25d are flow charts showing a subroutine for the indication processing;

DETAILED DESCRIPTION OF THE INVENTION

The embodiments of the present invention will be described below with reference to the drawings. (Composition of whole system)

Figure 1:
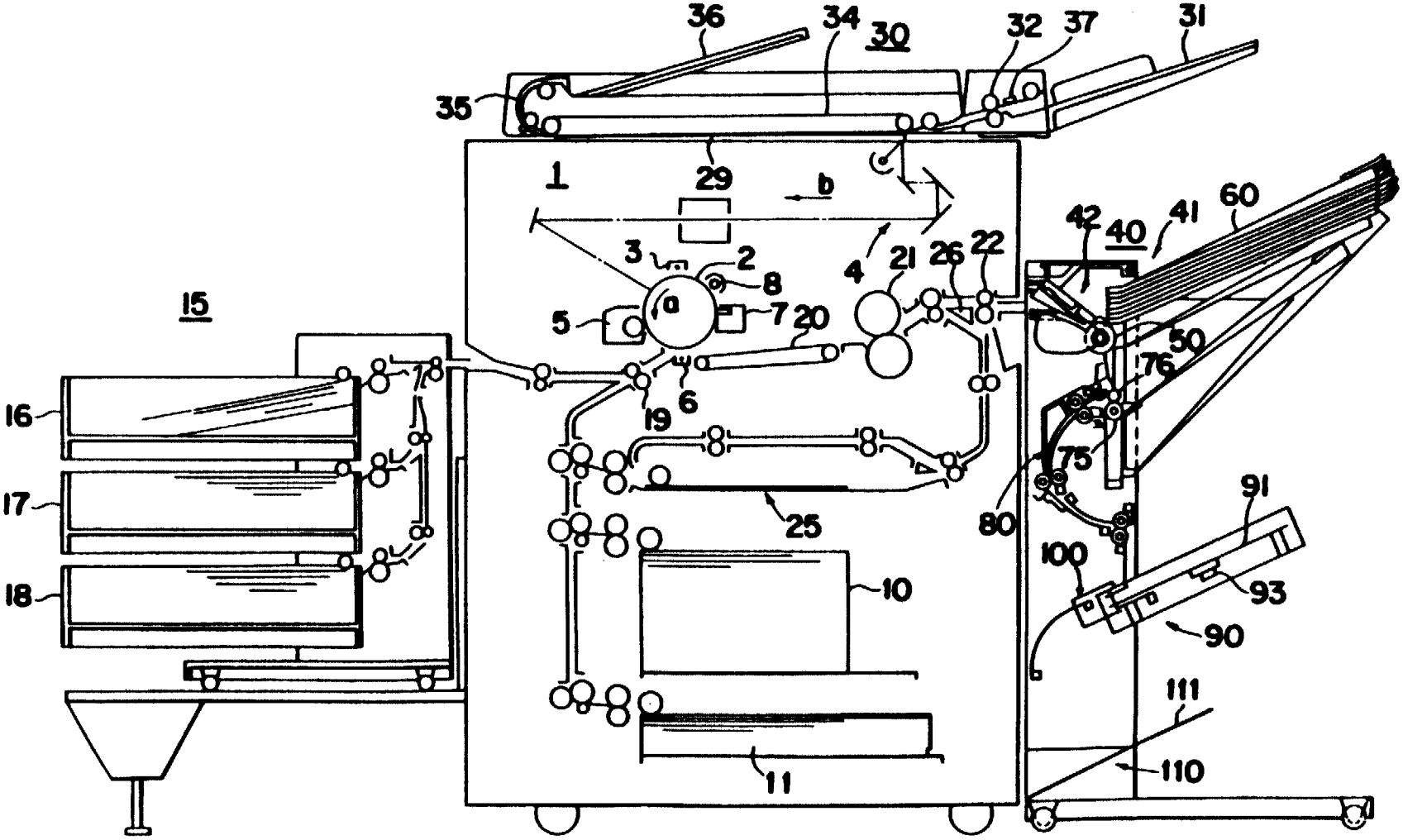
FIG. 1 is a schematic block diagram showing a copying machine and a sorter-finisher system.

A sorter-finisher system 40 is designed to be installed on the side of a copying machine 1 as shown in FIG. 1, and the copying machine 1 is provided with an automatic paper feeding unit 15 and an automatic document feeding unit 30 (hereinafter referred to as ADF).

The copying machine 1 operates on the principle of the commonly known electrophotography. In this copying machine 1, a photosensitive drum 2 to be turned towards the direction of an arrow a is charged with a certain amount of static electricity by a static electricity charger 3, and the document set to a specified position by the ADF 30 is exposed to the light through a slit when an optical system 4 scans the document towards the direction of an arrow b. This causes the electrostatic latent image formed on the photosensitive drum 2 to be developed into the toner image by a magnetic brush type developing device 5 and then transferred onto a sheet by a transfer charger 6.

Copying sheets fed one by one selectively from the elevate type and cassette type automatic paper feeders 10 and 11 built in the copying machine 1 or the 3-stage paper feed cassettes 16, 17 and 18 of the automatic paper feeder 15 installed outside the copying machine 1 is transported to a transferring portion by a timing roller couple 19 with specified timing. The sheet carrying the copied image is delivered to a fixing unit 21 by a conveyor belt 20 for fixing the toner image. Then, the sheet is transported to a sorting unit 41 by an ejection roller couple 22 while the passage of the sheet is detected by an ejection switch SW3 (Refer to FIG. 29) provided immediately before the ejection roller couple 22. The copying machine 1 has a built-in paper re-feeder 25, which enables duplex copy and composite copy, and a sheet transfer selection click 26 is provided before the ejection roller couple 22.

On the other hand, the photosensitive drum 2 is continued to turn towards the direction of the arrow a even after the image is transferred so that the residual toner can be removed by a blade-type cleaner 7, and simultaneously the residual electrostatic charge is erased by an eraser lamp 8 in order to prepare for the next copying operation.

The ADF 30 itself is commonly known and designed to feed documents placed on a document tray 31 one by one using a feed roller couple 32 and is set to a specified position on a glass member 29 of document rest by the rotary motion of a conveyor belt 34. After the exposure of the image, the document is ejected onto an ejection tray 36 through a transfer pass 35 as the conveyor belt 34 turns.

Figure 2:
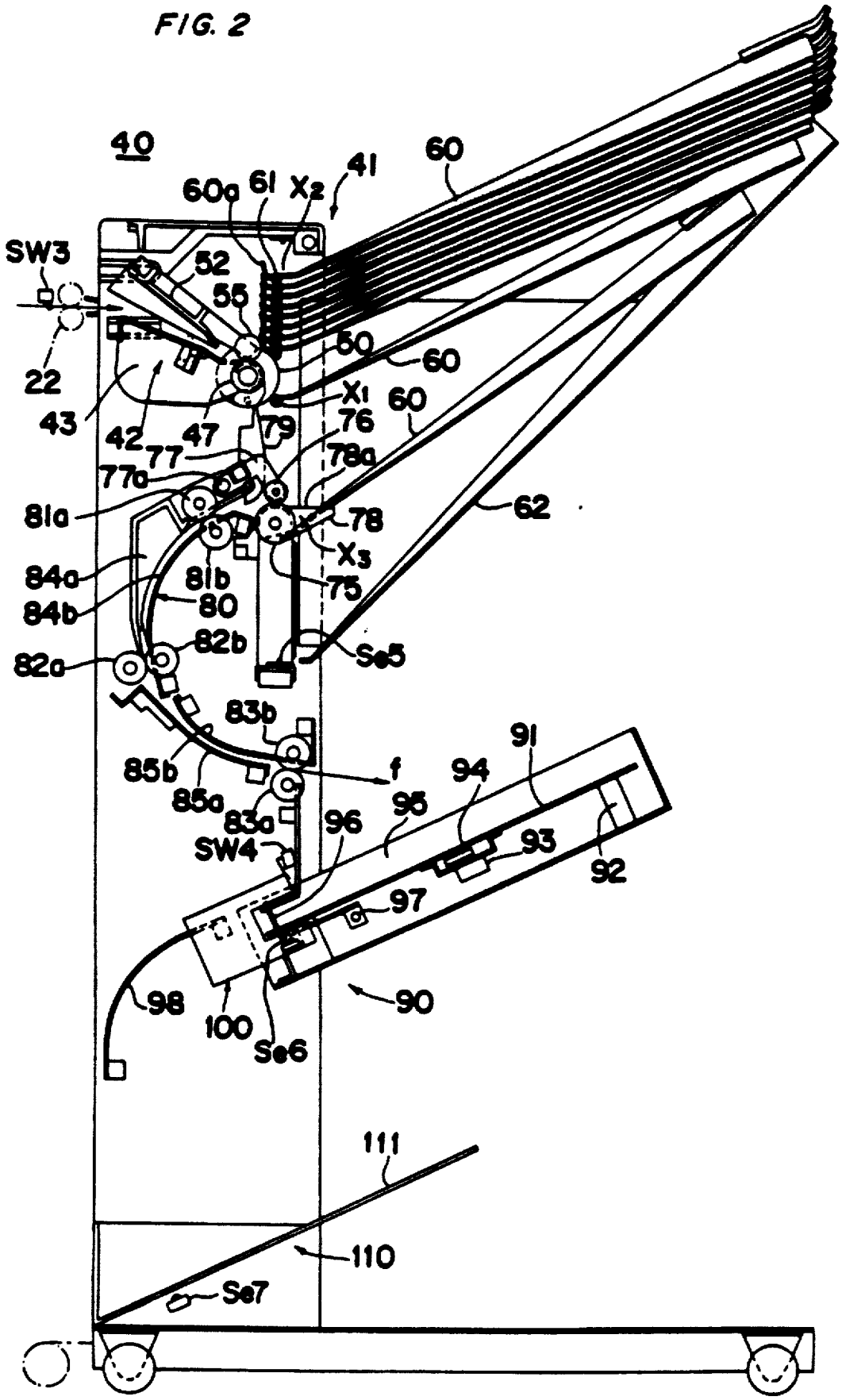
FIG. 2 is an internal composition of the sorter-finisher system.

As shown in FIG. 2, the sorter 40 comprises a sorting unit 41 for distributing sheets among bins 60, a stapling unit 90 with a stapler 100 for stapling the sheets and a stacking unit 110 for stacking the stapled sheets. In this sorter 40, the stapling unit 90 is disposed below the sorting unit 41, and the stacking unit 110 is disposed below the stapling unit 90.

(Composition and operation of sorting unit)

As shown in FIGS. 2 through 8, a plurality of clicks 60a for preventing the reverse low of the sheets and a pair of trunnions 61 are provided on one end of each bin 60. The trunnions 61 engage with a groove 65a extending longitudinally along a pair of guide units 65 (only one is shown in FIGS. 3 through 7) installed on a frame of the sorter 40 in order to regulate the movements of the bins 60 along the longitudinal direction. Another end of each bin 60 is supported by a bin holder 62. Floating cams 50, which will be explained later, shift the position of the trunnion 61 so that the intervals of the bins 60 can be increased.

Figure 3:
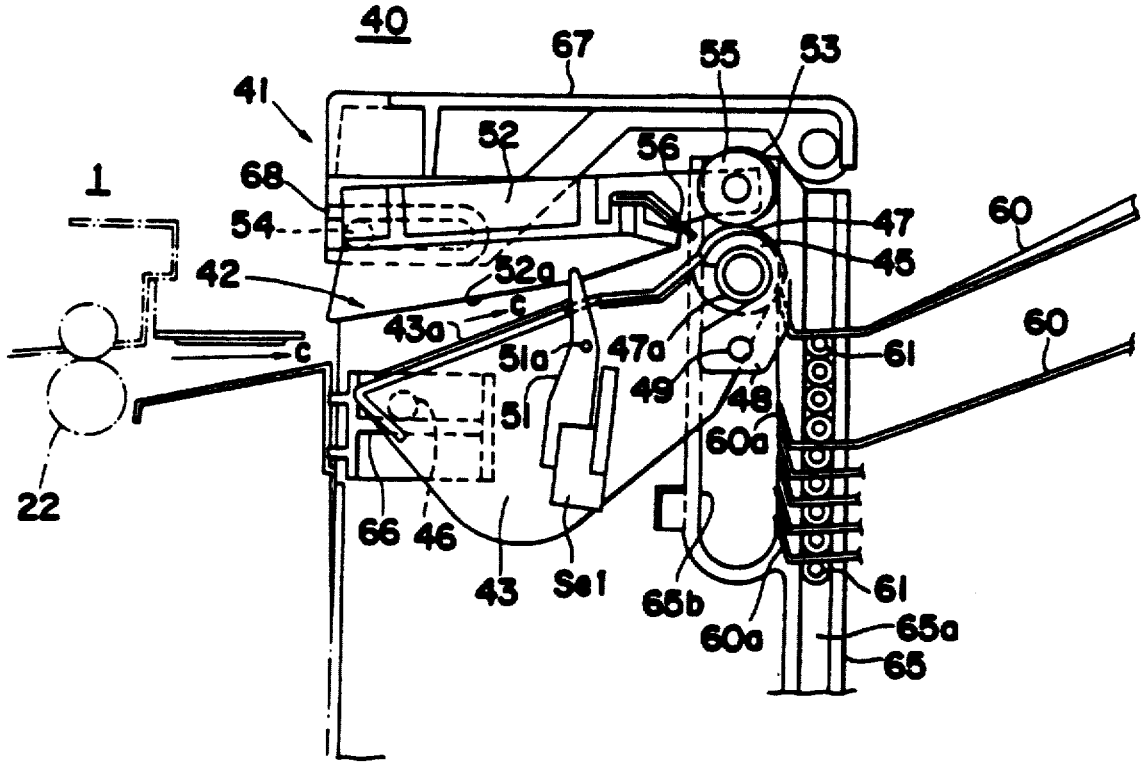
FIG. 3 is a internal composition of a sorting unit.

The sorting unit 41 distributes the sheets ejected from the copying machine 1 through relative upward and downward movement between a sheet transport unit 42 disposed opposite to the ejection roller couple 22 of the copying machine 1 and bins 60. As shown in FIG. 3, the sheet transport unit 42 comprises an upper unit 52 having a guiding surface 52a, a lower unit 43 having a guiding surface 43a, a feed roller 47 and a pinch roller 55 so that the sheet from the rollers 47 and 55 is transported to each bin 60 passing between the guiding surfaces 52a and 43a.

Figure 4:
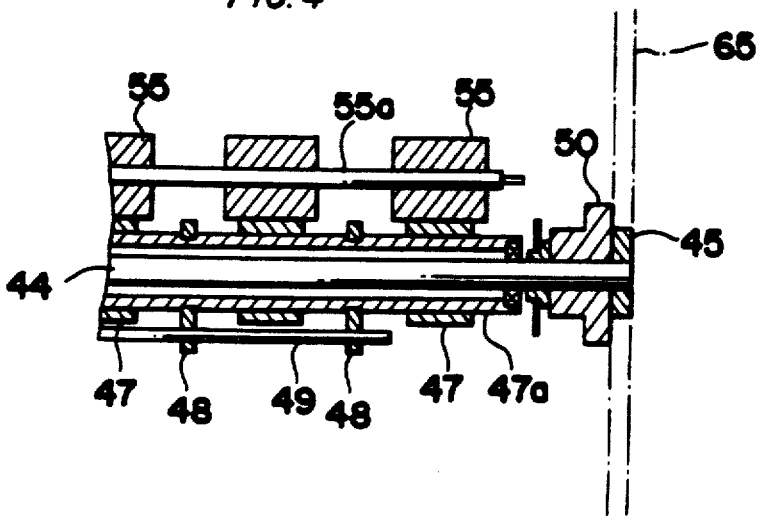
FIG. 4 is a horizontal cross-sectional view of a feed roller section of the sorting unit.
Figure 5:
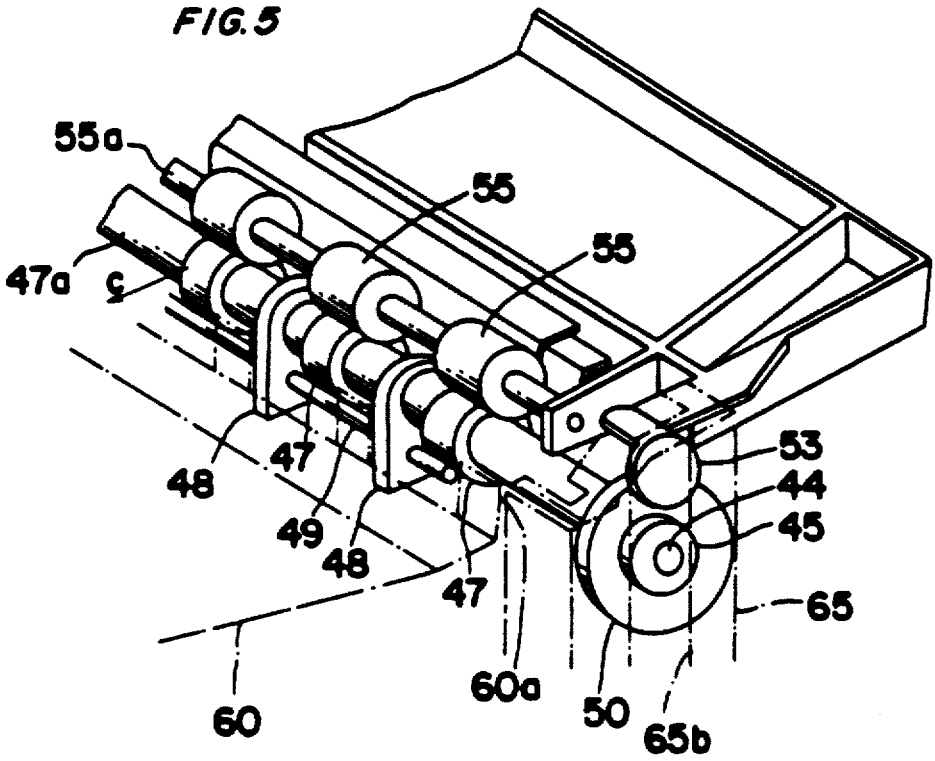
FIG. 5 is a perspective view of a conveyance unit.

One end of the lower unit 43 is supported movably in upward and downward directions by a supporting shaft 44 disposed on the side of the bins 60 orthogonally to the sheet transporting direction indicated by an arrow c. Both ends of the shaft 44 engages with a rail unit 65b installed on the guide unit 65 through a collar 45 as shown in FIGS. 4 and 5. Another end of the lower unit 43 has a pin 64 which is supported slidably on a guide member 66.

Figure 6:
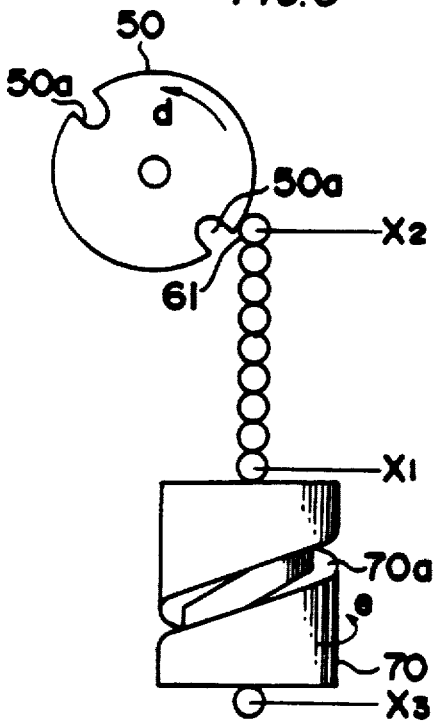
FIG. 6 is an explanatory drawing of a floating cam and fixed cam.
Figure 7:
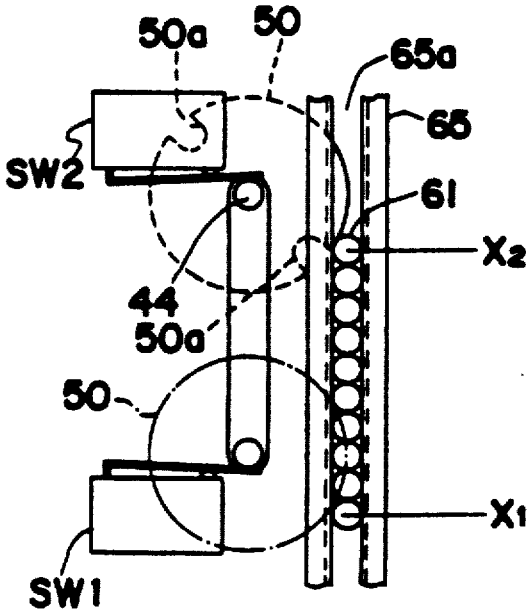
FIG. 7 is an explanatory drawing of the floating cam.

A roller shaft 47a whereto plural number of feed rollers 47 are fixed is installed on the supporting shaft 44 in a manner to permit the free rotation of the roller shaft 47a, and oscillating plates 48 are hung from the roller shaft 47a. The oscillating plates 48 are connected to each other by a rod 49, and the lower part of the oscillating plates 49 are located between the reverse flow prevention clicks 60a of the bins 60. Besides, as shown in FIGS. 6 and 7, the floating cams 50 with notches 50a and 50a formed on the circumferential surface at intervals of 180° are fixed to both ends of the supporting shaft 44. These floating cams 50 are turned 180° intermittently by the driving source separate from that of the feed rollers 47 and support not only the lower unit 43 but also the rear ends of bins 60 by means of the trunnions 61 which come to contact their circumferential surface. Furthermore, as shown in FIG. 7, the floating cam 50 can move up and down between a bottom bin position X1 and a top bin position X2, and the cam 50 can be detected by detection switches SW1 and SW2 when it has reached these positions X1 and X2. As shown in FIG. 3, the lower unit 43 is provided with an actuator 51 which turns freely round a pin 51a and a photosensor Sel which can be turned on and off when the actuator 51 turns keeping in contact with the sheet to be transported.

One end of the upper unit 52 has an engaging piece 53 which engages slidably with the rail unit 65b thereby oscillating up and down. The other end of the upper unit 52 has a pin 54 which engages slidably with a guide member 68 provided to a top cover 67 of the sorter 40 thereby sliding in horizontal direction. Pinch rollers 55 are installed pivotally to the upper unit 52 through a supporting shaft 55a. Also, a neutralizing brush 56 is installed to the upper unit 52. The pinch rollers 55 pressed against the feed rollers 47 utilizing their own weight, which are capable of being driven by the feed rollers 47.

A transmission type photosensor Se5 (Refer to FIG. 2) whose optical axis is located at the rear end of each bin 60 is installed in the sorting unit 41 so that the presence or absence of the sheets distributed among and in the bins 60 can be detected.

In the above-described composition, the floating cam 50 introduces the trunnion 61 kept in contact with the circumference into the notch 50a by every 180° turn in the direction reverse to the direction of an arrow d, thereby not only causing itself to move upward but also causing the introduced trunnion 61 to shift downward to contact the next trunnion 61. Repeating this action causes each bin 60 to shift downward by one step, while the transport unit 42 moves upward. When the sorting mode is selected, the floating cam 50 is located at the bottom bin position X1 as shown in FIG. 7, and this cam 50 increases the intervals of the bins 60 as it moves upward step by step from this position. The sheets ejected from the copying machine 1 pass between the guiding surfaces 52a and 43a and between the feed rollers 47 and the pinch rollers 55 into the bins 60 whose intervals are widened by the floating cam 50. Turning the floating cam 50 towards the normal direction or the direction of the arrow d causes the bins 60 to shift upward one by one, and the cam 50 moves downward to ether with the transport unit 42.

In the sorting unit 41 having the above-described composition, the sheets can be stored in three different modes. The first mode is the sorting mode to enable the sheet formed on each document image to be distributed among the bins 60 and sorted in the order of base number. The second mode is the grouping mode to enable the sheets formed on the same image to be distributed among the same bins 60. The third mode is the non-sorting mode to the enable the sheets to be stored (not to be distributed) only in one bin 60.

(Construction and operation of fixed cam)

Here, the explanation will be made as to fixed cams 70 and a transport unit 80 which are used for transporting the sheets distributed among the bins 60 to a staple tray 91 which will also be explained in the following.

Figure 8:
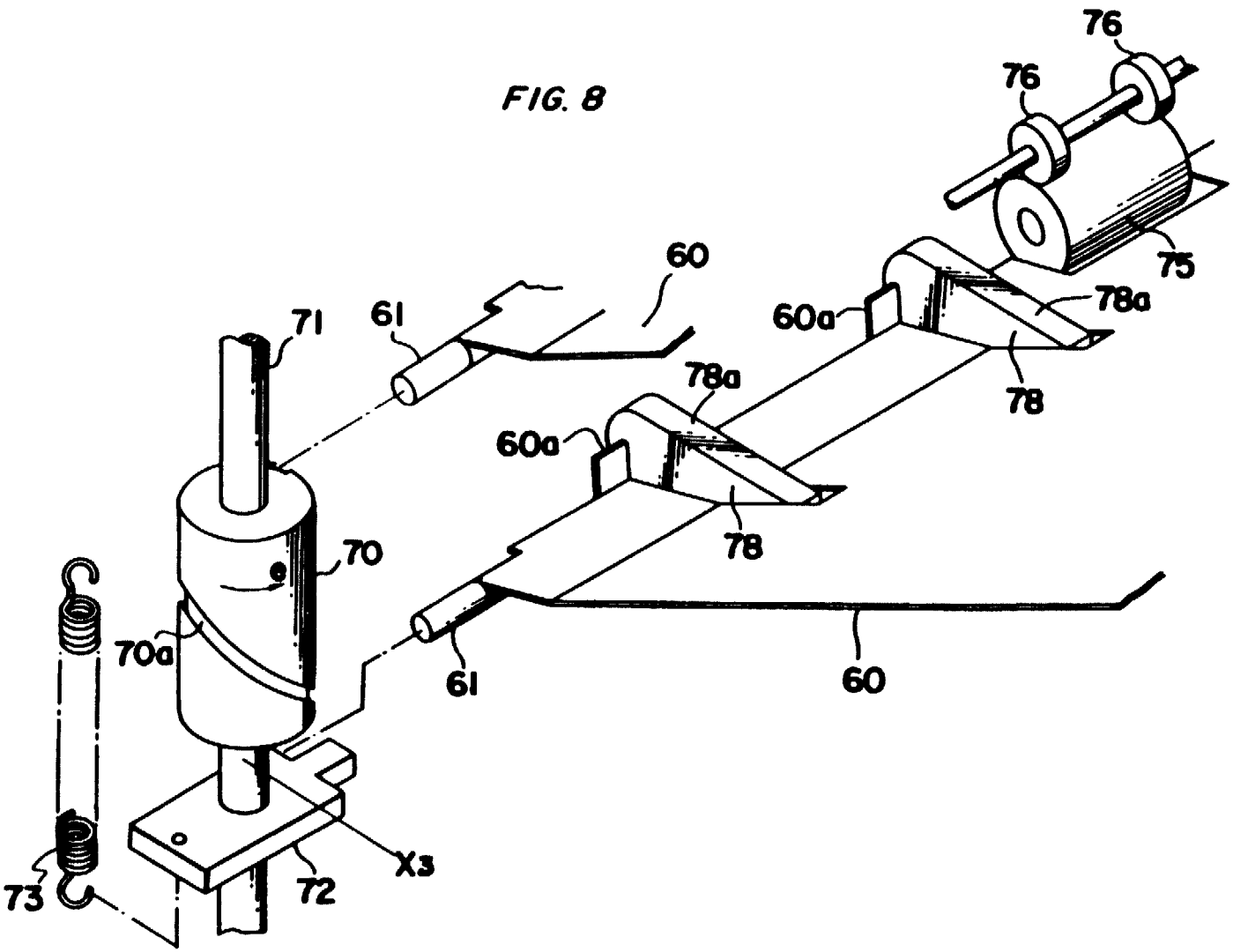
FIG. 8 is a perspective view of a sheet take-out position.
Figure 9:
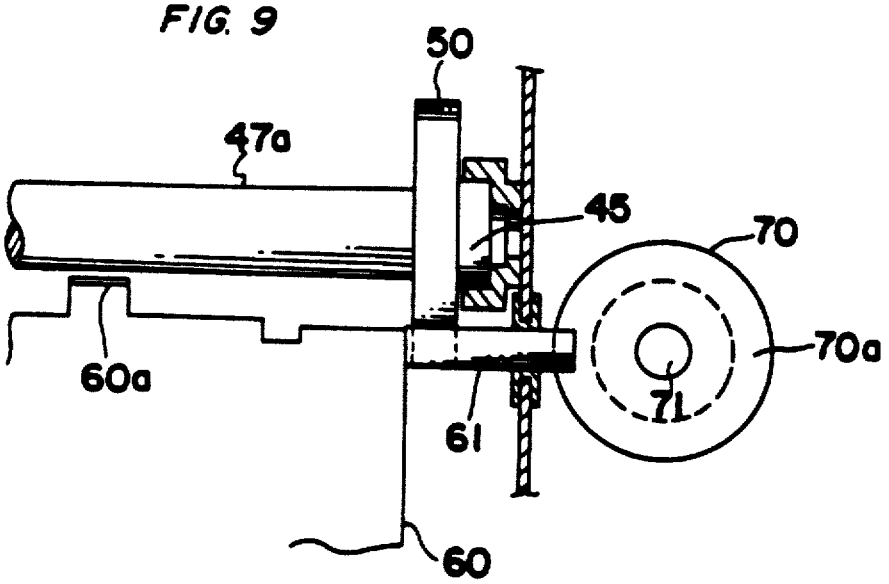
FIG. 9 is a plan view showing a mechanical relationship of a trunnion and the fixed cam.

As shown in FIG. 6 and 8, the fixed cam 70 has a spiral groove 70a formed turning once round the circumferential area of the fixed cam 70 for enabling the engagement of the trunnion 61 and the groove 70a, and the fixed cam 70 can be turned both towards the normal direction and reverse direction by a motor not shown in the drawings. That is, the fixed cam 70 turns towards the normal direction or the direction of an arrow e to lower the trunnion 61 of each bin 60, which has been shifted to the bottom bin position X1 by the floating cam 50, to a sheet take-out Position X3.

On the other hand, as shown in FIG. 8, at the sheet take-out position X3, a receiving member 72 installed to a supporting shaft 71 is not only movable up and down freely along the supporting shaft 71 but also is urged upward by a coil spring 73, thus the trunnion 61 descended to the take-out position X3 supporting flexibly. The take-out position X3 is provided with a take-out roller 75, pinch rollers 76 which are pressed against the roller 75 by their own weight and sheet guides 78. Also, as shown in FIG. 2, a sheet reverse flow prevention guide 79 is installed between the bottom bin position X1 and the take-out position X3, As shown in FIG. 8, each sheet guide 78 is installed so that a guiding surface 78a on the top of each sheet guide 78 comes a little above the position of the sheet reverse flow prevention click 60a of each bin 60 which has descended to the take-out position X3 by increasing the angle of its inclination. As shown in FIG. 2, the pinch rollers 76 are rotatably supported with a supporting shaft 77a through an arm 77 and are kept in contact with or retracted from the roller 75 by a solenoid not shown in the drawings.

Figure 10:
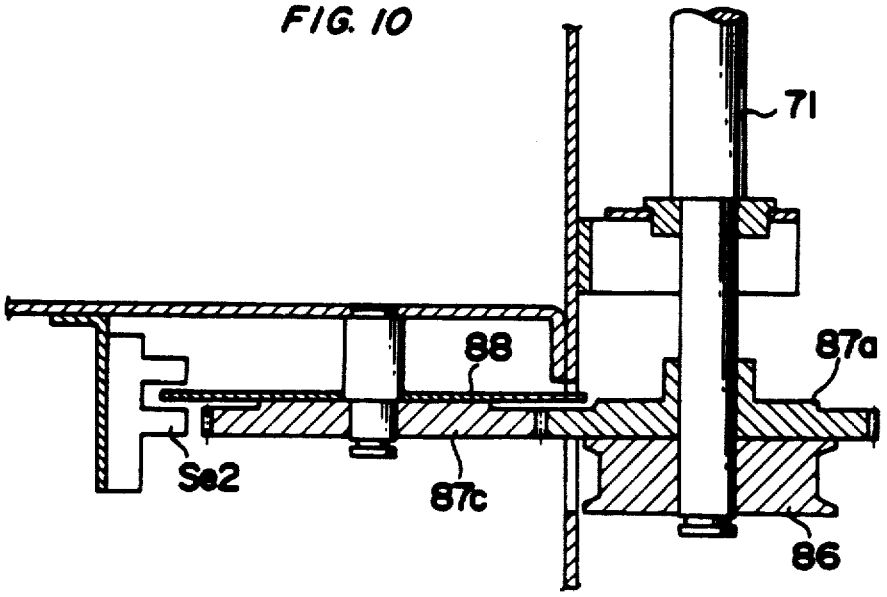
FIG. 10 is a vertical cross-sectional view showing a rotary detector of the fixed cam.

Furthermore, as shown in FIG. 10, a driving pulley 86 and a gear 87a are integrally fixed to the lower end of the supporting shaft 71 of the fixed cam 70. The gear 87a engages with a gear 87c. A disk 88 integrally fixed to the gear 87c has the notches not shown in the drawings which are detected by a photosensor Se2 in order to control the number of revolutions of the fixed cam 70.

As shown in FIG. 2, the transport unit 80 has an arcform transport path comprising transport rollers 81a and 81b through 83a and 83b as well as guide plates 84a, 84b, 85a and 85b. The transport rollers 81a, 82a and 83a are made of rubber material, while the transport rollers 81b, 82b and 83b are made of spongy material so that they are able to transport the various thickness of stacked sheets. Among the pairs of rollers provided to the transport unit 80, rollers 81a, 82a and 83a located outside the path have a higher peripheral velocity than that of rollers 81b, 82b and 83b located inside the same path.

In the above-described arrangement, the fixed cam 70 is turned once towards the direction of the arrow e after the sorting unit 41 has completed the distribution of the sheets. The trunnion 61 of each bin 60 at the bottom bin position X1 is guided by the spiral groove 70a to come down to the take-out position X3 where the trunnion 61 is supported with the receiving member 72. At this take-out position X3, the bin 60 inclines at a larger angle than it does at the bottom bin position X1 so that the sheets distributed and stored slide down on the guiding surfaces 78a of the guides 78 due to their own weights. The take-out roller 75 overlaps with the bin 60 so that the end of the sheets are caught between the rollers 75 and 76 immediately before the bin 60 has reached the take-out position X3, that is, immediately before the clicks 60a come down below the guiding surface of the sheet guide 79, and then the sheets are transported to the transport rollers 81a and 81b by the rollers 75 and 76. Even when the sheets are curled downward, the sheets can be transported between the guide plates 84a and 84b without fail guided by the guides 78 and the take-out roller 75. Also, even when the sheets are curled upward, the sheets are transported between the guide plates 84a and 84b guided by the reverse flow prevention guide 79.

Figure 14A:
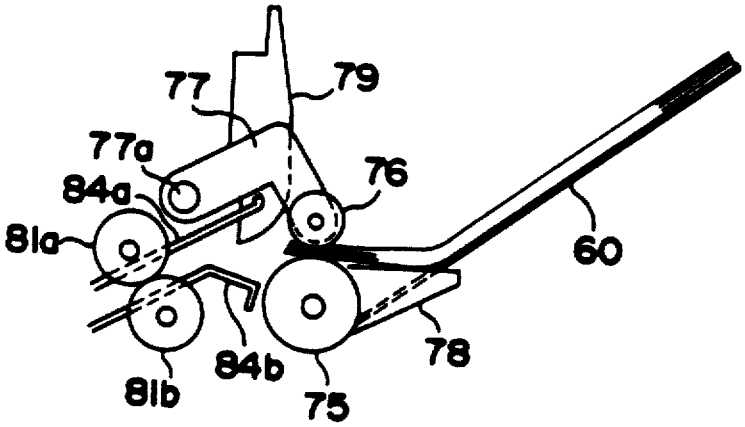
FIGS. 14a and 14b are explanatory drawings showing an operation of a sheet take-out unit.
Figure 14B:
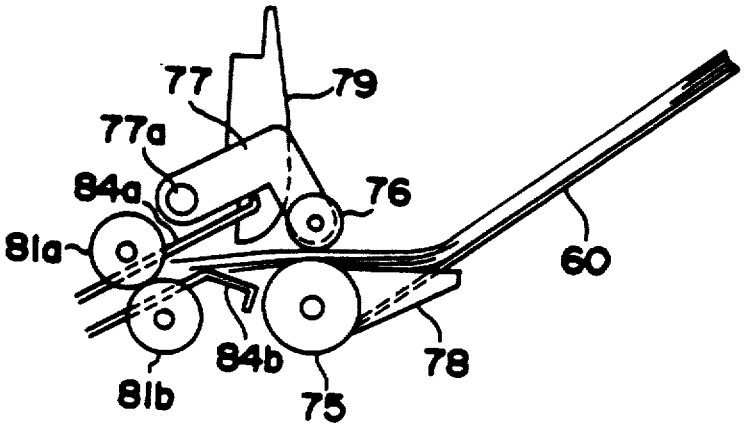

Further, as shown in FIG. 14a, immediately before the clicks 60a on the bin 60 for preventing the sheets from sliding down come below the guiding surface of the sheet guide 79, the pinch rollers 76 catch the end portion of the sheets together with the roller 75, thereby maintaining the alignment of sheets. However, as shown in FIG. 14b, if the pinch rollers 76 are late in catching the sheets, the sheets start to slide down because of their own weights, whereby the alignment of the sheets is disturbed.

When the sheets are transported by the rollers 81a and 81b, a solenoid not shown in the drawings is turned off (off is initial state) so that the pinch rollers 76 move upward away from the top of the take-out roller 75. On the other hand, immediately before the bin 60 has reached the take-out position X3, the solenoid is turned on to nip the sheets between the pinch rollers 76 and the take-out rollers 75, and the take-out rollers 75 and the transport rollers 81a, 81b, 82a, 82b, 83a and 83b are driven to run respectively, and this causes the sheets to be transported onto the staple tray 91 through the transport rollers 83a and 83b as indicated by an arrow f in FIG. 2.

Figure 15A:
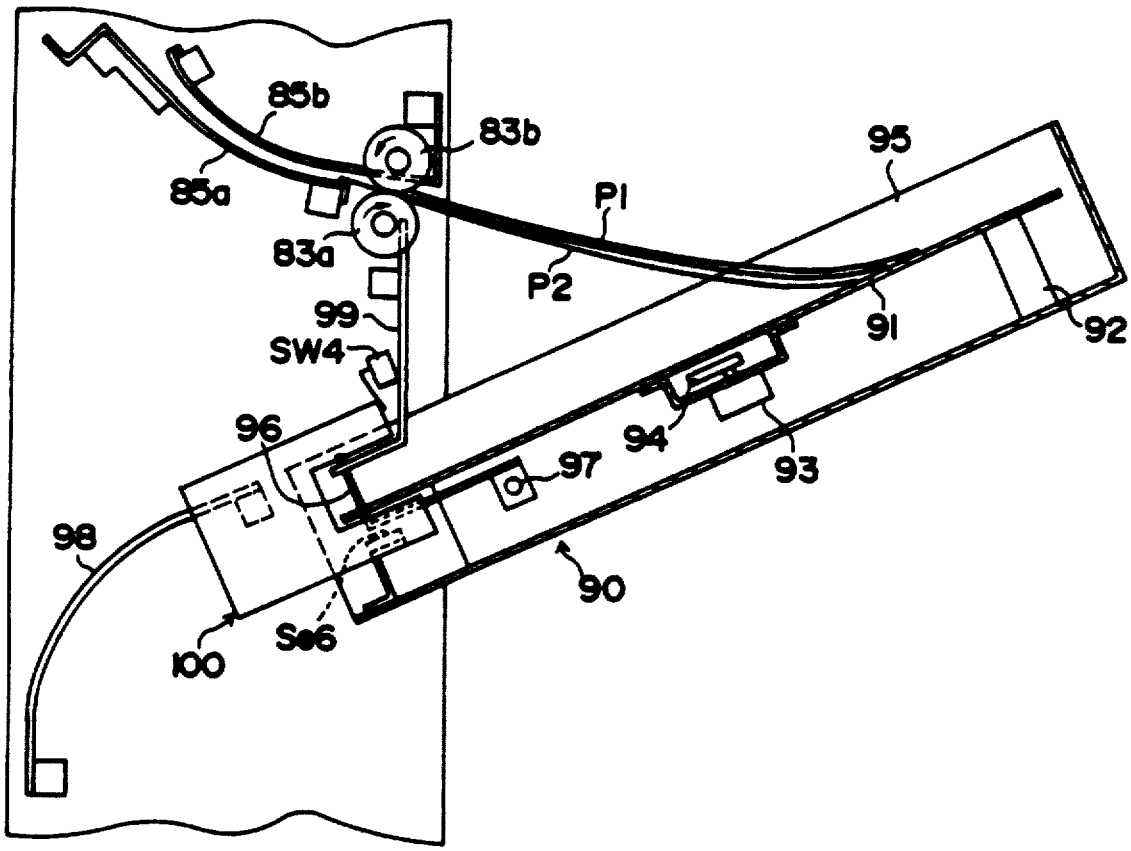
FIGS. 15a, 15b and 15c are explanatory drawings showing a condition of discharging piled sheets to a staple tray.
Figure 15B:
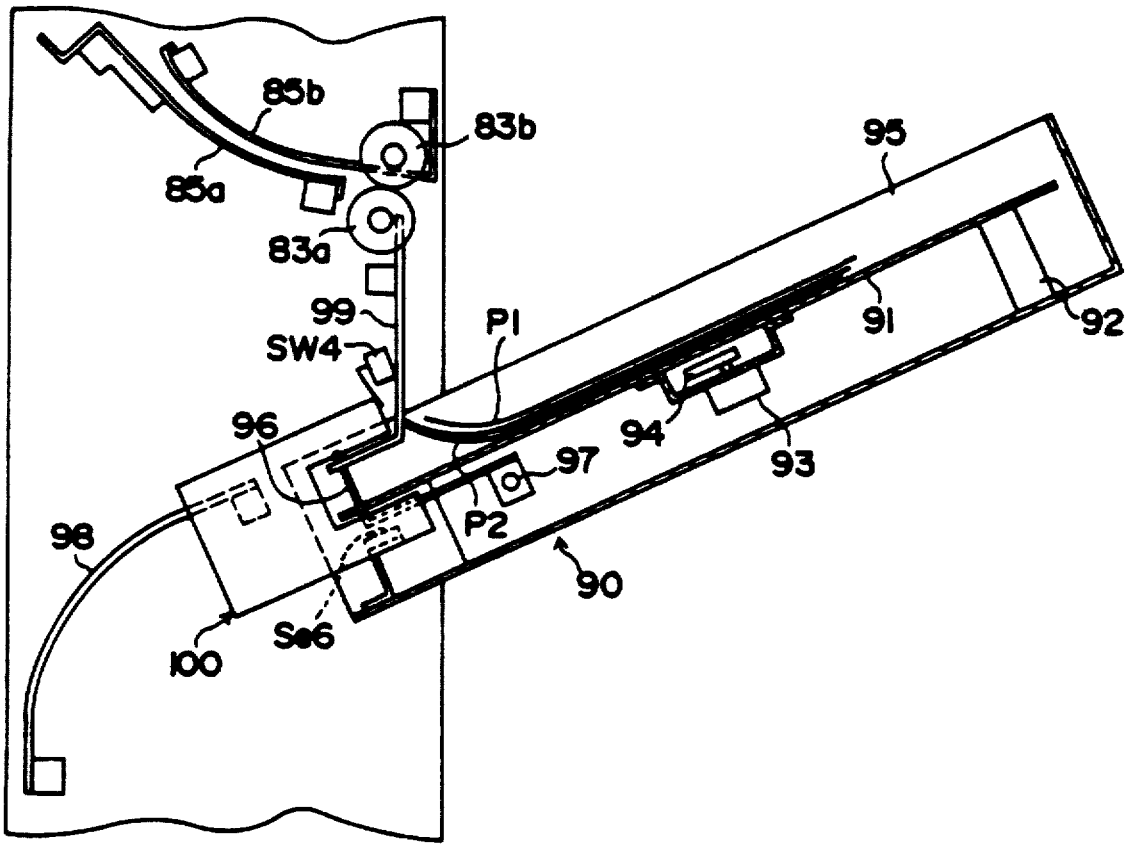

When transported through the path, outside sheets cover a longer distance than inside sheets because of the almost arcform path. Therefore, in the case of transporting a plurality of sheets, if the inside rollers 81a, 82a and 83a and the outside rollers 81b, 82b and 83b have the same peripheral velocity, outside sheets are not completely ejected from the rollers 83a and 83b even when inside sheets have been ejected, thereby causing the inside sheets to work on the outside sheets as a load. Therefore, there is a possibility that the alignment of the sheets having fallen on the staple tray 91 is much disturbed. Further, as shown in FIG. 15b, there is a possibility that the trailing edges of the outside sheets P2 are put between a vertical guide plate 99 and the inside sheets P1, thereby causing paper jamming.

Figure 15C:
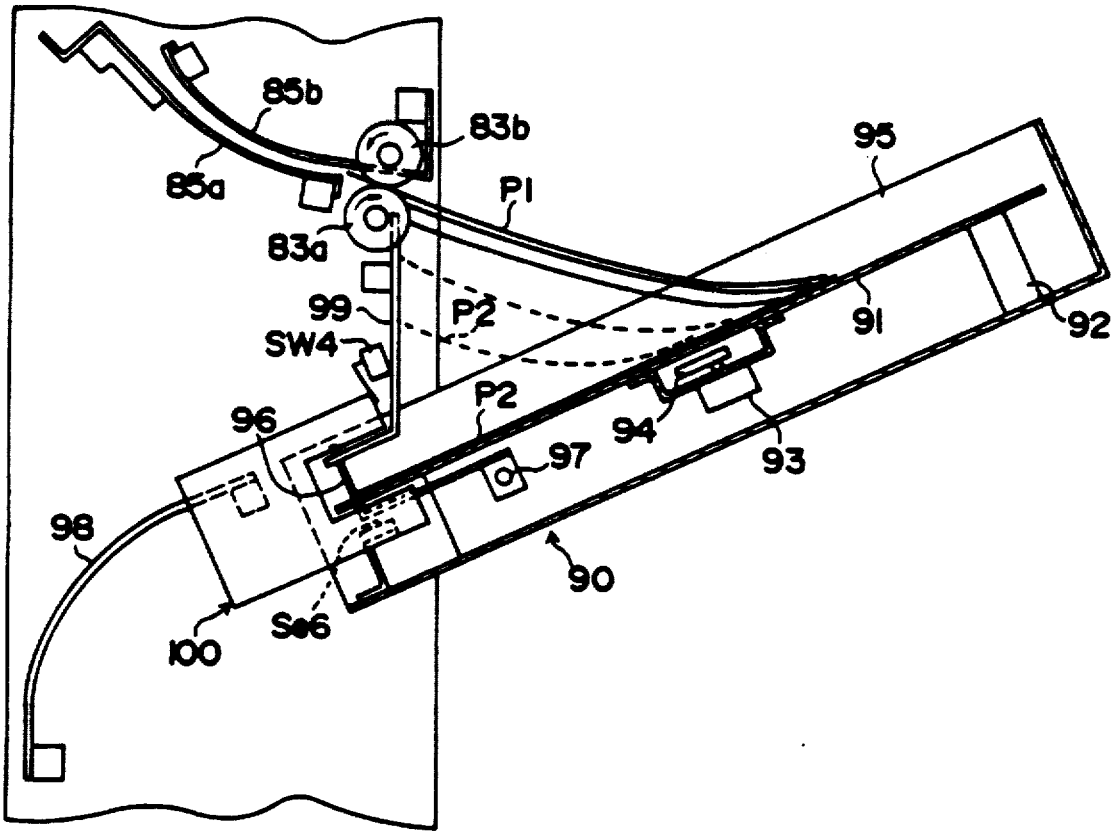

However, with this embodiment, since the peripheral velocity of the outside rollers are set higher than that of the inside rollers, the outside sheets are ejected from the rollers simultaneously with or earlier than the inside sheets Therefore, as shown in FIG. 15c, the sheets independently fall on the staple tray 91 one by one, thereby eliminating the possibility of disturbing the alignment of sheets on the staple tray 91 or causing paper jamming.

In order to set the peripheral velocity of the outside rollers higher than that of the outside rollers, the reduction ratio of the inside rollers relative to a rotation gear motor should be set higher than that of the outside rollers when both rollers have the same diameter. When both rollers have the same reduction ratio, the diameter of the outside rollers should be larger than that of the inside rollers.

In this embodiment, in order to increase the angle of inclination of the bins 60 at the take-out position X3 to facilitate the sheets on the bins 60 sliding downward by their own weight, the interval between the bottom bin position X1 and the take-out position X3, that is, the stroke of the bins 60 that is to move between these two points can be made relatively large.

As explained in the foregoing, as the fixed cam 70 turns once respectively, the bins 60 are brought down step by step to the take-out position X3, and the sheets distributed among the bins 60 are transported onto the staple tray 91 by the transport unit 80.

Each bin 60 brought down to the take-out position X3 is supported by the receiving member 72. And the bin 60 returns to its upward original position by the rotation of the fixed cam 70 towards the direction reverse to the arrow e, and the floating cam 50 towards its normal direction or the direction of the arrow d after all the sheets distributed among the bins 60 are taken out.

(Construction and operation of stapling unit)

As shown in FIG. 2 the stapling unit 90 comprises the staple tray 91, a motor to vibrate the staple tray 91, side guide plates 95, a stopper 96 and a stapler 100. The staple tray 91 is oscillatably installed on a supporting shaft 92 is to serve as a supporting point, and the staple tray 91 is vibrated by the centrifugal force of an eccentric weight 94 turned by a motor 93. This vibration causes the sheets which have been transported from the transport unit 80 to be trued up while they are regulated by the stopper 96.

Figure 11:
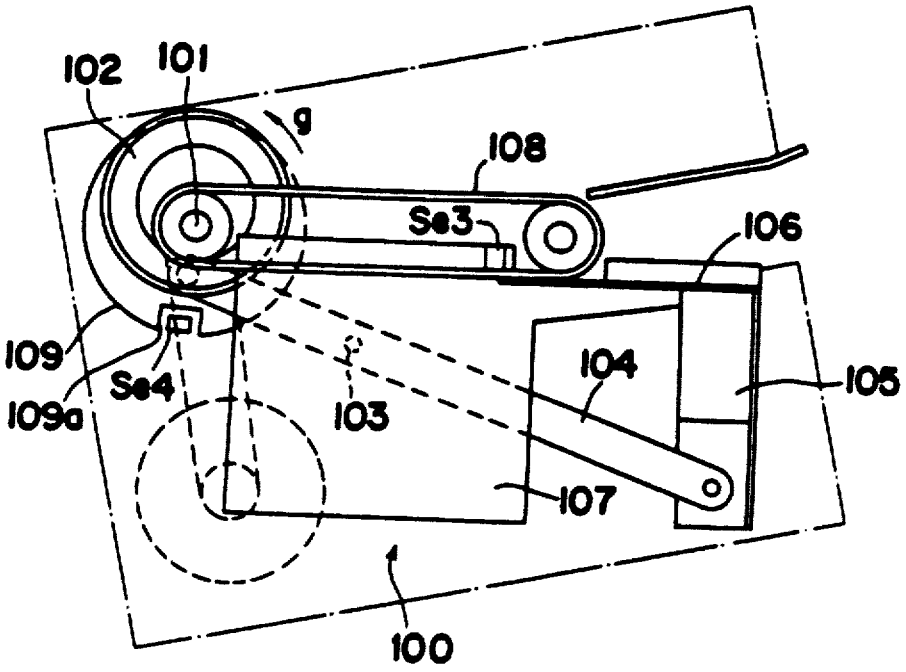
FIG. 11 is a plan view of a stapler.

As shown in FIG. 11, the stapler 100 comprises a fixed output shaft 101 of a motor, an oscillating arm 104 on a pin 103 to serve as a supporting point and a cam 102 whose circumferential part is connected to a head 105 so that the rotation of the cam 102 towards the direction of an arrow g by the motor causes the head 105 to move upward through the arm 104, and a staple 106 binds the sheets trued up on the tray 91. The staples 106 are contained in a cartridge 107 and transported to the head 105 by a conveyor belt which is driven to turn by the output shaft 101 of the motor.

The stopper 96 is installed on a supporting shaft 97 to serve as a supporting point so that the stopper 96 can be turned by a solenoid not shown in the drawings. The stopper 96 is normally locked on the lower end of the staple tray 91 to determine the end position of the sheets. When the solenoid is turned on, the stopper 96 retreats downwards to cancel the sheet positioning.

The stapler 100 is provided with a photosensor Se3 for detecting the absence of the staples 106 and a sensor Se4 for detecting the number of revolutions of the staple motor so that the sensor Se3 directly detects the staples 106, while the sensor Se4 detects a notch 109a of a disk 109 fixed to the output shaft 101 of the motor.

Furthermore, the stapling unit 90 is provided with a photosensor Se6 for detecting the presence and absence of the sheets on the staple tray 91 and a switch SW4 for detecting the mounting and dismounting of the stapler 100.

In the above-described arrangement, the sheets transported onto the staple tray 91 from the transport unit 80 are trued up by the side guide plates 95 and the stopper 96 as the tray 91 is vibrated by the rotation of the motor 93. The trued up sheets are bound by the staple motor. When the solenoid is turned on to withdraw the stopper 96 from the tray 91, the stapled sheets slide down onto a stack tray 111 by being guided by a plate 98. Such stapling operation is repeated each time when the sheets in the bins 60 are carried onto the staple tray 91.

The absence of the staples 106 is not necessarily required to be detected only by the sensor Se3. That is, at the time of the stapling operation, the absence of the staples 106 can also be detected by the sensor Se4, since the number of revolutions of the staple motor increases when the torque needed for rotating the cam 102 has decreased due to the absence of the staples 106. Thus, the increase in the number of revolutions of the staple motor indicates the absence of the staples 106.

(Construction of stack unit)

Figure 12:
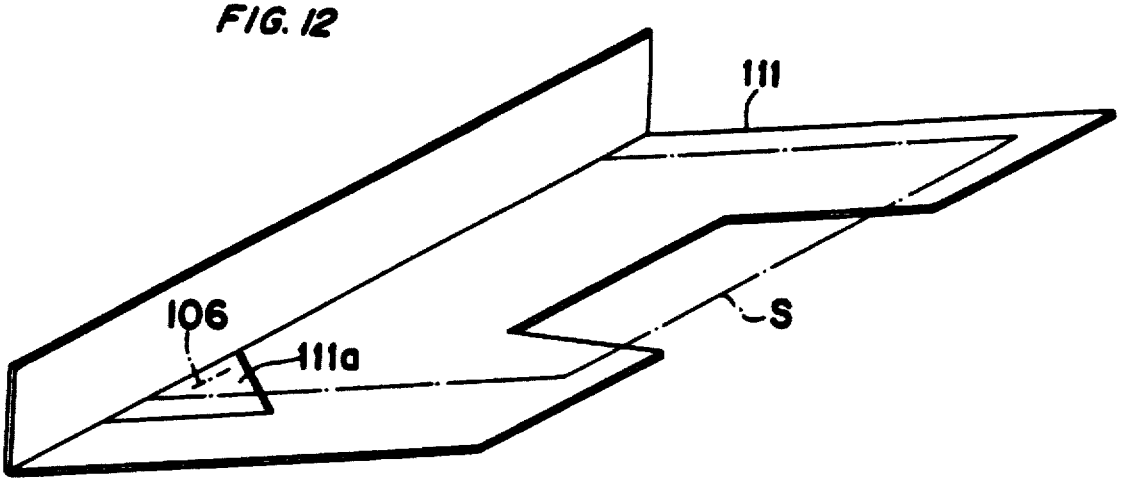
FIG. 12 is a perspective view of a stack tray.

The stack unit 110 comprises the stack tray 111 which is designed for finally containing the sheets stapled by the stapler 100. As shown in FIG. 12 the stack tray 111 has a notch 111a in Its parts to he used for the stalling of the sheet S, that is, the part where the part of the sheet stapled with the staple 106 is located so that the sheet stapled with the stapler 100 and placed on the tray 111 hangs down into the notch 111a by its own weight, whereby not only the stapled parts of sheets can be prevented from becoming higher than the non-stapled parts when they are stacked but also the stacking capacity of the tray 111 can be increased.

Figure 13:
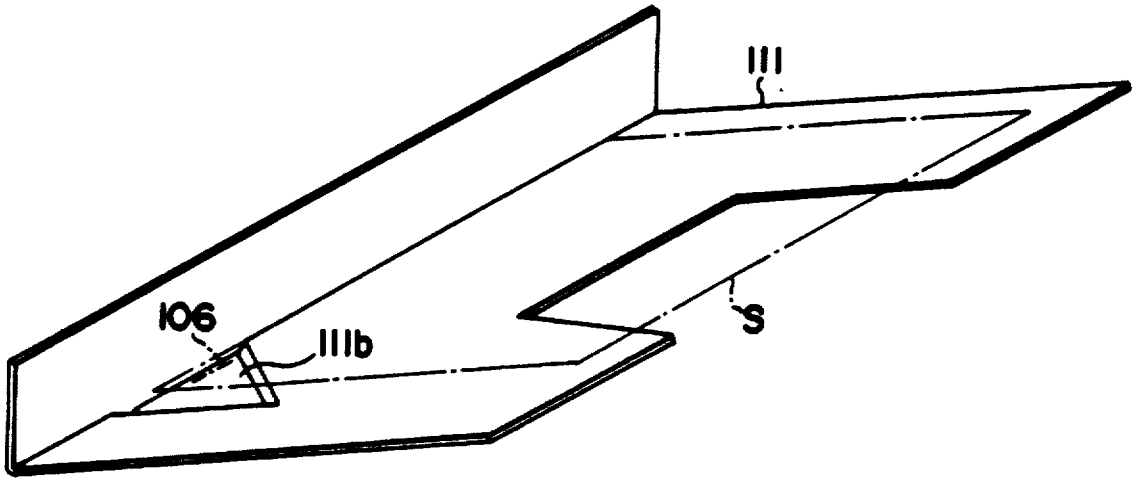
FIG. 13 is a perspective view showing another example of a stack tray.

The similar effect can also be achieved when an indent 111b is formed in the part of the stack tray 111 where the parts of the sheets stapled with staples 106 are stacked as shown in FIG. 13.

(Operation panel)

Figure 16:
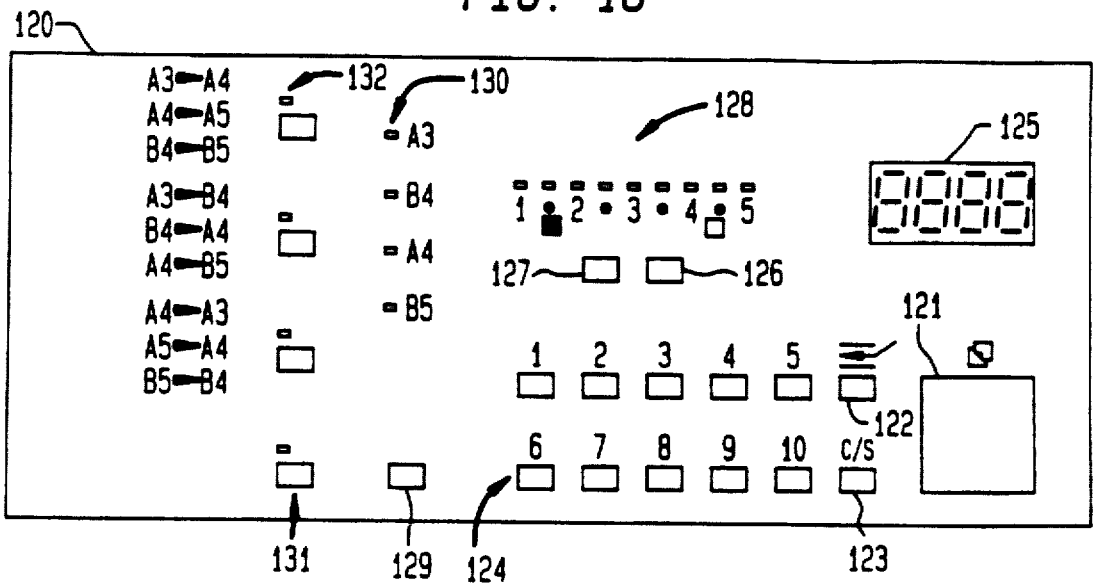
FIG. 16 is a plan view showing an operation panel of the copying machine.
Figure 17:
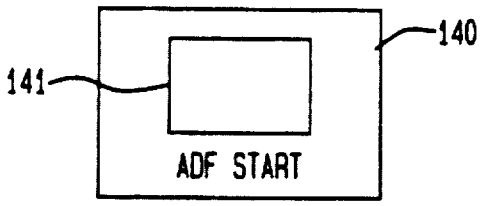
FIG. 17 is a plan view showing an operation panel of an ADF.
Figure 18:
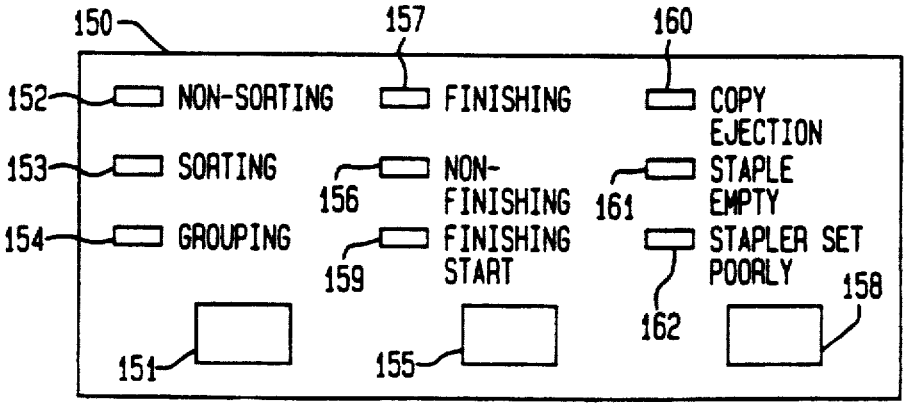
FIG. 18 is a plan view showing an operation panel of the sorter-finisher system.

In this embodiment, operation panels are installed at the three places in a copying machine panel 120, an ADF panel 140 and a sorter panel 150 as shown in FIGS. 16, 17 and 18 respectively.

Installed on the copying machine panel 120 are a print key 121 for starting the copying operation when ADF 30 is not used, an interruption key 122 for interrupting the multicopying operation temporarily, a clear/stop key 124 for stopping the copying operation or canceling the input number of copy sets, ten key group 124 for setting the number of copy sets, an indicator 125 for indicating the number of copy sets and the condition of the copying machine 1, up/down keys 126 and 127 for setting the density for copy image, LEDs 128 for indicating the density for copy image, a sheet selection key 129 for selecting the sheet size, LEDs 130 for indicating said sizes, magnification selection key group 131 for selecting the copying magnification and LED group 132 for indicating said magnifications.

Installed on the ADF panel 140 is only a start key 141 for starting the ADF 30. When this start key 141 is turned on, the documents on the document tray 31 are automatically transported one by one onto the glass 29 of the document rest, and the copying operation is started.

Installed on the sorter panel 150 are a sorter mode selection key 151, non-sorting mode indication LED 152, sorting mode indication LED 153 and grouping mode indication LED 154 which are the indicators of the sorter mode selection key 151, finishing mode selection key 155, non-finishing mode indication LED 156 and finishing mode indication LED 157 which are the indicators of the finishing mode selection key 155, finishing start key 158 and LED 159 as the indicator for the finishing start key 158. The LED 159, when lighted, indicates that the finishing operation is in progress, and, when is flicking, alarms for the necessity of removing the sheets from the staple tray 91. An LED 160 alarms for requiring the necessity of removing the sheets from bins 60, an LED 161 alarms for indicating that the staples 106 are absent and an LED 162 alarms for indicating the poor setting of stapler 100.

The sorter mode selection key 151 selects the modes in the order of non-sorting mode, sorting mode and grouping mode when the key 151 is depressed in succession, and the corresponding LEDs 152, 153 and 154 are lighted accordingly. The finishing mode selection key 155 also selects the modes in the order of non-finishing mode and finishing mode when the key 155 is depressed in succession, and the corresponding LEDs 156 and 157 are lighted accordingly. The finishing start key 158 outputs the signals in the order of the signal for the start of finishing operation and the signal for its cancellation when the key 158 is depressed in succession, and the LED 159 lights when the key 158 is depressed for the start of finishing operation.

(Control circuit)

Figure 19:
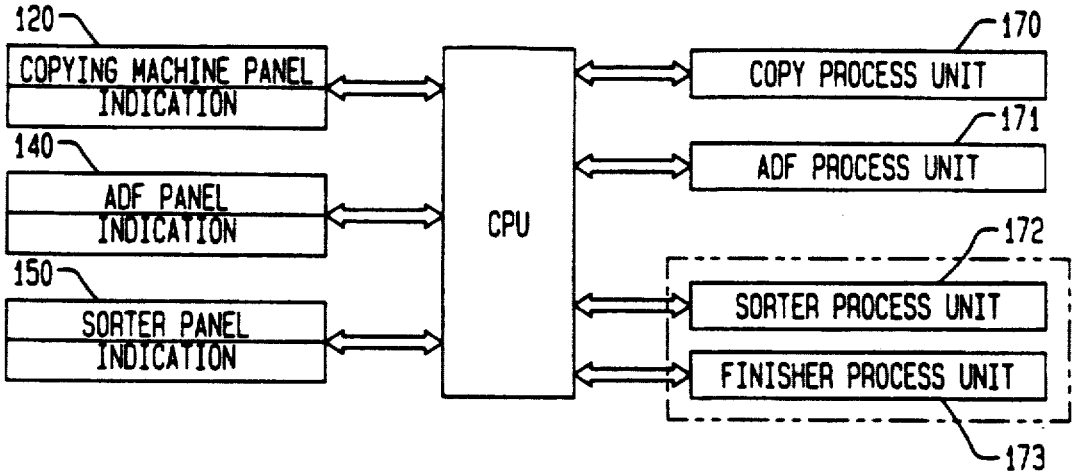
FIG. 19 is a block diagram showing a control circuit.

FIG. 19 is a block diagram of the control circuit wherein a microcomputer is connected to the copying machine panel 120, ADF panel 140, sorter panel 150, copy processing unit 170, ADF processing unit 171, sorter processing unit 172 and finisher processing unit 173 so that the signals can be exchanged with each other.

Figure 20:
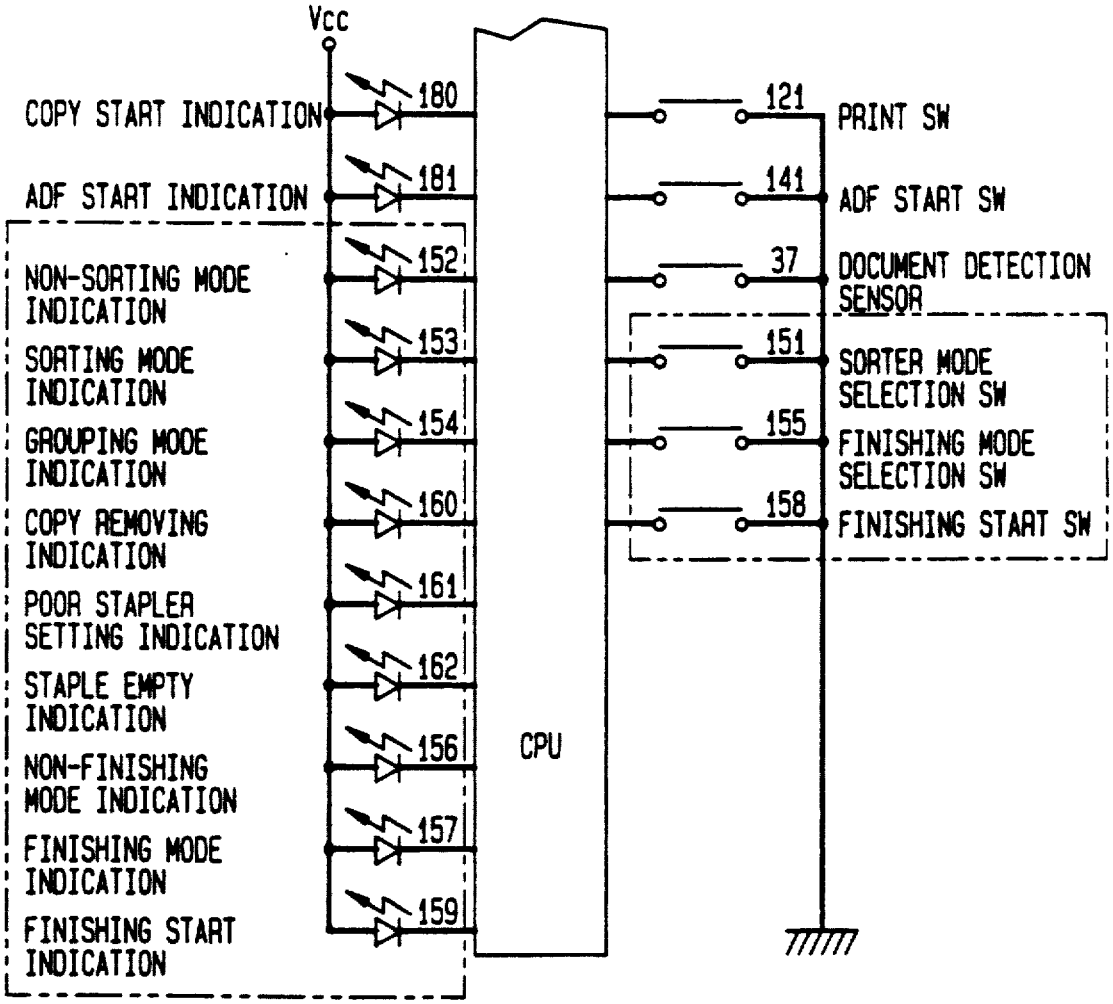
FIG. 20 is details of the control circuit.

FIG. 20 shows the essential part of the control circuit wherein the input output port of the microcomputer is connected to the print switch, ADF switch and their built-in indicator LEDs 180 and 181, various selection switches of the sorter panel 150, various indicator LEDs.

(Control procedure)

Here, the control procedures of the copying machine 1 and the sorter 40 based on the control circuit will be explained in reference to FIG. 21 and on.

In the following paragraphs, the term "on-edge" is defined as change in status, where the switch, sensor, signal or the like changes from the off status to the on status. In contrast, the term "off-edge" represents change in status, where the switch, sensor, signal or the like changes from the on status to the off status.

Figure 21:
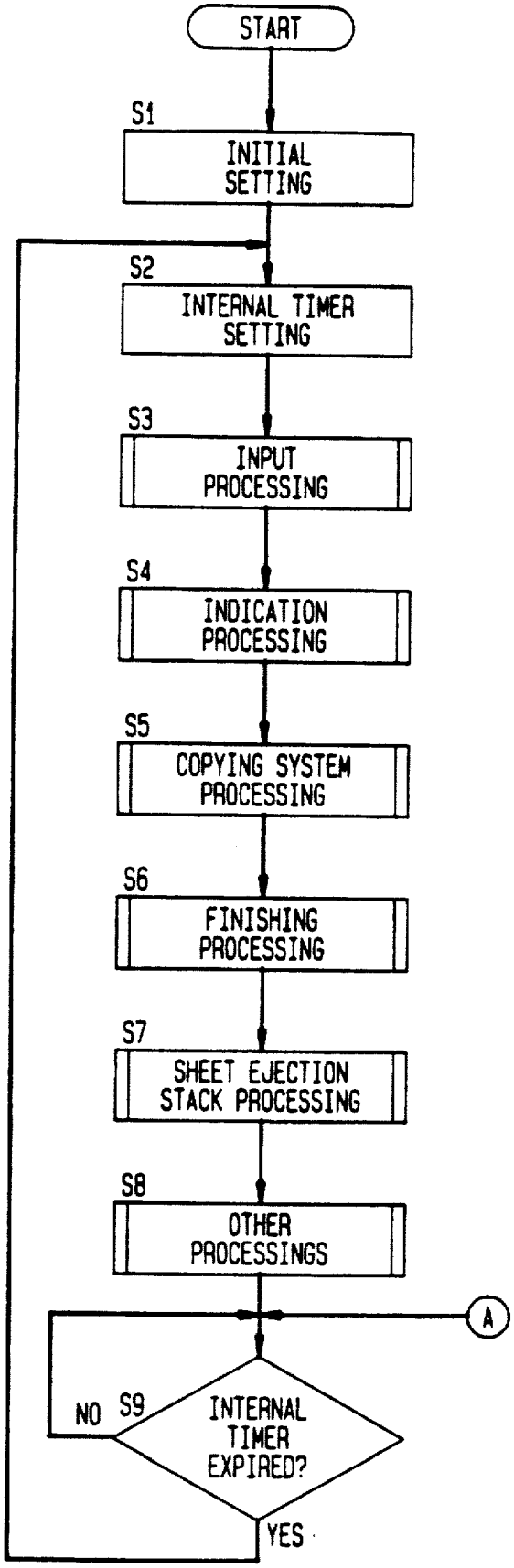
FIG. 21 is a flow chart showing a main routine of a CPU.

FIG. 21 shows a main routine of the microcomputer.

When the microcomputer is reset, and the program is started, the clearance of random access memory at step 81 and initialization (or setting for initial mode) of various registers and units take place. An internal timer starts at step S2. The internal timer is for setting the time required for the execution of the main routine, which is to be set in advance at the time of initialization at step S1.

Various subroutines, which will be explained later, are called one by one at steps S3 through S8. When the execution of all the subroutines are completed, the processing returns to step S2 after the time set by the internal timer has passed at step S9. The length of time required for one routine is used in making various counting with various counters during the execution of the subroutines.

Figure 22A:
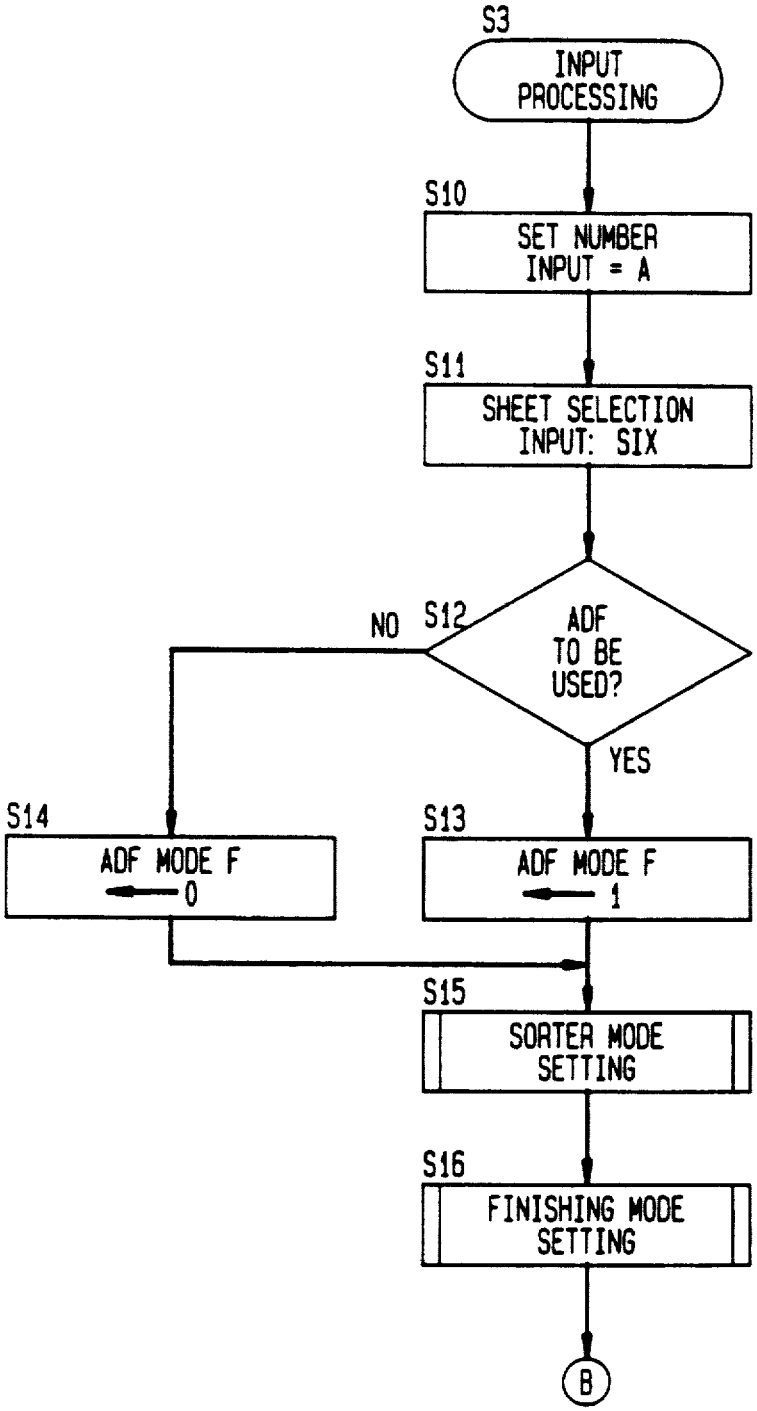

FIGS. 22a and 22b show a subroutine for the input processing to be executed at step S3 of the main routine.

First, a set number (A) is inputted through the ten key group 124 on the copying machine panel 120 at step S10. Then, the sheet size (Sx) selected is inputted at step S11, and whether the ADF 30 has been selected for use is checked at step SIZ. When the ADF 30 has been selected for use, an ADF mode flag is set to "1" at step S13, and, when not selected, the ADF mode flag is reset to "0" at step S14.

A subroutine for setting sorter mode is executed at step S15. A subroutine for setting finishing mode is executed at step S16, and whether a sorter mode flag is "1" or not is checked at step S17. When the sorter mode flag is "0", the sorting and stapling operations will not be executed, so that the processing goes to step S22. When the sorter mode flag is "1", bin number (a) is inputted at step S18, and the set number (A) and the bin number (a) are compared at step S19. When the set number (A) is less than the bin number (a), the operation in the sorting mode is possible. Whether a finishing mode flag is "1" or not is checked at step S20. When the finishing mode flag is "0", the processing goes to step 822, and, when is "1" whether the sheet size (Sx) is A4 size or B5 size is checked at step S21. In this embodiment, the sheet sizes allowed for stapling operation are A4 size and B5 size. When the result is "Yes", other input processings are executed at step S22.

Further, whether the print switch 121 is turned on or not is checked at step S23. When turned on, a copying flat is set to "1" at step S24 for enabling the copying operation. When not on, whether the ADF start switch 141 is turned on or not is checked at step 825. When turned on, the processing at said step S24 is executed, and, when not on, the subroutine is terminated.

On the other hand, set number (A) is judged to be larger than the bin number (a) at said step S19, an alarm flag F1 is set to "1" at step S26, and the operation of the system is inhibited at step S27. The alarm flag F1 is for the indication at the time when the number for distribution has exceeded the number of the bins 60. At steps S28 and S36, whether the Print switch 121 and the ADF start switch 141 are turned on respectively are checked in the same manner as that at said steps S23 and S25. When the result is "Yes" or the operator's will for executing the copying operation regardless of alarm signal, a non-sorting mode flag is set to "1" at step S29, and the alarm flag F1 is reset to "0" at step S30. Then, the inhibition of system operation is canceled at step S30a, and the copying flag is set to "1" at step S37.

Further, when the sheet size (Sx) is judged to be other than A4 size and B5 size at said step S21, the stapling operation is not possible, so that an alarm flag F2 is set to "1" at step S31, and the operation of the system is inhibited at step S32. The alarm flag F2 is for indicating that the selected sheet size is wrong. Then, whether the print switch 121 and the ADF start switch 141 are turned on respectively are checked at steps S33 and S38 in the same manner as that at said steps S23 and S25. When the operator's will for executing the copying operation regardless of the alarm signal at step S33 or step S38 is confirmed, the finishing mode flag is reset to "0" at step S34, and the alarm flag F2 is reset to "0" at step S35. The inhibition of the system operation is canceled at step S35a, and the copying flag is st to "1" at step S39.

Figure 23:
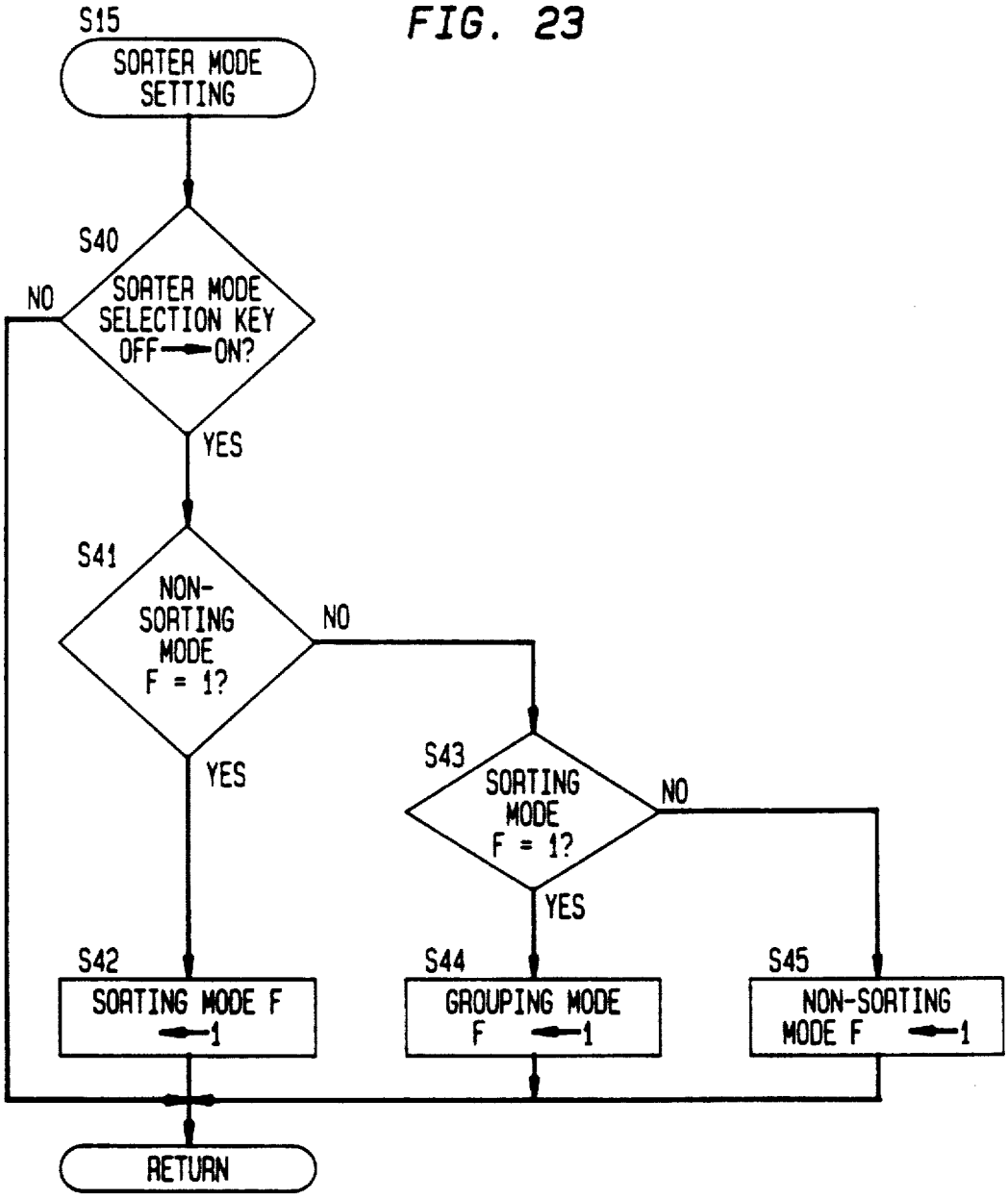
FIG. 23 is a flow chart showing a subroutine for the sorter mode setting.

FIG. 23 shows a subroutine for the sorter mode setting to be executed at said step S15.

In the subroutine, whether or not the sorter mode selection key 151 is changed to on from off is checked at step S40. When the result is "No", the subroutine is terminated at once. When the result is "Yes", at steps S41 and S43, whether or not the non-sorting mode flag and the sorting mode flag are "1" are checked respectively. When the non-sorting mode flag is "1", the sorting mode flag is set to "1" at step S42. When the sorting mode flag is "1", a grouping mode flag is set to "1" at step S44. When both the non-sorting mode flag and the sorting mode flag are "0", or at this time the grouping mode flag is "1", the non-sorting mode flag is set to "1" at step S45.

Figure 24:
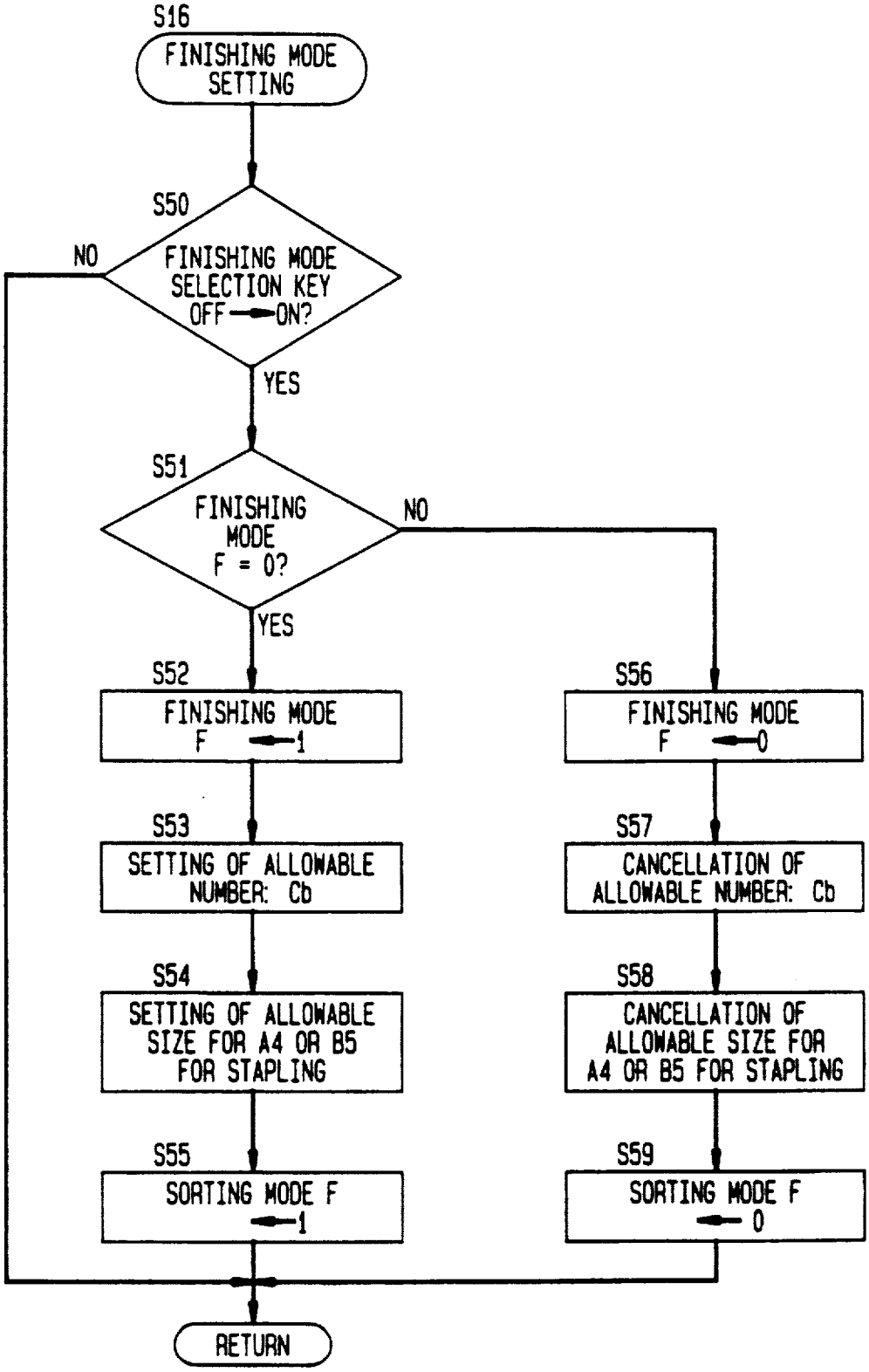
FIG. 24 is a flow chart showing a subroutine for the finishing mode setting.
Figure 25A:
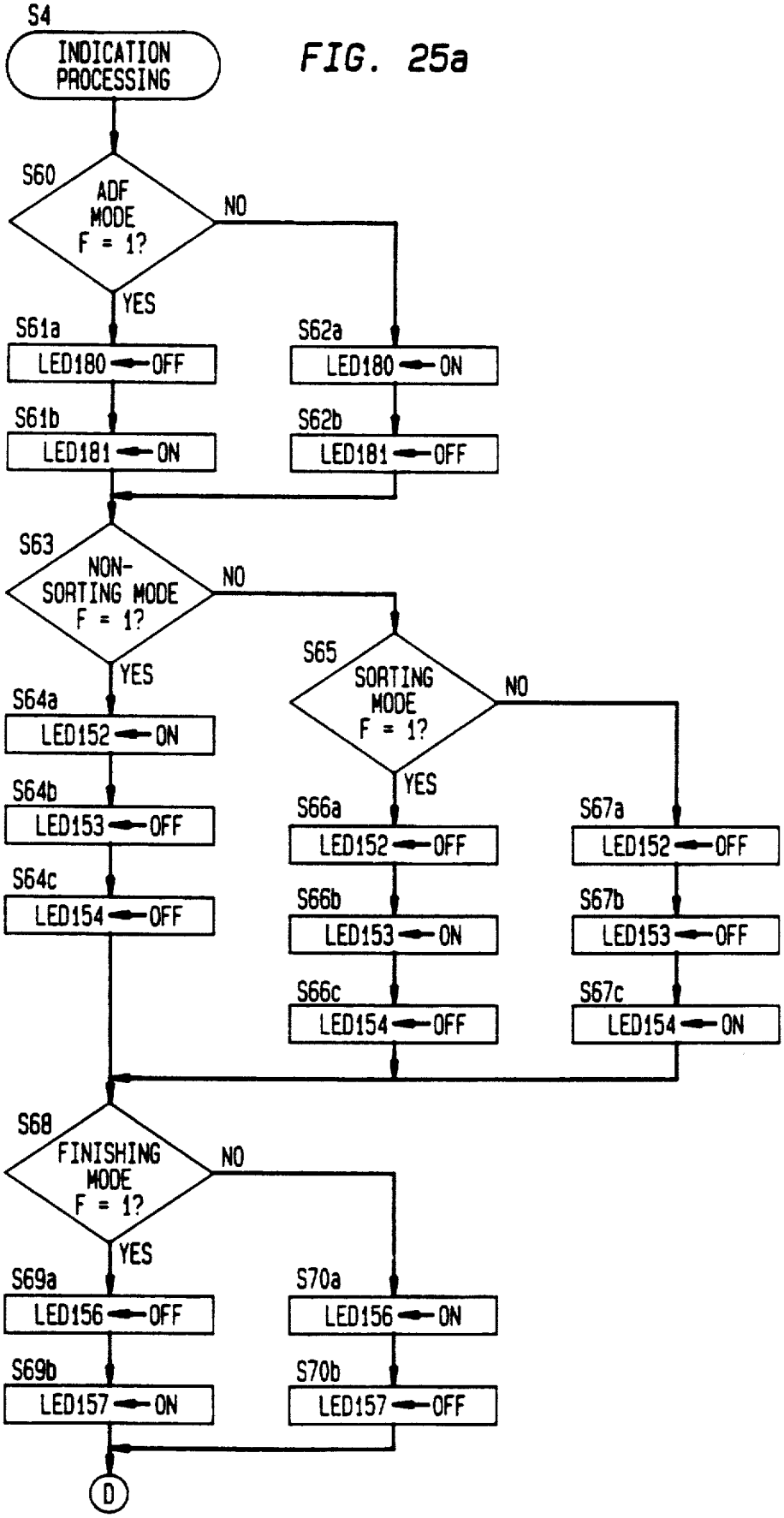
Figure 25B:
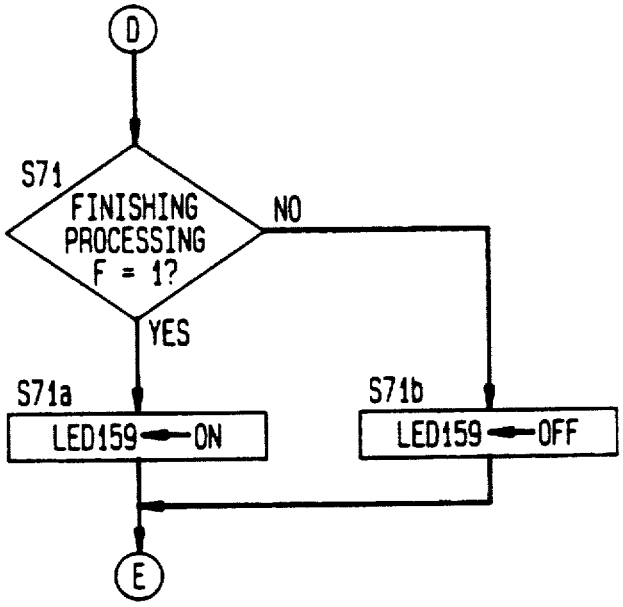
Figure 25D:
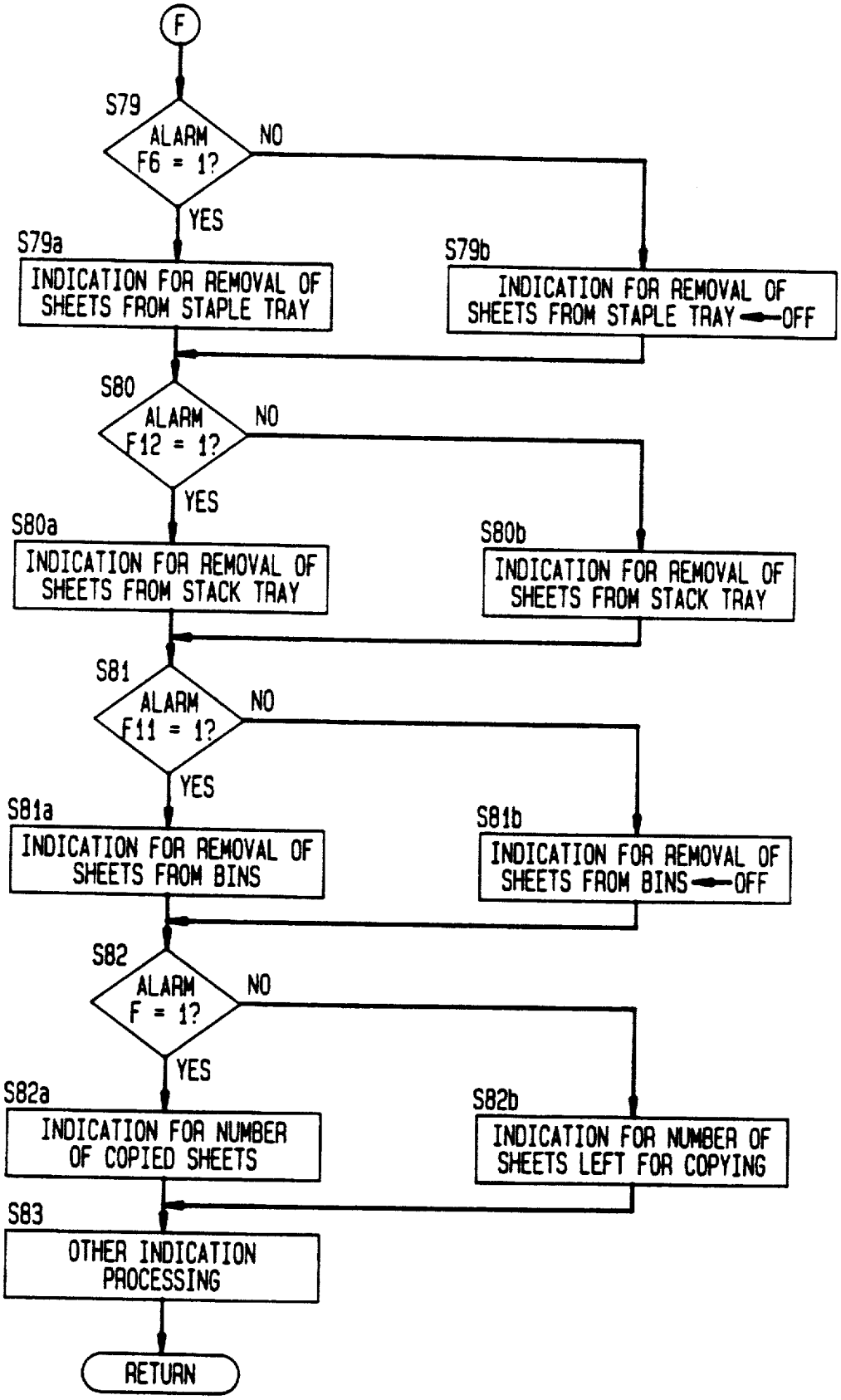

FIG. 24 shows a subroutine for the finishing mode setting to be executed at said step S16.

First, whether or not the finishing mode selection key 155 is changed to on from off is checked at step S50. When the result is "No", the subroutine is terminated at once. When the result is "Yes", at step S51, whether or not the finishing mode flag is "0" is checked. When the flag is "0", so the finishing mode has not been selected, the finishing mode flag is set to "1" at step S52. Then, allowable stapling number (Cb) is set at step S53. The allowable sheet size for stapling is set to A4 and B5 at step 854. The sorting mode flag is set to "1" at step S55 for allowing the operation in the sorting mode.

On the other hand, at said step S51, when the finishing mode flag is judged to be "1", so the finishing mode has been selected, the finishing mode flag is reset to "0" at step S56. Then, allowable stapling number (Cb) is canceled at step S57. The allowable sheet size for stapling is canceled at step S58. The sorting mode flag is reset to "0" at step S59, the operation in the sorting mode is inhibited.

FIG. 25a through 25d show a subroutine for the indication processing to be executed at step S4 of the main routine.

First, whether the ADF mode flag is "1" or not is checked at step S60. When is "1", the LED 180 for indicating the non-ADF mode is turned off at step S61a, the LED 181 for indicating the ADF mode is turned on at step 861b. When the ADF mode flag is "0", the LED 180 is turned on at step S62a, the LED 181 is turned off at step S62b.

Further, whether the non-sorting mode flag and the sorting mode flag are "1" or not are checked at steps S63 and S65 respectively. When the sorting mode flag is "1", the LED 152 for indicating the non-sorting mode is turned on at step S64a, the LEDs 153 and 154 are turned off at steps S64b and S64c. When the sorting mode flag is "1", the LED 152 is turned off at step S66a, the LED 153 for indicating the sorting mode is turned on at step S66b, the LED 154 is turned off at step S66c. When said two flags are "0", the LEDs 152 and 153 are turned off at steps S67a and S67b, the LED 154 for indicating the grouping mode is turned on at step S67c.

Next, at step S68, whether the finishing mode flag is "1" or not is checked. When is "1", the LED 156 for indicating the non-finishing mode is turned off at step S69a, the LED 157 for indicating the finishing mode is turned on at step S69b. When the finishing mode flag is "0", the LED 156 is turned on at step S70a, the LED 157 is turned off at step S70b. At step S71, whether the finishing processing flag is "1" or not is checked. When is "1", the LED 159 for indicating the finishing processing has started is turned on at step S71a. When is "0", the LED 159 is turned off at step S71b.

Further, at step S73, the alarm flag F1 is checked as to whether is "1" or not. When the flag F1 is "1", the indicator 125 indicates that the number oi bins 60 is over at step S74a. When the flag F1 is "0", the indication for bin number over on the indicator 125 is turned off at step S74b. At step S75, the alarm flag F2 is checked as to whether is "1" is not. When the flag F2 is "1", pl the indicator 125 indicates that the sheet size is inappropriate at step 875a. When the flag F2 is "0", the indication for sheet size inappropriate on the indicator 125 is turned off at step S75b. At step S76, the alarm flag F3 is checked as to whether is "1" or not. When the flag F3 is "1", the indicator 125 indicates that the finishing mode is impossible at step S76a. When the flag F3 is "0", the indication for finishing mode impossible on the indicator 125 is turned off at step S76b. At step S77, the alarm flag F4 is checked as to whether is "1" or not. When the flag F4 is "2", the indicator 125 indicates that the document is absent at step S77a. When the flag F4 is "0", the indication for document empty on the indicator 125 is turned off at step S77b. At step S78, the alarm flag F5 is checked as to whether is "1" or not. when the flag F5 is "1", the indicator 125 indicates that the finishing capacity is over at step S78a. When the flag F5 is "0", the indication for finishing capacity over on the indicator 125 is turned off at step S78b. At step S79, the alarm flag F6 is checked as to whether is "1" or not. When the flag F6 is "1", the LED 159 is flickering at step S79a, indicates that the sheets need to be removed from the staple tray 91. When the flag F6 is "0", the LED 159 is turned off, so the indication for removal of the sheets from the staple tray 91 is turned off at step S79b. At step S80, the alarm F12 is checked as to whether is "1" or not. When the flag F12 is "1", the LED 159 is flickering at step S80a, indicates that the sheets need to be removed from the stack tray 111. When the flag F12 is "0", tbe LED 159 is turned off, so the indication for removal of the sheets from the stack tray 111 is turned off at step S80b. At step S81, the alarm flag F11 is checked as to whether is "1" or not. When the flag F11 is "1", the LED 160 is turned on at step S81a, indicates that the sheets need to be removed from the bins 60. When the flag F11 is "0", the LED 160 is turned off, so the indication for removal of the sheets from the bins 60 is turned off at step S81b.

Further, whether the copying flag is "1" or not is checked at step S82. The indicator 125 indicates the number of copied sheets or the number of sheets left for copying at step S82a when the copying flag is "1", and at step S82b when it is "0". Subsequently, other indication processings are executed at step 883 so that this subroutine can be completed.

Figure 26:
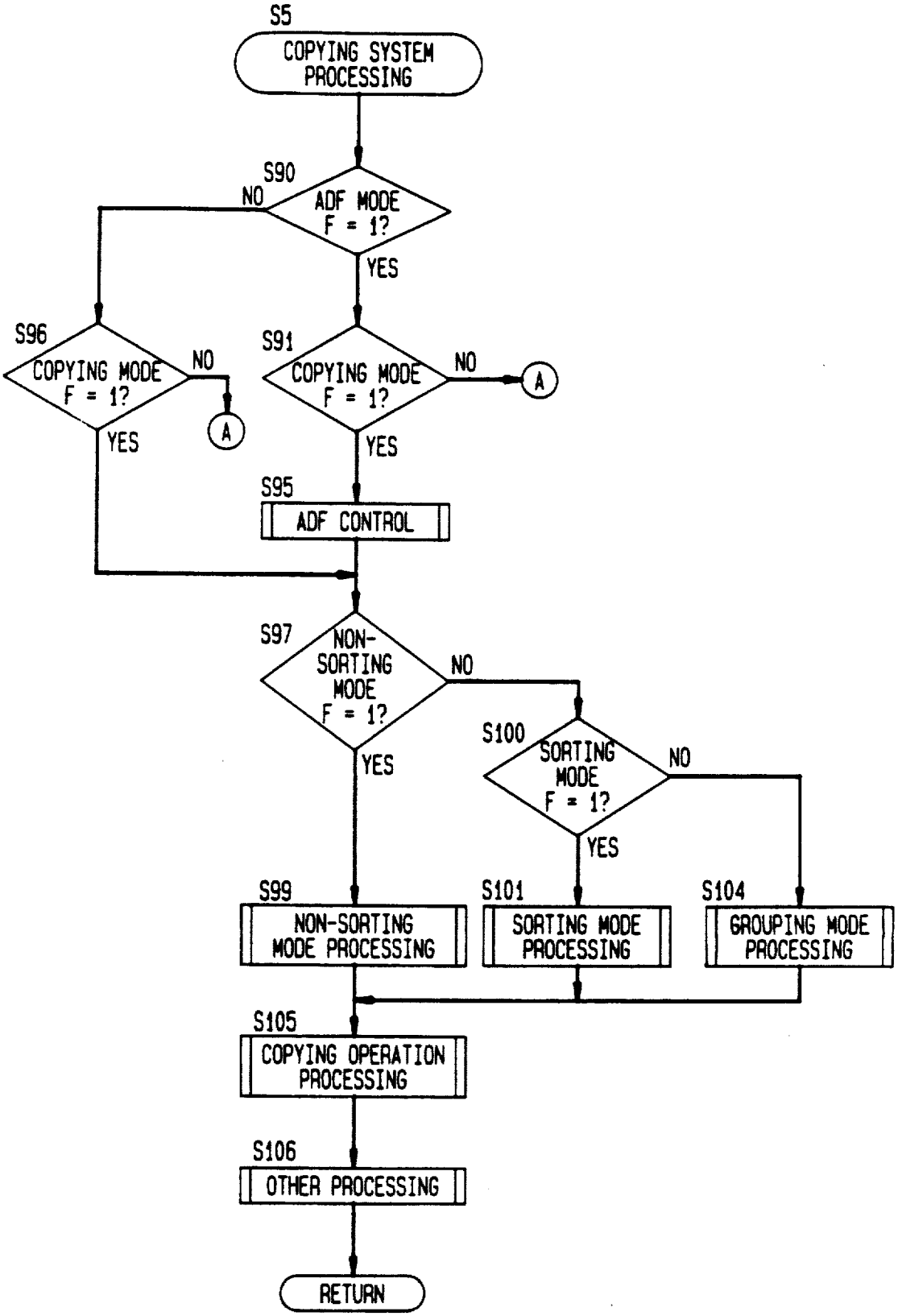
FIG. 26 is a flow chart showing a subroutine for the copying system processing.

FIG. 26 shows a subroutine for the processing of copying system to be executed at step S5 of the main routine.

First, whether the ADF mode flag is "1" or not is checked at step S90. When is "1", whether the copying flag is "1" or not is checked at step S91. Since the copying operation is allowed when the copying flag is "1", a subroutine for the control of the ADF 30 is executed at step S95, and the processing goes to step S97. When the ADF mode flag is judged to be "0" at said step S90, whether the copying flag is "1" or not is checked at step S96. When is "1", the processing goes to step S97. When the copying flag is judged to be "0" at said steps S91 and S96 respectively, the processing returns to the main routine.

When the non-sorting mode flag and the sorting mode flag are verified to be "1" at steps S97 and S100 respectively, subroutines for the non-sorting mode processing and sorting mode processing can be executed at steps S99 and S101 respectively.

On the other hand, when the non-sorting mode flag and the sorting mode flag are verified to be "0" at said steps S97 and S100, a subroutine for the grouping mode processing can be executed at step S104.

Further, a subroutine for the copying operation is executed at step S105, and a subroutine for other processing is executed at step S106.

The subroutines to be executed at said steps S99 and S104 can be executed by the procedures similar to the conventional ones, so that the details of these procedures are omitted here.

Figure 27:
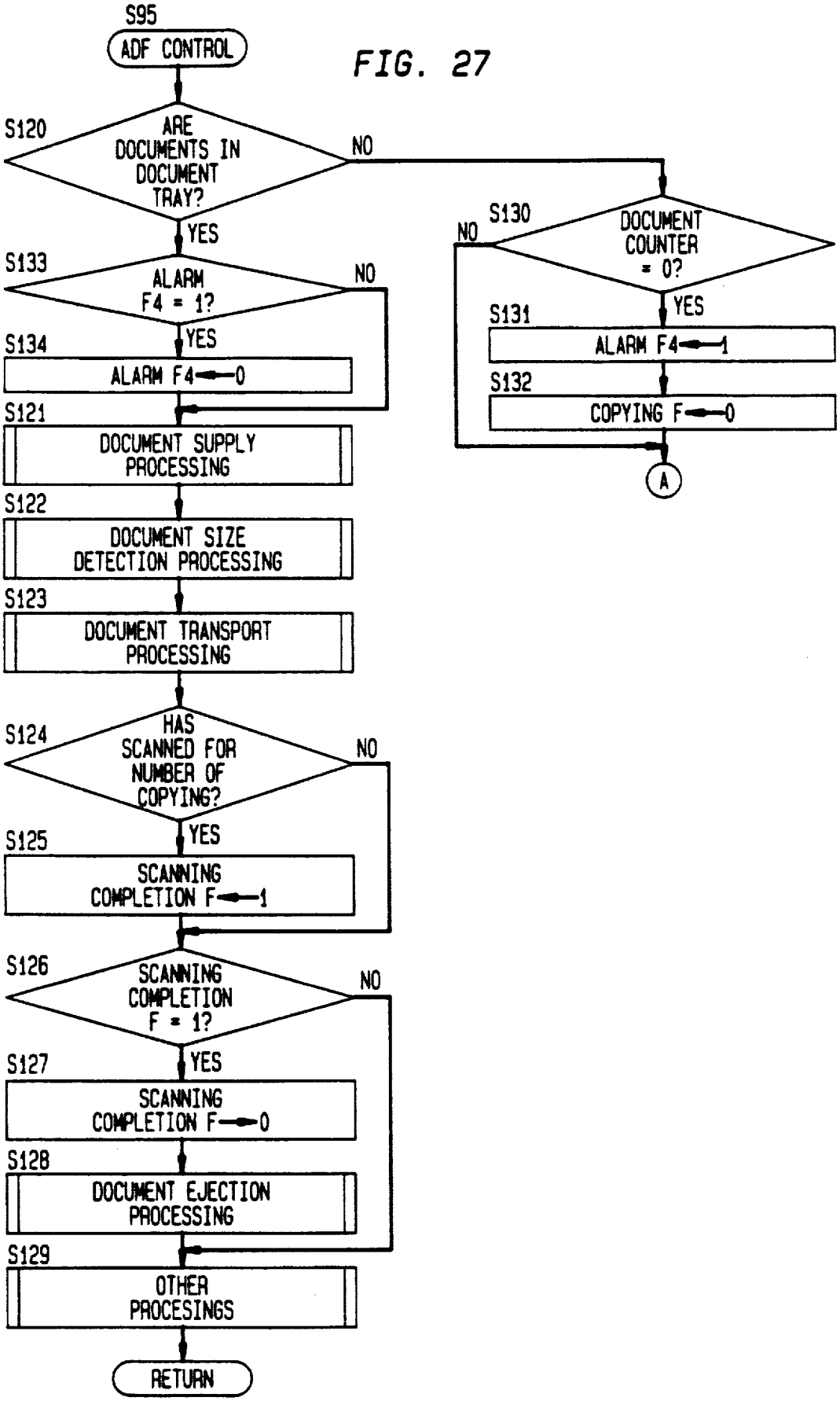
FIG. 27 is a flow chart showing a subroutine for the ADF control.
Figure 28A:
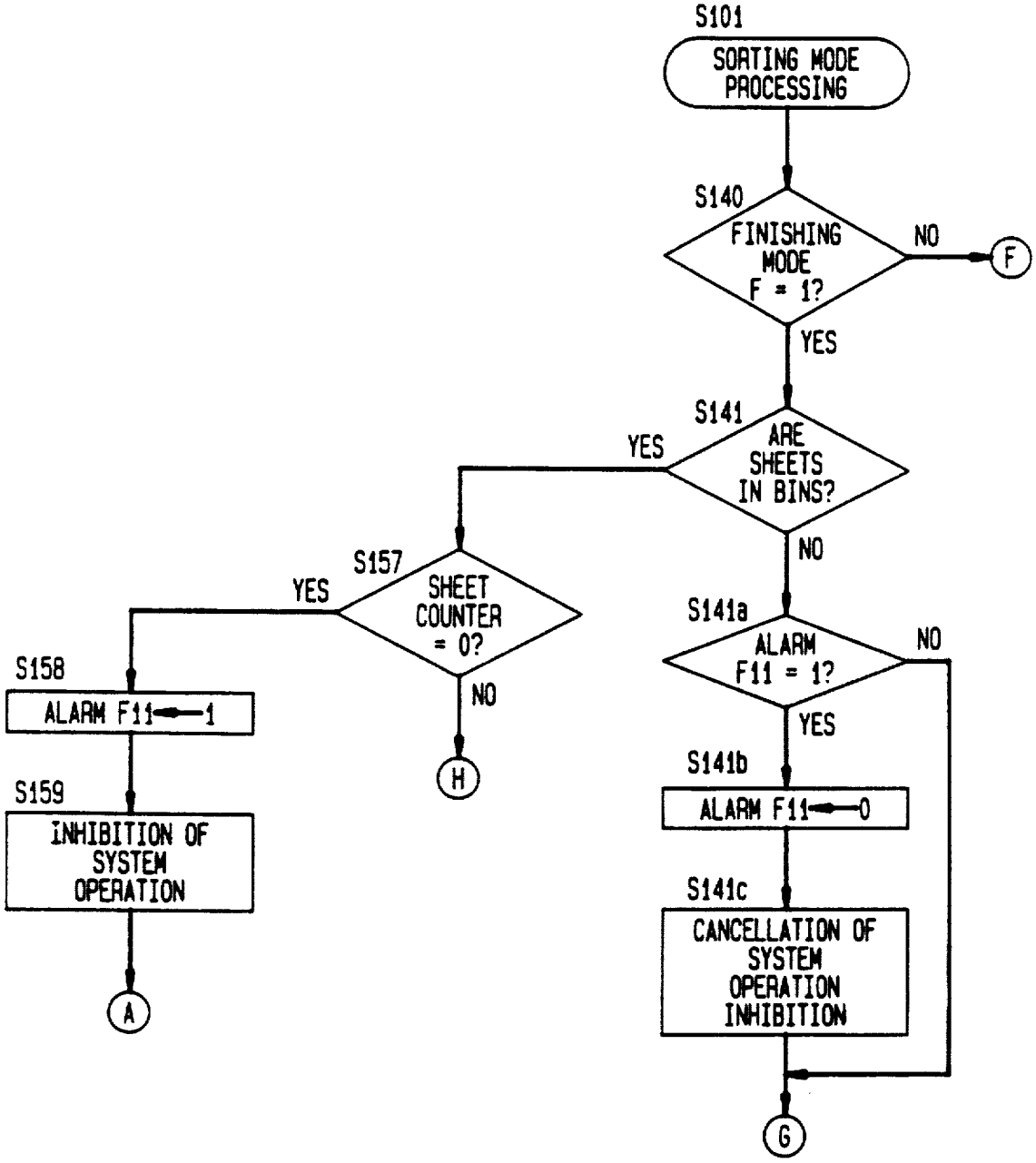
FIGS. 28a, 28b, 28c and 28d are flow charts showing a subroutine for the sorting mode processing.
Figure 28B:
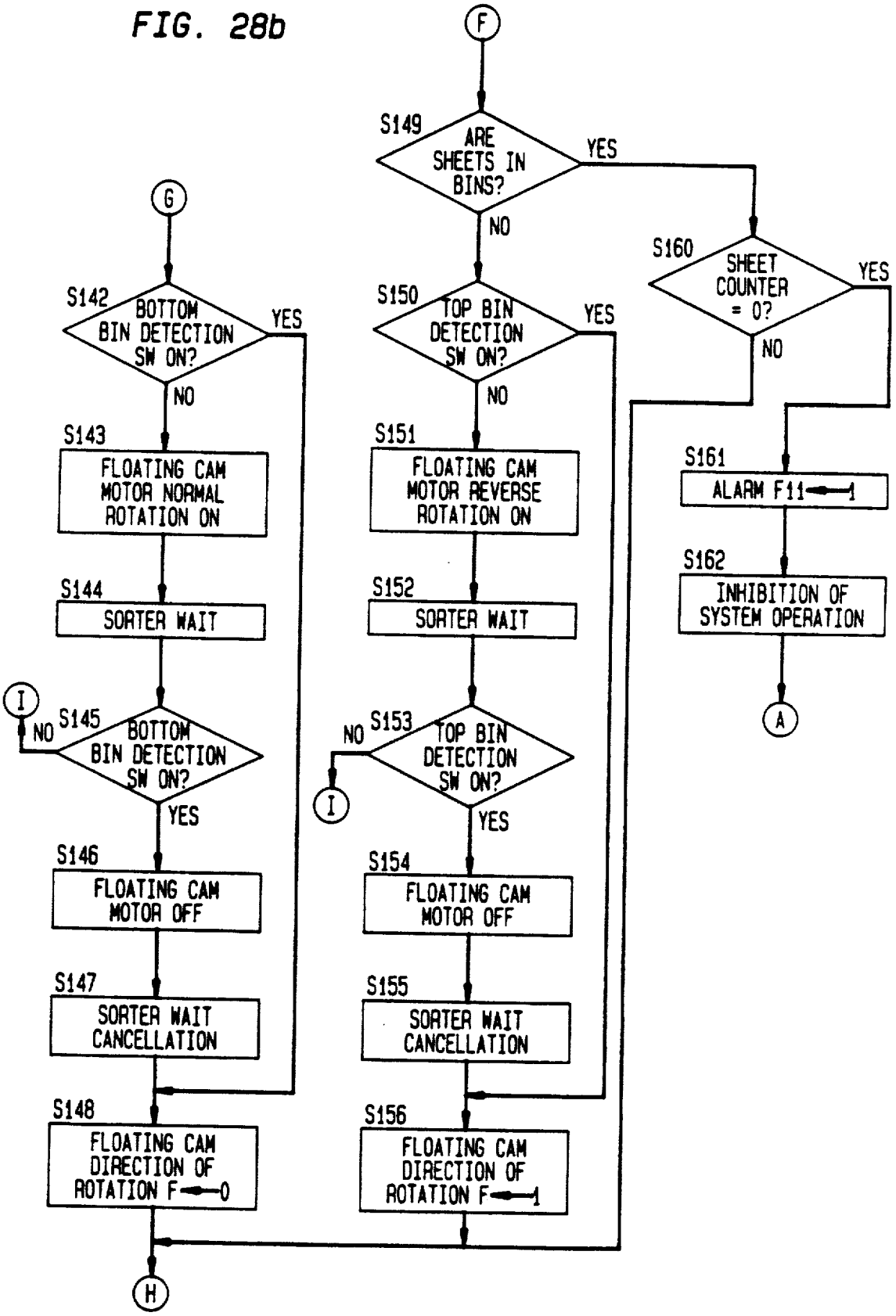
Figure 28C:
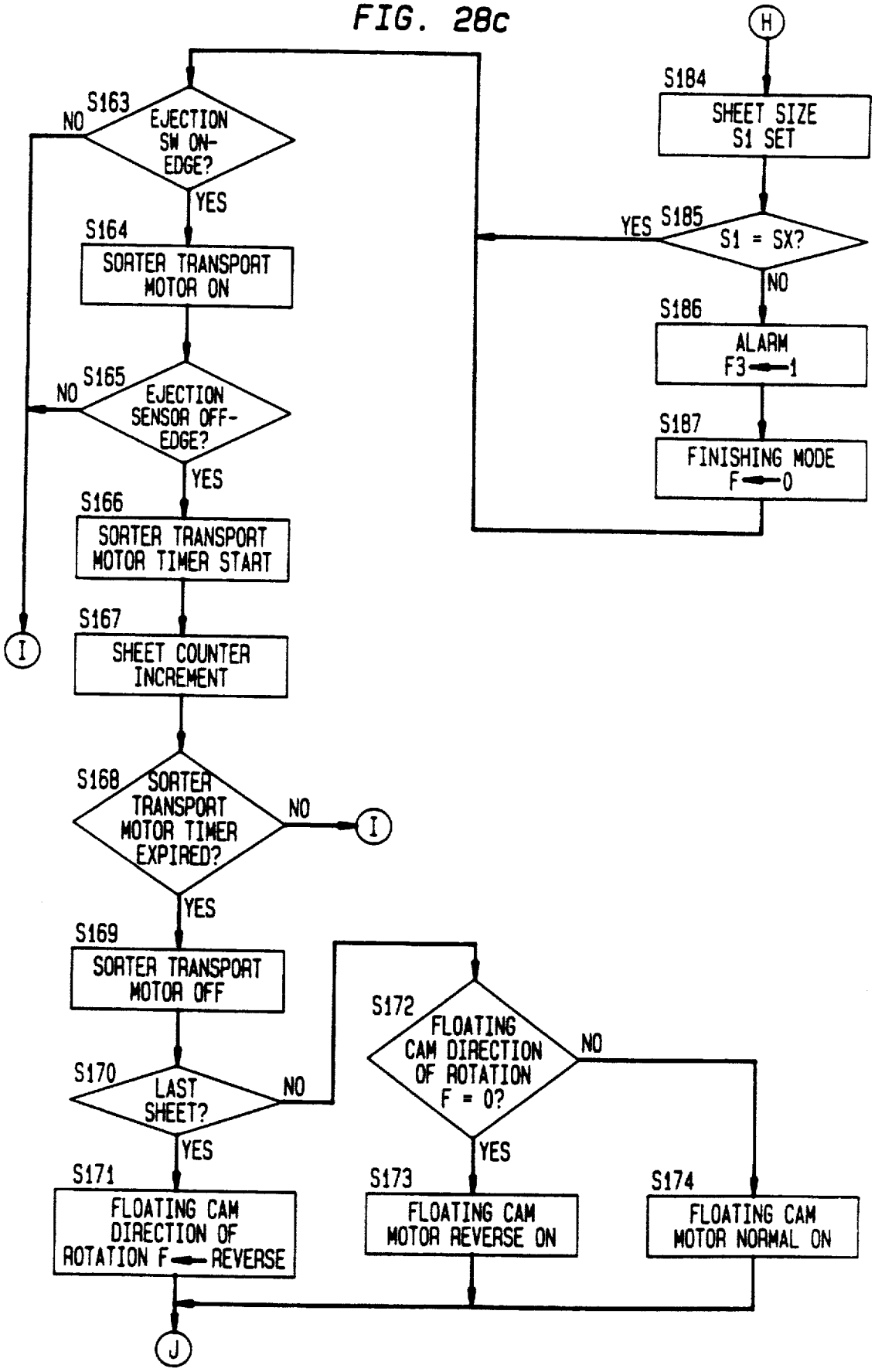
Figure 28D:
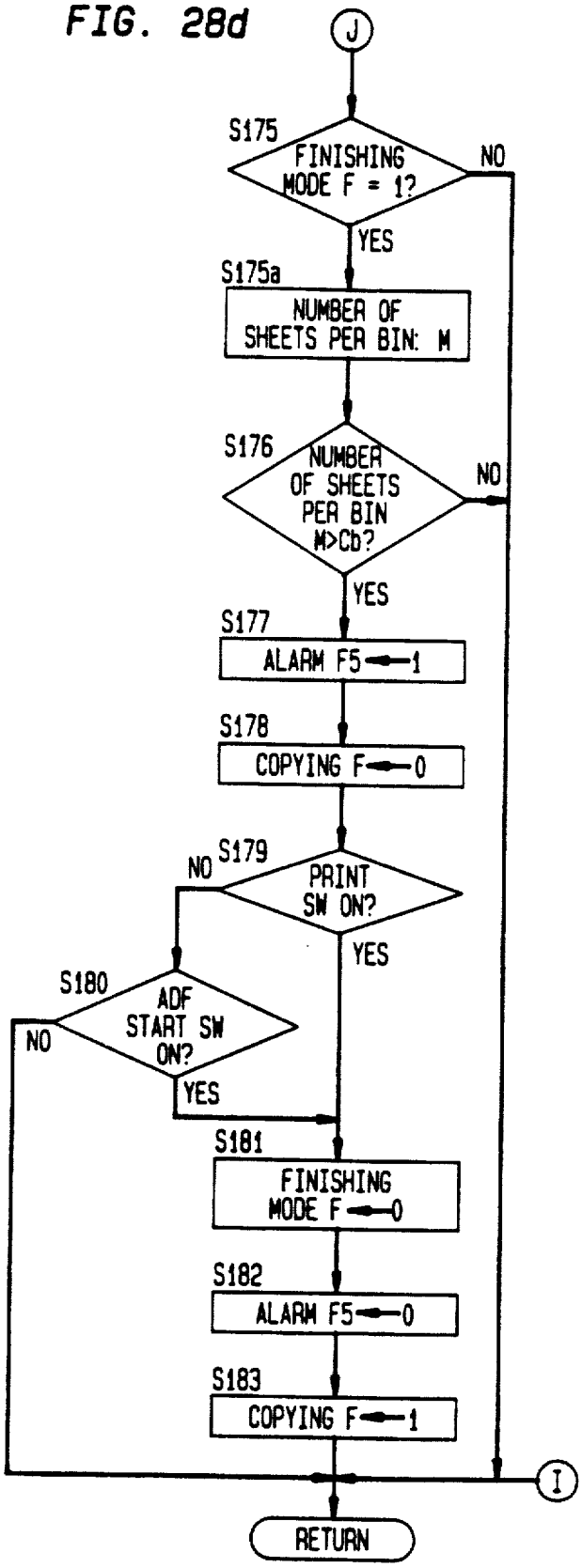

FIG. 27 shows a subroutine for the ADF control to be executed at said step S95.

First, whether the documents are present in document tray 31 or not is checked by on-off action of the sensor 37 at step S120. When the documents are present, whether the alarm flag F2 is "1" or not is checked at step S133. This flag F4 is set to "1" at step S131 which will be explained later, but, when the flag F4 is "1", it is reset to "0" at step S134. Then, document supply processing subroutine at step S121, document size detection processing subroutine at step S122 and document transport processing subroutine at step S123 are executed respectively.

On the other hand, when the documents have run out, whether the document counter registers "0"or not is at step S130. When "0" is registered, the alarm flag F4 is set to "1" at step S131, the copying flag is reset to "0" at step S132, and the processing returns to the main routine.

On the other hand, at step S124, whether the optical system 4 has scanned each copy for several minutes or not is checked. When the result is "Yes", a scanning completion flag is set to "1" at step S125. Then that the scanning completion flag is set to "1" is confirmed at step S126. The scanning comPletion flag is reset to "0" at step S127. Document ejection processing subroutine is executed at step S128. Subroutines for other processings are executed at step S129.

Further, the ADF control subroutine is similar to the conventional one, so that the details oi the subroutines to be executed at said steps S121, S123 and S128 are omitted here.

FIGS. 28a through 29d show a subroutine for the processing of sorting mode to be executed at said step S101. The subroutine differentiate the action of sorter bins 60 depending on whether the finishing mode is selected or not. This is because the order of distributing sheets to the bins 60 corresponds to the order of taking out the sheets from each of the bins 60, and such order are dependent on whether the finishing mode is selected or not. When the finishing mode is selected, the sheets are distributed first to the bottom bin 60 so that the sheet can readily be transported to stapling unit 90, and when not selected, the sheets are distributed first to the top bin 60 so that the operator can directly take out the sheets from each of the bins 60.

More particularly, whether the finishing mode flag is "1" or not is checked at step S140. When is "1", whether the sheets are present or not in the bins 60 is checked by on-off action of the sensor Se5 at step S141. When the sheets are absent, whether the alarm flag F11 is "1" or not is checked at step S141a. This alarm flag F11 is set to "1" S158 and S161 which will be explained later, but, when the alarm flag F11 is "1", it is reset to "0" at step S141b, and the inhibition of system operation is canceled at step S141c. Then, whether the bottom bin detection switch SW1 is turned on or not, that is, whether or not the bins 60 are at the bottom bin position X1, the home position of the bins 60 when the finishing mode is selected, and whether the distribution of the sheets in the finishing mode is possible are checked at step 8142. Thus, when the result of the check is "Yes", the processing goes to step S148, and a direction-of-rotation flag is reset to "0" in order to reverse the action of the bins 60 for the sorting operation or to reverse the rotation of floating cam motor (not shown in the drawings). When the result of the chick is "No" at step S142, the processings at steps S143 through S147 are executed to shift the bins 60 to the bottom bin position X1. That is, the floating cam motor is made to turn towards its normal direction at step S143, and sorter wait is applied at step S144. The sorter wait means the processing to inhibit the copying operation so that the sheets will not be transported to the sorting unit 41 while the bins 60 is in motion. When that the bottom bin detection switch SW1 is turned on is confirmed at step S145, the floating cam motor is turned off at step S146. The sorter wait is canceled at step S147. The direction-of-rotation flag for the floating cam 50 is reset to "0"at step S148 in order to reverse direction of rotation of the floating cam 50 from said step on.

On the other hand, when the finishing mode is not selected, whether the sheets are present or absent in the bins 60 is checked by on-off action of the sensor Se5 at step 8149. When the sheets are absent, whether the top bin detection switch SW2 is turned on or not at step S150, that is, whether or not the bin 60 is at the top bin position X2, the home position at the time of the finishing mode, and whether the distribution oi the sheets in the finishing mode is possible or not are checked. Thus, when the result of the check is "yes", the processing proceeds to step S156, and the direction-of-rotation flag for the floating cam 50 is set to "1" to permit the normal rotation oi the floating cam 50. When said result is "No", the processings at steps S151 through S155 are executed to shift the bins 60 to the top bin position X2. That is, the rotation of the floating cam 50 is reversed at step S151; the sorter wait is applied at step S152; that the top bin detection switch SW2 is turned on is confirmed at step S153; and the motor of the floating cam 50 is turned off at step S154. Subsequently, the sorter wait is canceled at step S155. the direction-of-rotation flag for the floating cam 50 is set to "1" at step S156 to let the floating cam 50 rotates towards its normal direction from said step on.

Further, when the presence of the sheets in the bins 60 is detected at said steps S141, whether the sheet counter registers "0"or not is checked at steps S157 and S160. When judged to be "0", the alarm flag F11 is set to "1" at steps S158 and S161 in order to prepare for lighting LED 160 for indicating the need of the removal of the sheets. The system operation is inhibited at steps S159 and S162, and the processing returns to the main routine.

Next, at step S184, the size (S1) of sheet being copy is designated in tbe RAM; at step S185, the sheet size (Sl) and the sheet size (Sx) stored in the RAM and selected at starting of the copying operation are compared, whether or not those sizes (S1) and (Sx) are equal is checked. When the result is "yes", the processing goes to step S162 at once. When is "No", at step S186, the alarm flag F3 is set to "1" in order to prepare for indicating that the finishing mode is impossible. Then, at step S187, the finishing mode flag is reset to "0", that is, the finishing mode is canceled, the processing goes to step S163.

Next, at step S163, whether the ejection switch SW3 of the copying machine 1 is on-edge or not is checked. That is, when the front end of the sheet has arrived to the ejection switch SW3, the sorter transport motor is turned on at step S164, and whether the sorter ejection sensor Se1 is off-edge or not is checked at step S165. More particularly, the sheet is judged to have distributed to the bin 60 when the rear end of the sheet has passed the ejection sensor Se1. When the ejection sensor Sel is off-edge, the timer of the sorter transport motor is started at step S166. The number of sheets to be counted is increased at step S167. When the time set by the timer of the sorter transport motor has passed at step S168, the sorter transport motor is turned off at step S169. Subsequently, whether the sheet transported last is the last sheet or not is checked at step S170. When judged to be the last sheet, the direction-of-rotation flag for the floating cam 50 is reversed at step S171. That is, when the direction-of-rotation flag for the floating cam 50 has been reset to "0", it is set to "1", and it is reset to "0" when it has been set to "1". When said sheet is not the last sheet is judged at said step S170, the position of the direction-of-rotation flag for the floating cam 50 is checked at step S172 in order to continue the sorting operation. When said position is judged to be "0", the rotation of the floating cam motor is reversed at step S173, and, when said position is judged to be "1", the rotation of said motor is normalized at step S174. More particularly, the sheets are distributed by moving them up and down from the bottom bin 60 to the top bin 60 or from the top bin 60 to the bottom bin 60.

Then, whether the finishing mode flag is "1" or not is checked at step S175. When is "1", the number (M) of the sheets per bin is calculated at step S175a, and the number (M) of the sheets per bin and the allowable number (Cb) of sheets for stapling (refer to step S53) are compared at step S176. When the number (M) of sheets per bin is larger than the allowable number (Cb) of sheets for stapling, the alarm flag F5 is set to "1" at step S177 in order to prevent the defective stapling, and the preparation is made for indicating that the number (M) of sheets is too larger for the capacity of the stapling unit 90. The copying flag is reset to "0" at step S178. Whether the print switch 121 is turned on or not is checked at step S179. Whether the ADF start switch 141 is turned on or not is checked at step S180. When either one of the print switch 121 or the ADF start switch 141 is turned on, that is, when the operator's will for the execution of the copying operation regardless of the alarm is confirmed, the finishing mode flag is reset to "0" at step S181; the alarm flag F5 is reset to "0" at step S182; and the copying flag is set to "1" at step S183 for enabling the execution of tbe processing in the sorting mode so that this subroutine can be completed.

When the operator wants to terminate the copying operation and execute the finishing processing when the alarm for the oversupply of the sheets for the capacity of the stapling unit 90 during the execution of the processing at steps S176 and S177, the operator is required only to turn on the finish start switch 158 (refer to step S210).

Figure 29:
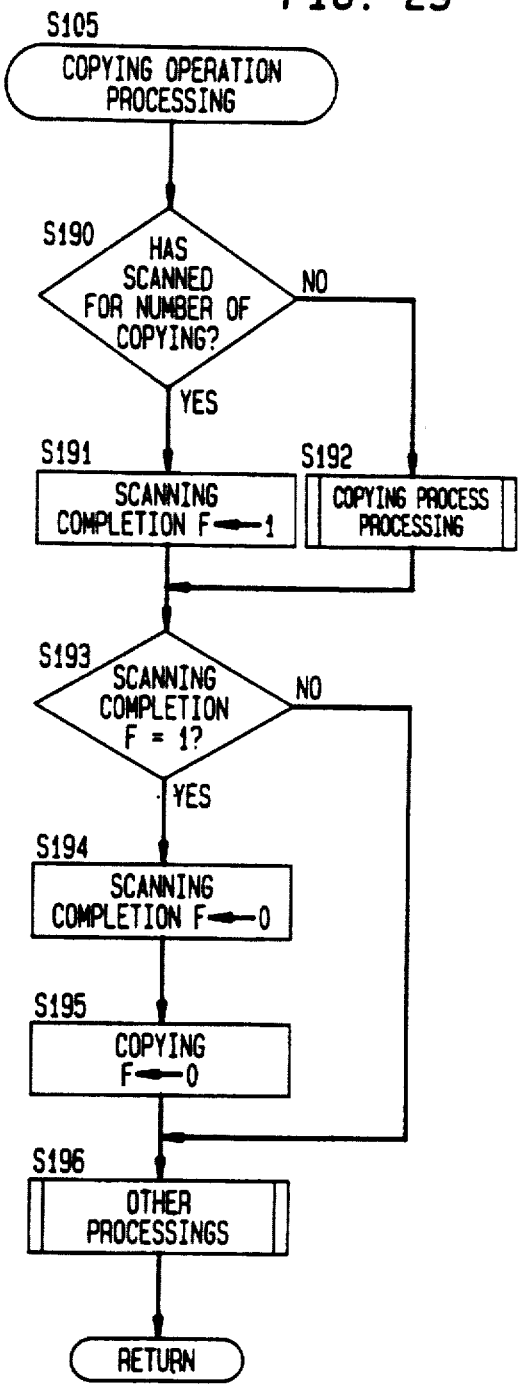
FIG. 29 is a flow chart showing a subroutine for the copying operation processing.

FIG. 29 shows a subroutine for the copying operation processing to be executed at said step S105.

First, whether the optical system 4 has scanned each copy for several minutes or not is checked at step S190. When this result is "yes", the scanning completion flag is set to "1" at step S191. When the result is "No", a subroutine for the processing of copying process is executed at step S192. This subroutine is designed for the execution of the ordinary copy process by the copying machine 1. The details of this subroutine are omitted here.

Then, after confirming that the scanning completion flag is "1" at step S193, the scanning completion flag is reset to "0" at step S194; the copying flag is reset to "0" at step S195; and a subroutine for other processings is executed at step S196.

Figure 30A:
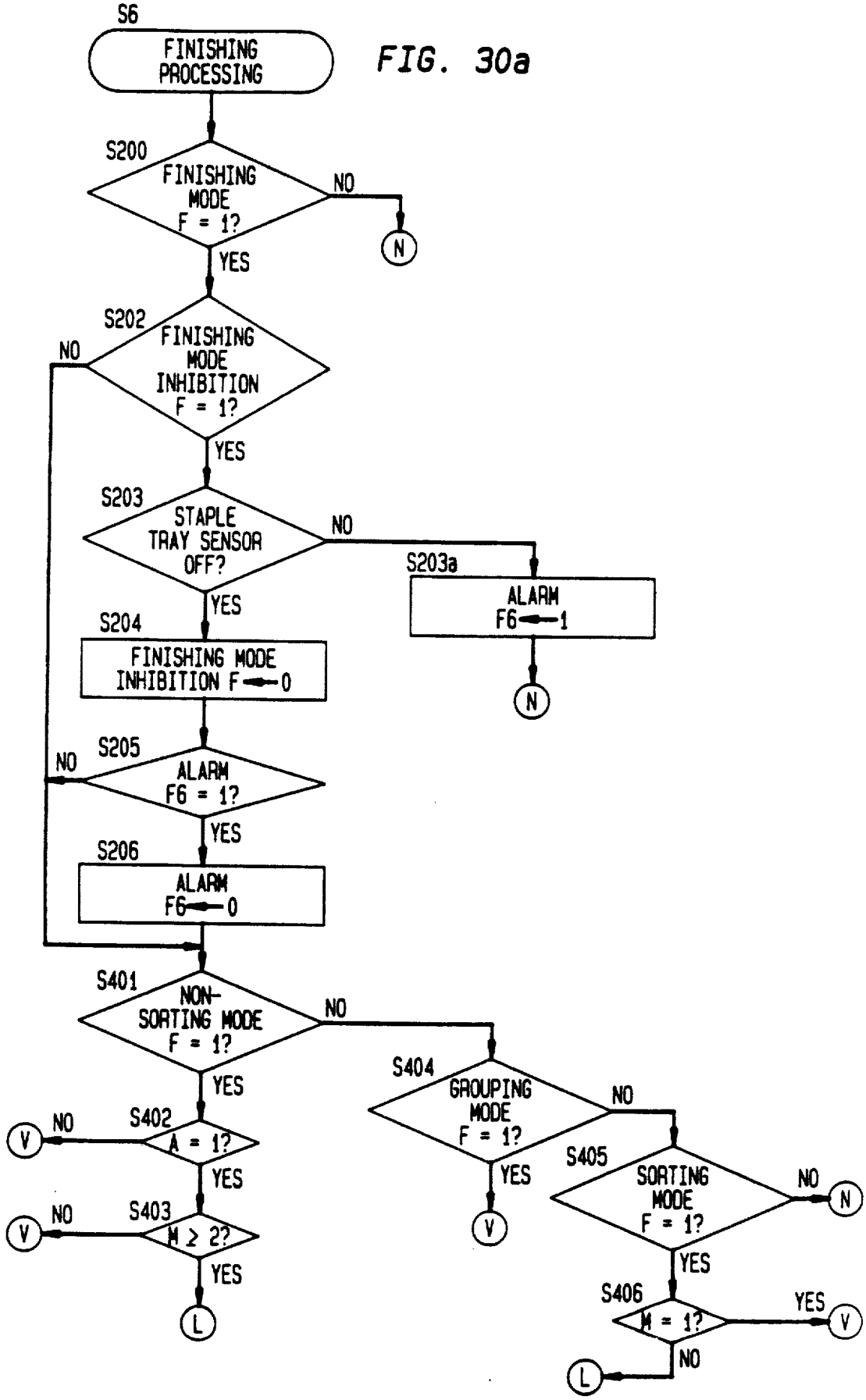
FIGS. 30a and 30b are flow charts showing a subroutine for the finishing processing.
Figure 30B:
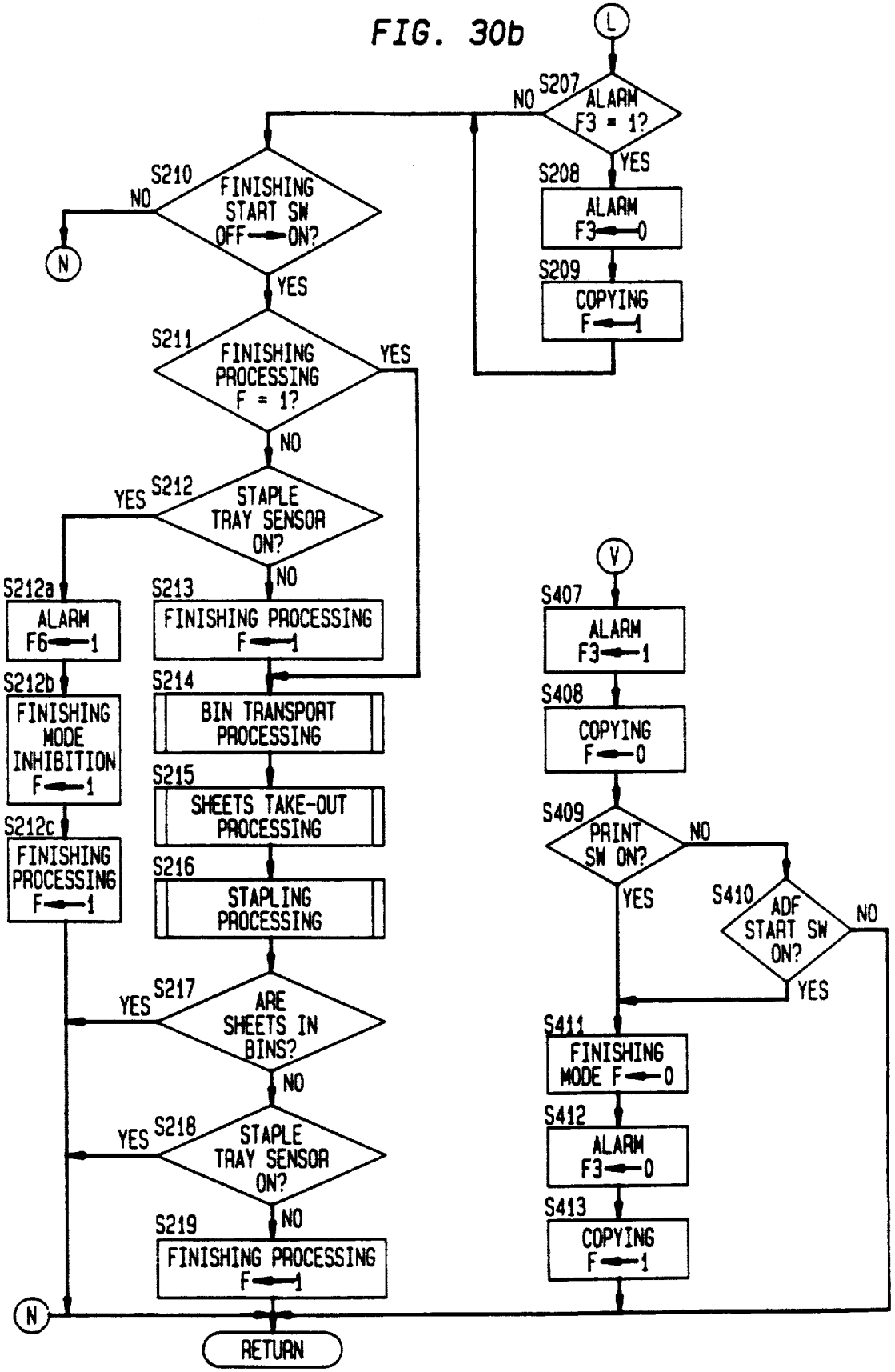

FIGS. 30a, 30b show a subroutine for the finishing processing to be executed at step S6 of the main routine.

First, whether the finishing mode flag is "1" or not is checked at step S200. When is "0", the processing is terminated at once. When is "1", whether a finishing mode inhibition flag is "1" or not is checked at step S202. When is "0", whether the processing goes to step S401. When is "1", whether the presence or absence of the sheets on the staple tray 91 is checked by on-off action of the sheet detection sensor Se6 on staple tray 91 at step S203. When the presence of the sheets on the tray 91 is detected from that the sheet detection sensor Se6 is on, tbe alarm flag F6 is set to "1" at step S203a in order to prepare for indicating the necessity of removing the sheets from the staple tray 91 so that the troubles such as the mixing of the sheets already on the staple tray 91 with the sheets transported later onto the staple tray 91 and the oversupply of the sheets for the capacity of stapling unit 90 can be prevented.

On the other hand, that the sheets are not present on the staple tray 91 is confirmed at step S203, the finishing mode inhibition flag is reset to "0" at step S204, in order to cancel the inhibition of the finishing mode operation. Next, whether the alarm flag F6 is "1" or not is checked at step S205. When is "1", the flag F6 is reset to "0" at step S206, when is "0", the processing goes to step S401. Next, at step S401, whether the non-sorting flag is "1" or not is checked. When is "1", at step S402, whether the number (A) of copy sets is "1" or not is checked. When the result is judged to be "1", at step S403, whether the number (M) of sheets per bin is more than 2 is checked. When both the number (A) of copy sets is "1" and the number (M) of sheets per bin is more than 2, the processing goes to step S207 to execute the stapling processing.

On the other hand, at said step S402, when it is judged that the number (A) of copy sets is not "1", that is, if more than two sheets having the same image are stored in the bin 60 in non-sorting mode, the processing goes to step S407 so that the stapling operation is not necessary. At said step S402, when it is judged that the number (M) of sheets per bin is "1", the processing goes to step S407 so that the stapling operation is not similarly necessary.

At step 8407, the alarm flag F3 is set to "1" in order to prepare for indicating that the finishing mode is impossible; at step S408, the copying flag is reset to "0" in order to inhibit the copying operation. Then, at step S409 and S410, when either one of the print switch 121 or the ADF start switch 141 is turned on is confirmed, the finishing mode flag is reset to "0" at step 8411, the alarm flag F3 is reset to "0" at step S412, and the copying flag is set to "1" at step S413, the subroutine is terminated. More specifically, when the operator's will for the execution of the copying operation even if the finishing operation is not adaptable is confirmed, the finishing mode are canceled and copying operation is allowed.

On the other hand, at step S404, when the grouping mode flag is judged to be "1", the processing is executed at said steps S407 through S412 so that the stapling operation is not similarly necessary. Further, at step S405, when the sorting mode flag is judged to be "1", whether the number (M) of sheets per bin is "1" or not is checked at step S406 similarly said step S403. When the number (M) is "1", the processing is executed at said step S407 and on so that the stapling operation is not necessary. When the number (M) of sheets per bin is not "1", that is, if more than "2", the processing goes to step S207 to execute the stapling processing.

If the stapling processing is impossible, that is, when it is judged to be "yes" at said step S403 or to be "No" at said step S406, whether the alarm flag F3 is "1" or not is checked at step S207. The flag F3 is set to "1" at said step S407 as above-mentioned, when the flag F3 is "1", it is reset to "0" at step S208. Then, the copying flag is set to "1" at step S209, the processing goes to step S210. At said step S207, when the alarm flag F3 is judged to be "0", the processing goes to step S210 at once.

At step S210, whether the finishing start switch 158 is changed to on from off is checked. When the result is "No", this subroutine is terminated. In contrast, when the switch 158 is changed to on, whether the finishing processing flag is "1" or not is checked at step S211. When is "1", the processing goes to step S214 to execute the stapling operation. When is "0", whether the presence or absence of the sheets on the staple tray 91 is checked again by on-off action of the sensor Se6 at step S212. When the presence of the sheets on the staple tray 91 is detected, the alarm flag F6 is set to "1" at step S212a in order to prepare for indicating the necessity of removing the sheets from the staple tray 91. Then, the finishing mode inhibition flag is set to "1" at step S212b and the finishing processing flag is reset to "0" to cancel the stapling operation. And this subroutine is terminated. In contrast, when the absence of the sheets on the staple tray 91 is detected, the finishing is set to "1" at step S213.

When the finishing start switch 158 is changed to on from off and the sheets are absent on the staple tray 91, and only in such case, the finishing processing may be executed. That is, a subroutine for the bin transport processing is executed at step S214, a subroutine for the sheet take-out processing at step S215, and a subroutine for staple processing at step 8216 respectively. Then, when these processings have been completed, the presence or absence of the sheets in each of the bins 60 is checked at step S217 and the presence or absence of the sheets on the staple tray 91 is checked at step S218. When both the sheets are absent, the finishing processing flag is reset to "0" at step S217.

Further, in the case of the finishing processing subroutine, that the sheets have been removed from the staple tray 91 has to be confirmed at step S203, and then the alarm flag F6 has to be reset to "0" at step S206 to cancel the inhibition of the finishing mode. The finishing processing may be resumed automatically through the timer or by the input through the finishing start switch 158 after canceling the inhibition of the finishing mode.

Figure 31:
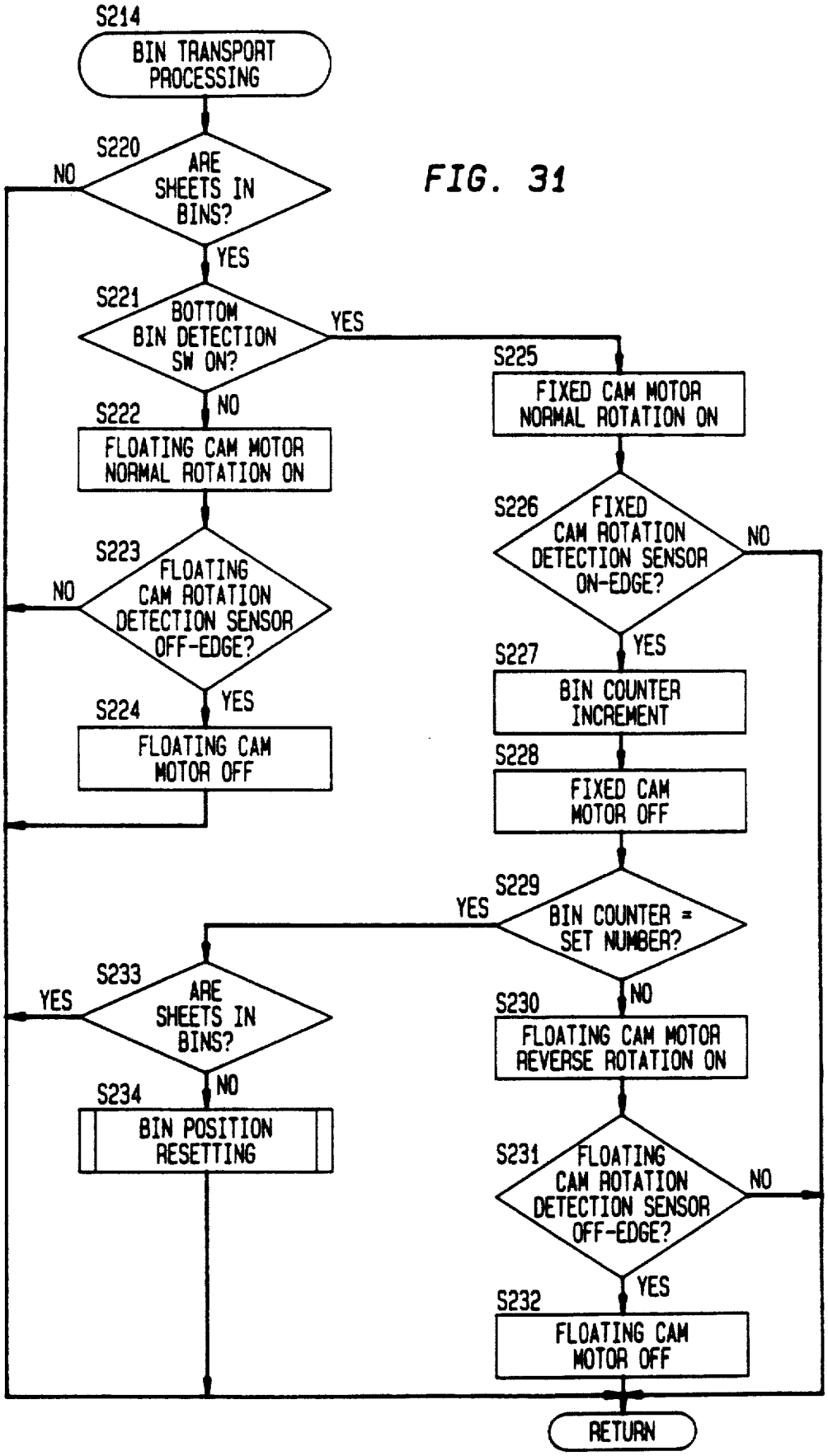
FIG. 31 is a flow chart showing a subroutine for the bin transport processing.

FIG. 31 shows a subroutine for the bin transport processing to be executed at said step S214.

The presence or absence of the sheets in the bins 60 is checked by on-off action of the sensor Se5 at step S220, and the processing is terminated at once when the sheets are absent. Actually, such condition cannot occur, but it can occur when the operator takes out the sheets from the bins 60 immediately after completing the copying and sorting operation When the sheets are present, they are detected by whether the bottom bin detection switch SW1 is on or not at step S221. When the switch SW1 is not on, the motor of the floating cam 50 is turned towards its normal direction at step S222 in order to shift the floating cam 50 to the bottom bin position X1, and said motor is turned off at step S224 when it is confirmed that the switch for detecting the rotation of the floating cam 50 is off-edge at step S223. The processings at steps S222, S223 and S224 will be continued until the floating cam 50 moves to the bottom bin position X1.

When the floating cam 50 has moved to the bottom bin position X1, that is, when it is judged that the bottom bin detection switch SW1 is turned on at said step S221, the fixed cam motor is turned towards its normal direction at step 8225, and whether the fixed cam rotation detection sensor Se2 is on-edge or not is checked at step S226. When the sensor Se2 is on-edge, this indicates that the bins 60 at the bottom bin position X1 has descended to the sheet take-out position X3, and this is followed by the increment of the bin counter at step S227 and turning off of the fixed cam motor at step S228.

Then, whether the reading of the bin counter is equal to the set number (A) (refer to step S10) or not is checked at step S229. When the reading of the bin counter is smaller than the set number (A), the processing for letting the next bin 60 move to the sheet take-out position X3 is executed. That is, the rotation of the floating cam motor is reversed at step 8230, and when the off-edge of the sensor for detecting the rotation of the floating cam motor is confirmed at step S231, the floating cam motor is turned off at step S232. This causes the next bin 60 to move to the bottom bin position X1. These steps S230, S231 and S232 will be repeated until the reading of the bin counter becomes equal to the set number (A).

When the reading of the bin counter has become equal to the set number (A), the stapling operation is completed, and a subroutine for resetting the bin position is executed at step S234 after confirming that the sheets are not present in the bins 60 at step S233.

Figure 32:
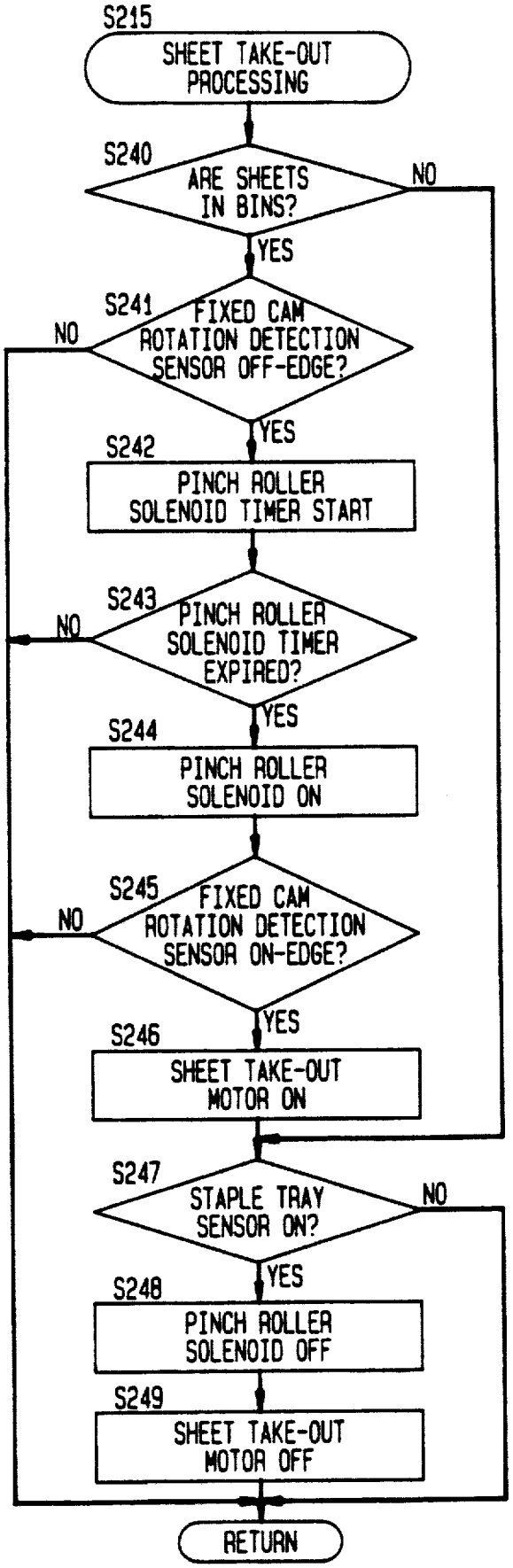
FIG. 32 is a flow chart showing a subroutine for the sheet take-out processing.

FIG. 32 shows a subroutine for the sheet take-out processing to be executed at said step S215. This subroutine is for the execution of the processing for transporting the sheets which have been brought down to the sheet take-out position X3 by the bins 60 to the staple tray 91 by the sheet transport unit 80.

First, whether the sheets are present in the bin 60 which is coming down to the sheet take-out position X3 or not is checked by the on-off action of the sensor Se5 at step S240. When the sheets are absent, the alarm is given (by the system not shown in the drawings), and the processing proceeds to step S247. When the presence of the sheets is confirmed, whether or not the fixed cam rotation detection sensor Se3 is off-edge, or whether the fixed cam 70 has started to turn towards its normal direction or not is checked at step S241. When judged to be off-edge, or when the bin 60 has begun descent to the sheet take-out position X3 following the start of the normal rotation of the fixed cam 70, a pinch roller solenoid timer is started at step S242. When the expiration of the time set by the solenoid timer is confirmed at step S243, the solenoid of the pinch rollers 76 is turned on at step S244. Then the sheets on the bin 60 is caught between the take-out roller 75 and the pinch rollers 76 at the sheet take-out position X3 immediately before the sheet is caused to come down as the fixed cam 70 turns towards its normal direction.

Then, whether the fixed cam rotation detection sensor Se2 is on-edge or not, that is, whether the bin 60 has descended completely to the sheet take-out position X3, is checked at step S245. When judged to be on-edge, the sheet take-out motor is turned on at step S246, and this causes the sheets to be transported to the staple tray 91 by the rollers 75, 76, 81a and 81b. When it is judged that the sheets have been transported on the staple tray 91 by the sensor Se6, the pinch roller solenofd is turned off at step 8248. As a result, the pinch roller 76 withdraws upward away from the take-out roller 75. This is because the pinch rollers 76 need to move away from the sheet take-out position X3 before the next bin 60 starts to descend from the bottom bin position X1 so that the interference with the sheets distributed among the bins 60 can be prevented. Then, the sheet take-out motor is turned off at step S249 to terminate the execution of this subroutine.

Figure 33:
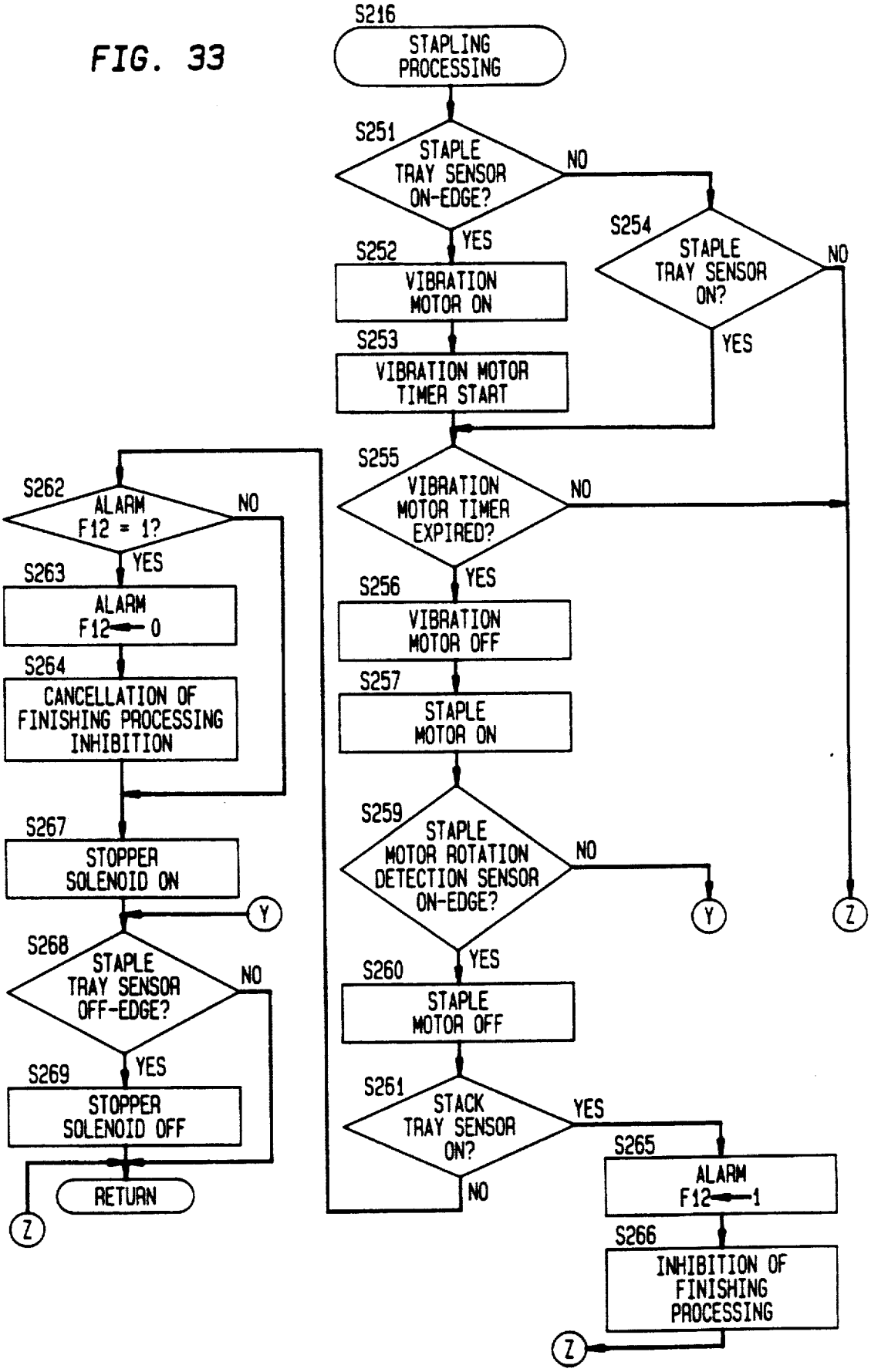
FIG. 33 is a flow chart showing a subroutine for the staple processing.

FIG. 33 shows a subroutine for staple processing to be executed at said step S216.

First, whether the sensor Se6 on the staple tray 91 is on-edge or not is checked at step S251. This sensor Se6 is turned on when the sheets are supplied onto the tray 91. Thus, when the sensor Se6 is on-edge, the vibration motor 93 is turned on at step S252 in order to true up the sheets on the tray 91, and the timer for the vibration motor is started at step S253. On the other hand, when tbe sensor Se6 is judged to be not on-edge at said step S251, and the sensor Se6 is on at step S254, or when the sheets on the tray 91 is detected, the processing proceeds to step S255.

Then, when the expiration of the time set by the timer for the vibration motor is confirmed at step S255, the vibration motor is turned off at step S256, and staple motor is turned on at step S257. Then, when the rotation detection sensor Se5 of the staple motor is judged to be on-edge at step S259, or when the sheets are stapled with staple 106 following the movement of the head 105, the stapling motor is turned off at step S260.

Next, at step S261, whether the sheets are absent or not in the stack tray 111 is checked by on-off action of the sensor Se7. When it is judged that the sensor Se7 has been turned on, that is, when any sheets are remain in the stack tray 111, the alarm flag F12 is set to "1" at step S265, and the finishing processing is inhibited at step S266. Such a procedure may be prevented the newly-stapled sheets from being mixed with sheets remaining in the stack tray 111. In contract, when the sheets remained in the stack tray 111 are absent, whether the alarm flag F12 is "1" or not is checked at step S262. When is "1", the flag F12 is reset to "0" at step S263, and the inhibition of the finishing processing is canceled at step S264, then the processing proceeds to step S267. When the flag F12 is judged to be "0", the processing proceeds to step S267 at once.

Then, at step S267, the stopper solenoid is turned on. This causes the stopper 96 to withdraw from above the tray 91, and the sheets slide downward onto the stack tray 111. Then, when the sensor Se6 of the staple tray 91 is judged to be off-edge at step S268, or when the ejection of the stapled sheets into the stack tray 111 is detected, the stopper solenoid is turned off at step S269 to return the stopper 96 on the tray 91, and the execution of this subroutine is terminated.

[Second Embodiment]

Figure 34A:
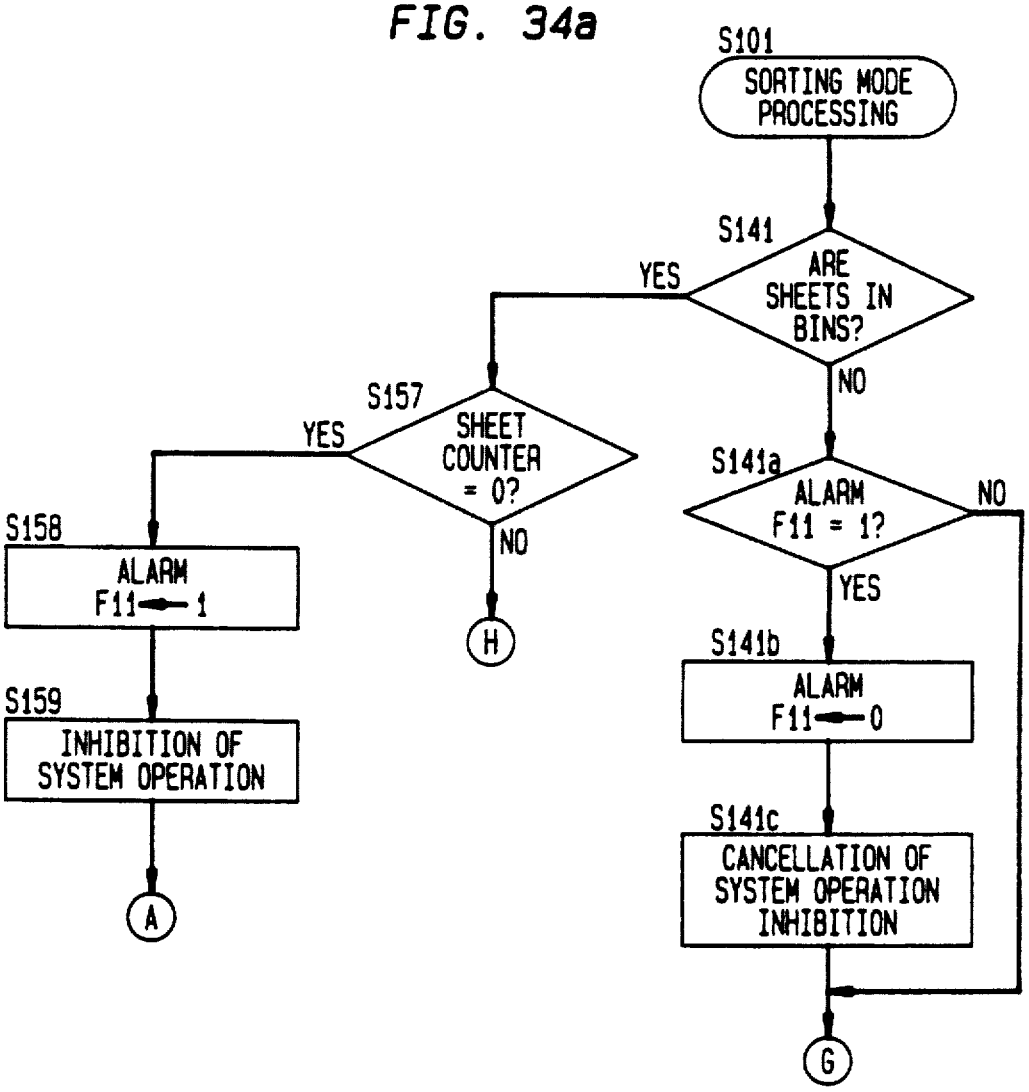
FIGS. 34a, 34b, 34c and 34d are flow charts showing a subroutine for the sorting processing executed a second embodiment.
Figure 34B:
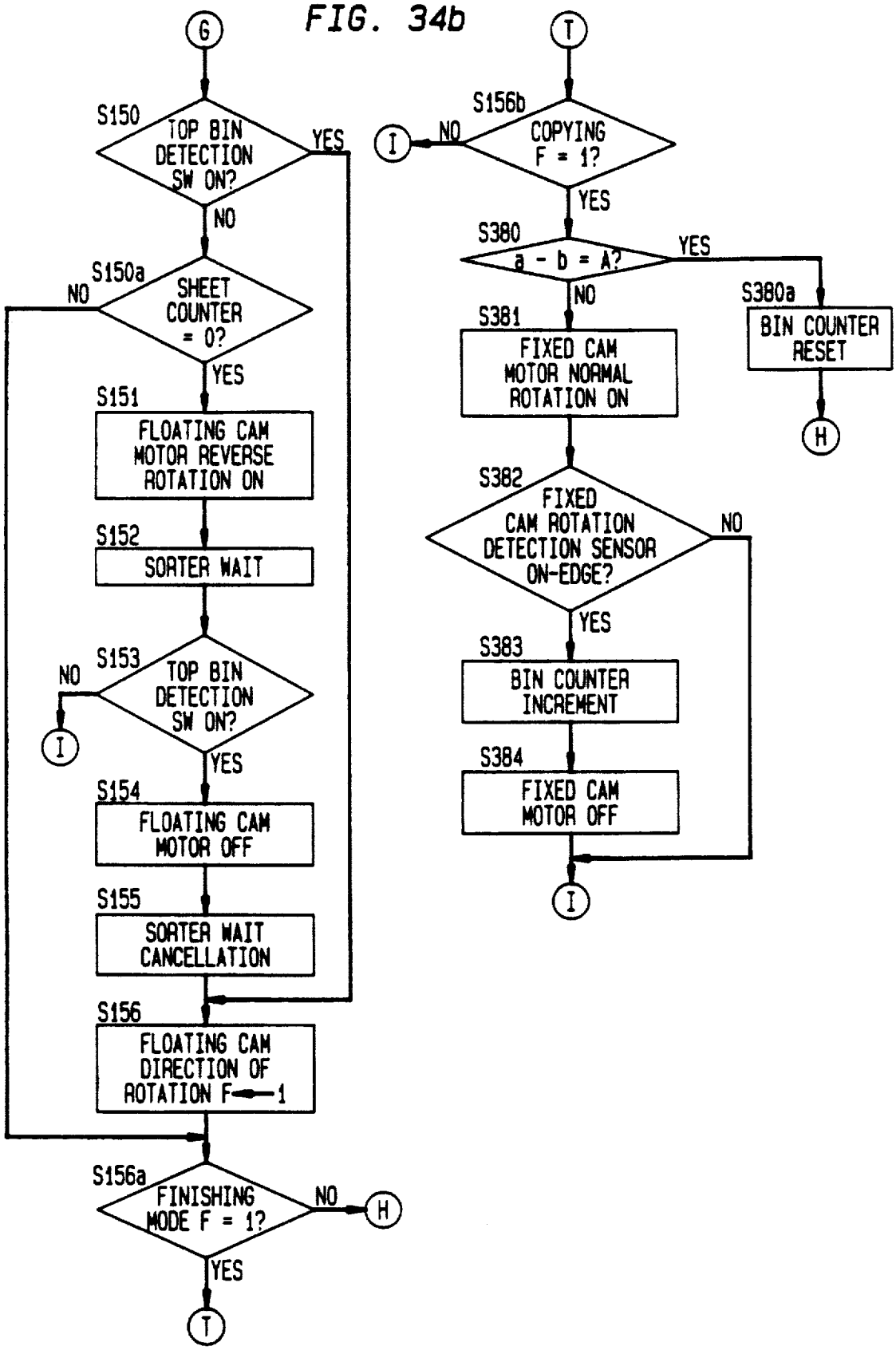
Figure 34C:
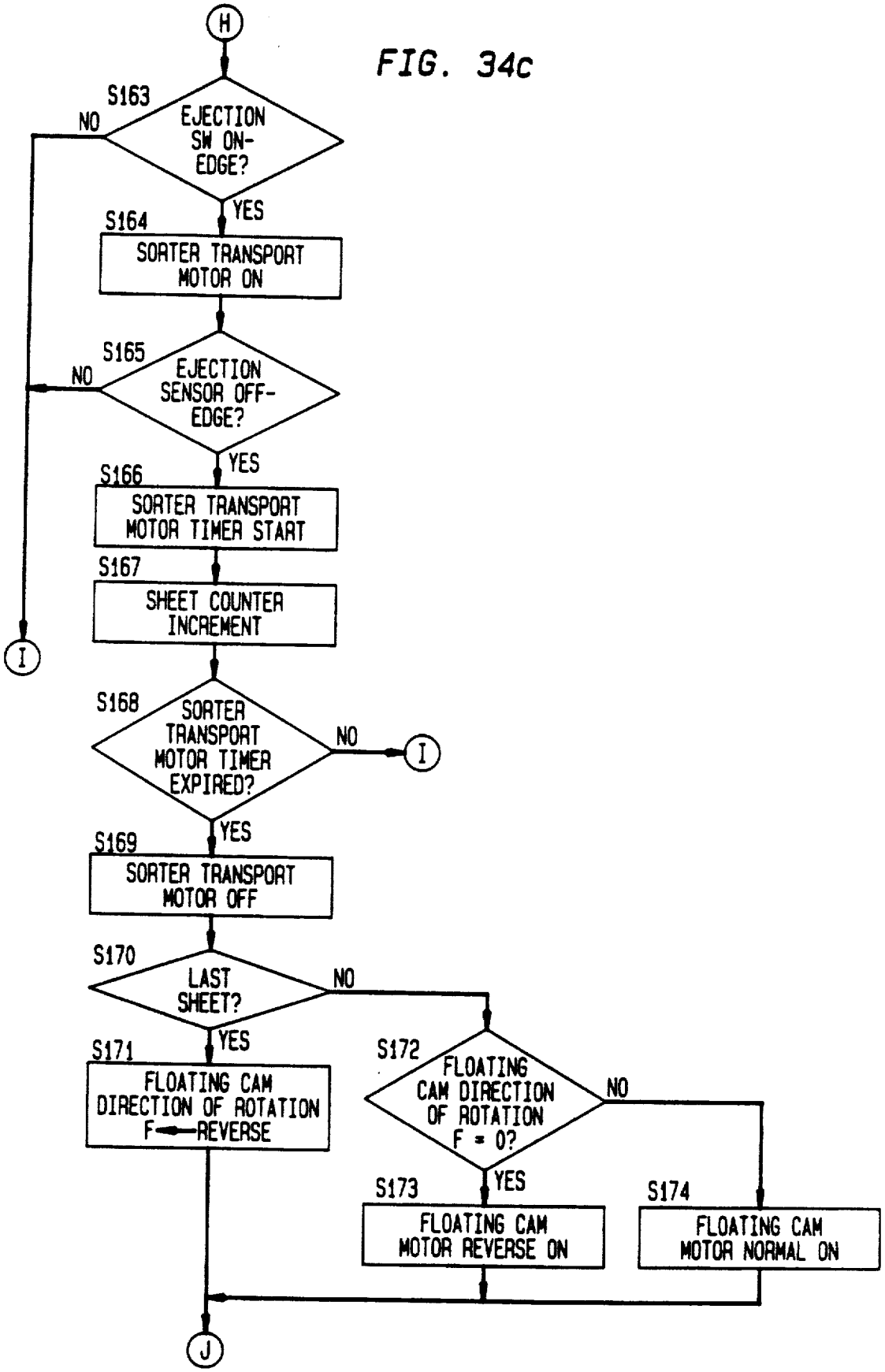
Figure 34D:
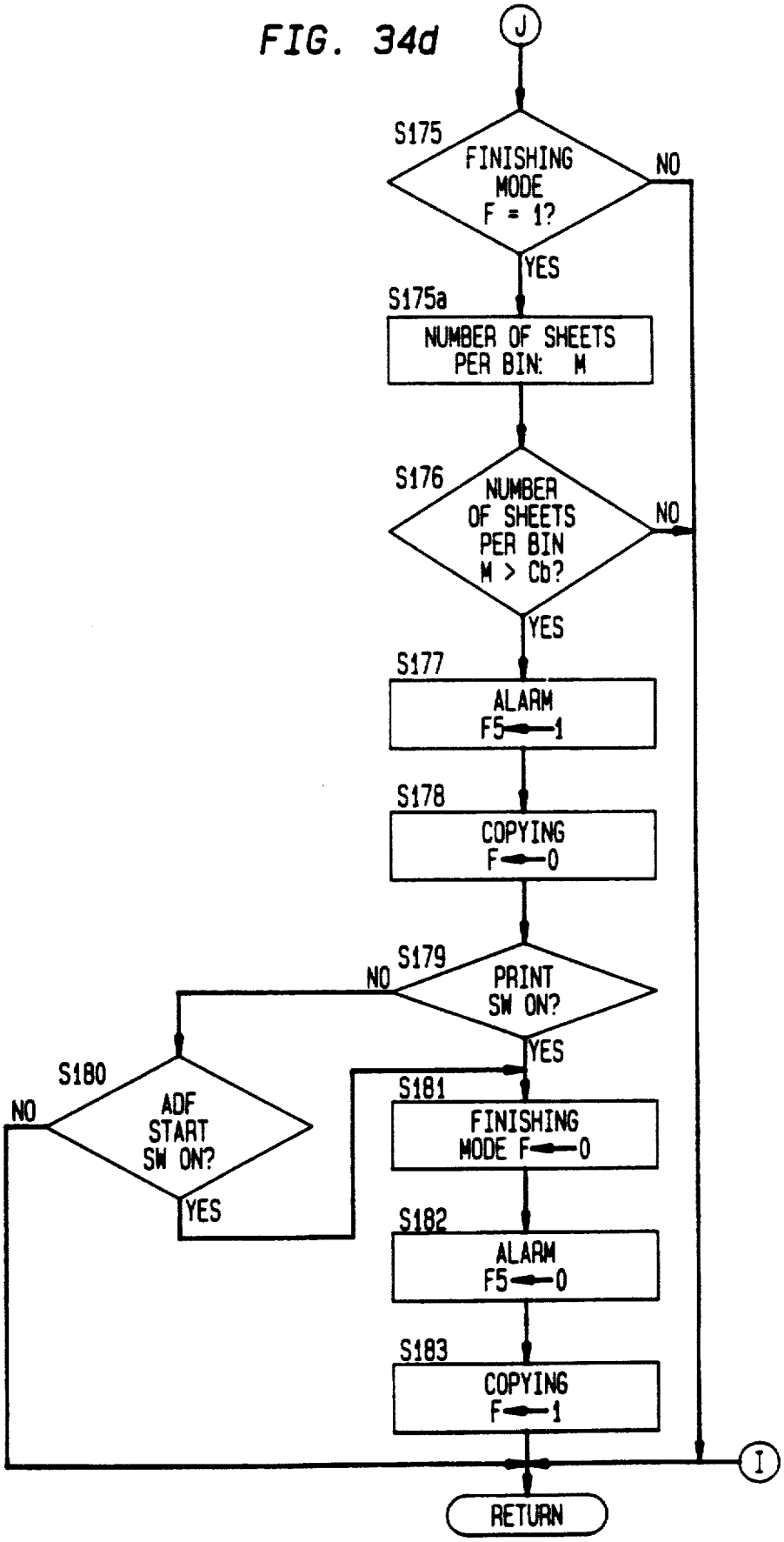

In this second embodiment, the processing executed in the subroutine at step S101 alone has been placed with the subroutine shown in FIGS. 34a through 34b, and other processings are identical with above described in FIG. 21 through FIG. 33 in the first embodiment.

As shown in FIGS. 34a through 34d, in the subroutine for the sorting mode processing, the bins 60 are set to the top bin position X2 (refer to steps S150 through S156), and the lower bins 60 other than the number (A) of copy sets are moved down to the sheet take-out position X3 if the finishing mode are selected.

More specifically, when it is judged that the finishing mode has been selected at step S156a, and when it is judged that the copying flag is "1" at step S156b, whether the number (a) of copy sets is equal to the value calculated by subtracted the number (a) of bins from the reading (b) of the bin counter is checked at step 8380. When the result of the checks is "No", at step S381, the fixed cam motor is turned towards its normal direction, and at step S382, whether the fixed cam rotation detection sensor Se2 is on-edge or not is checked. When the sensor Se2 is on-edge, the bin counter is increased at step S383, and the fixed cam motor is turned off at step S384.

Then, the processings at steps S381 through S384 will be continued until the result of check at said step S380 is "Yes", and the bin counter is reset at step S380a. The processing proceeds to step S163 and on. More specifically, in above-mentioned procedure, the lower bins 60 other than a specified number of upper bins 60 corresponding to the number (A) of copy sets designated by the operator are moved down to the sheet take-out position X3 during the copying and sorting operations, or before the stapling operation, and the sheets are sorted into the upper bins 60 sequentially from the top bin 60. That is, lower bins 60 which will not be used in sorting sheets, are moved to the sheet take-out position X3 before the finishing operation. Therefore, the bins 60 having sheets stored therein are moved to the sheet take-out position X3 directly from the lowest bin 60 having sheets.

Although the present invention has been described in connection with the preferred embodiment thereof, it is to be noted that various changes and modifications are apparent to those skilled in the art. Such changes and modifications are to be understood as included within the scope of the present invention as defined by the appended claims, unless they depart therefrom.

What is claimed is:

1. A copying apparatus having a function of stapling sheets having document images formed thereon by image forming means and comprising:

means for inputting [the] *a* number of copy sets which inputs the number of copies to be prepared from one document;

sorting means having a plurality of bins capable of independently moving up or down, wherein sheets are sorted into said bins sequentially from the top bin to the bottom bin;

take-out means disposed below said sorting means and capable of taking the stored sheets out of each bin;

means for stapling the sheets taken out of each bin;

first control means which, after sorting operation, moves each bin having sheets stored to the position where sheets are taken by said take-out means; and second control means which, during the sorting operation, moves bins other than those assigned for the input number of copy sets, below said take-out means.

2. A copying apparatus comprising:

means for forming a document image on a sheet;

means for inputting [the] *a* number of copy sets which inputs the number of copies to be prepared from one document;

sorting means having a plurality of bins, wherein sheets respectively having an image formed thereon are sorted into said bins in a sorting mode and stored into one of said bins in a non-sorting mode;

first selecting means for selecting [so] the sorting mode or the non-sorting mode;

means for stapling the sheets stored in each of said bins in a stapling mode but not stapling them in non-stapling mode;

second selecting means for selecting the stapling mode or the non-stapling mode; and control means for inhibiting said image forming means from starting to operate when both the non-sorting mode and the stapling mode are selected at a time and when the input number of copy sets is [more than] 2 *or more.*

3. A copying apparatus as set forth in claim 2, further comprising means for alarming when both the non-sorting mode and the stapling mode are selected at a time and when the input number of copy sets is [more than] 2 *or more.*

4. A copying apparatus as set forth in claim 2, further comprising second control means for canceling said inhibition and starting the operation of said image forming means.

5. A copying apparatus *for use by an operator,* comprising:

means for forming a document image on a sheet;

means for inputting [the] *a* number of copy sets which inputs the number of copies to be prepared from one document;

sorting means having a plurality of bins, wherein sheets respectively having an image formed thereon are sorted into said bins in a sorting mode and stored into one of said bins in a non-sorting mode;

first selecting means for selecting the sorting mode or the non-sorting mode;

means for stapling the sheets stored in each of said bins in a stapling mode but not stapling then is a non-stapling mode;

second selecting means for selecting the stapling mode or the non-stapling mode; and means for alarming the *the operator* when both the non-sorting mode and the stapling mode are selected at a time and when the input number of copy sets is [more than] 2 *or more.*

6. A copying apparatus as set forth in claim 5, further comprising control means for inhibiting said image forming means from starting to operate when both the non-sorting mode and the stapling mode are selected at a time and when the input number of copy sets is [more than] 2 *or more.*

7. A copying apparatus as set forth in claim [5] *6,* further comprising second control means for cancelling said inhibition and starting the operation of said image forming means.

8. A sheet handling apparatus comprising:

sorting means having a plurality of bins, wherein sheets are sorted into said bins respectively;

means for stapling the sheets stored in each of said bins after the sorting operation;

means for designating a stapling mode to execute said stapling means;

means for manually inputting a canceling command for canceling said stapling mode; and canceling means for canceling the stapling mode in response to a canceling command input during the sorting operation in the stapling mode, and continuing the sorting operation even after canceling the stapling mode.

9. A sheet handling apparatus comprising:

sorting means having a plurality of bins, wherein sheets respectively are sorted into said bins;

means for stapling the sheets stored in each of said bins after the sorting operation; and discharging the stapled sheets to a stack unit;

means for designating a stapling mode to execute said stapling means;

means for detecting the stapled sheets stored in said stack unit; and control means for inhibiting said stapling means from discharging the stapled sheets to said stack unit in the case that any stapled sheets are remaining in said stack unit when the stapling mode is designated.

10. A sheet handling apparatus asset forth in claim 9, further means for canceling said inhibition when the sheets remaining in said stack member are removed during said inhibition.

11. A copying apparatus comprising:

means for forming a document image on a sheet;

means for stapling sheets;

sorting means having a plurality of bins stacked in the vertical direction and capable of sorting sheets onto said bins, which each bin has a stopper to regulate sheets from sliding down and is lowered sloping down to a sheet take-out position after the storing operation;

means for transporting the sheets taken out of each bin lowered down to the sheet take-out position to said stapling means;

a guide member disposed at the sheet take-out position and having a guiding surface to guide the sheets on each bin to said transport means, wherein said guiding surface is arranged so as to be located above said stopper when each bin has been lowered sloping down to the sheet take-out position; and a pair of pinch rollers disposed at the sheet take-out position and capable of catching the sheets on each bin and delivering them to said transport means immediately before said stopper comes below said guiding surface when each bin is lowered sloping down.

12. A copying apparatus comprising:

means for forming a document image on a sheet;

[sorting] *distributing* means having a plurality of bins, wherein sheets respectively having an image formed thereon are [sorted] *distributed* into said bins;

means for stapling the sheets transported from each of said bins;

means for detecting the size of sheet being [sorted] *distributed* into *said* bins; and control means for inhibiting the stapling operation *and allowing the copying apparatus to continue operation* when the size of sheet being [sorted] *distributed* into said bins differs from the size of sheet selected at the start of the copying operation.

13. A copying apparatus comprising:

means for forming a document image on a sheet;

sorting means having a plurality of bins stacked in the vertical direction, each of said bins has an opening at its end portion for taking the sheets out of said bins;

a sheet take-out means disposed under said sorting means and having a first roller and a second roller which is movable between an actuating position in which said second roller presses on said first roller, and a nonactuating position in which said second roller is moved away from said first roller;

a bin driving mechanism for causing each of said bins to move down to the sheet take-out position at which said first roller contacts with the under side of the sheet through said opening of said bin;

a roller driving mechanism for holding said second roller at the nonactuating position while each of said bins moves to the sheet take-out position and for causing said second roller to move to the sheet take-out position, wherein the sheets in said bin are pinched by said first and second rollers and taken out from said bin; and means for stapling the sheets taken-out from said bin.

*14. An apparatus comprising:*

*means for forming a document image on a sheet;*

*distributing means having a plurality of bins, wherein sheets respectively having an image formed thereon are distributed into said bins;*

*means for stapling the sheets distributed by said distributing means;*

*means for detecting the size of sheet being distributed into bins; and*

*control means for inhibiting the stapling operation and allowing the apparatus to continue operation when the size of sheet being distributed into said bins differs from the size of sheet selected at the start of the image forming operation.*

*15. An apparatus as claimed in claim 14, further comprising:*

*means for alarming when the size of sheet being distributed into said bins differs from the size of sheet selected at the start of the image forming operation.*

*16. An apparatus as claimed in claim 15, further comprising:*

*a plurality of sheet containers which contain different size of sheets;*

*means for feeding sheet one by one from the container containing the selected size sheet to the image forming means.*

*17. An apparatus, comprising:*

*means for forming a document image on a sheet;*

*a distributing and finishing unit connected to said image forming means, said distributing and finishing unit having a plurality of bins, and a stapler, whereby sheets with images formed thereon by said image forming means may be distributed into groups and stapled;*

*means for selecting a sheet size at the start of a copying operation;*

*means for comparing the size of a sheet being distributed in said distributing and finishing unit with the sheet size selected at the start of the copying operation;*

*control means for inhibiting the stapling operation and allowing the apparatus to continue operation when the size of a sheet being stored into said distributing and finishing unit differs from the sheet size selected at the start of the image forming operation.*

*18. An apparatus, comprising:*

*means for forming a document image on a sheet;*

*a distributing and finishing unit connected to said image forming means, said distributing and finishing unit having a plurality of bins, and a stapler, whereby sheets with images formed thereon by said image forming means may be distributed into groups and stapled;*

*means for detecting the size of sheet being distributed into said bins; and*

*control means for inhibiting the stapling operation and allowing the apparatus to continue operation when the size of sheet being stored into said bins differs from the size of sheet selected at the start of the image forming operation.*

*19. An apparatus for use by an operator, comprising:*

*means for forming an image on a sheet;*

*a distributing and finishing unit connected to said image forming means, said distributing and finishing unit having a plurality of bins, and a stapler, whereby sheets with images formed thereon by said image forming means may be distributed into groups and stapled;*

*means for detecting the size of sheets being distributed into bins; and*

*means for alarming the operator when the size of sheet being stored into said bins differs from the size of sheet selected at the start of the image forming operation.*

*20. An apparatus as claimed in claim 19, further comprising:*

*a plurality of sheet containers which contain different size of sheets;*

*means for selecting a sheet size at the start of the image forming operation; and*

*means for feeding sheets one by one from the container containing the selected size sheet to the image forming means.*

* * * * *